United States Patent [19]
Coughlin et al.

[11] Patent Number: 4,741,820
[45] Date of Patent: May 3, 1988

[54] REFORMING/DEHYDROCYCLIZATION CATALYSTS AND PROCESSES

[75] Inventors: Peter K. Coughlin, Yorktown; Regis J. Pellet, Croton-On-Hudson, both of N.Y.

[73] Assignee: Union Carbide Corporation, Danbury, Conn.

[21] Appl. No.: 844,951

[22] Filed: Mar. 27, 1986

[51] Int. Cl.$^4$ .................. C10G 35/06; C07C 2/52
[52] U.S. Cl. .................. 208/138; 208/139; 585/419
[58] Field of Search ............ 208/138, 139; 585/419

[56] References Cited

U.S. PATENT DOCUMENTS

| | | | |
|---|---|---|---|
| 3,546,102 | 12/1970 | Bertolacini | 208/138 |
| 3,574,092 | 4/1971 | Mitsche | 206/139 |
| 4,018,711 | 4/1977 | Bertolacini | 252/455 |
| 4,104,320 | 8/1978 | Bernard et al. | 260/673 |
| 4,310,440 | 1/1982 | Wilson et al. | 502/510 |
| 4,347,394 | 8/1982 | Detz et al. | 585/419 |
| 4,370,224 | 1/1983 | Eberly, Jr. et al. | 208/139 |
| 4,417,083 | 11/1983 | Bernard et al. | 585/419 |
| 4,434,311 | 2/1984 | Buss et al. | 585/444 |
| 4,440,871 | 4/1984 | Lok et al. | 502/214 |
| 4,447,316 | 5/1984 | Buss | 208/138 |
| 4,554,143 | 11/1985 | Messine et al. | 502/162 |
| 4,567,029 | 1/1986 | Wilson et al. | 502/164 |

Primary Examiner—Curtis R. Davis
Attorney, Agent, or Firm—Vincent J. Vasta, Jr.

[57] ABSTRACT

Reforming and dehydrocyclization catalysts and processes are disclosed wherein reforming catalysts comprise a Group VIII metal and at least one medium pore non-zeolitic molecular sieve characterized in the calcined form by an adsorption of isobutane of at least 2 percent by weight at a partial pressure of 500 torr and a termperature of 20° C. and characterized by an adsorption of triethylamine less than about 5 percent by weight at a partial pressure of 2.6 torr and a temperature of 22° C. In one embodiment the catalyst includes a Group VII metal on a halogenated carrier.

66 Claims, 6 Drawing Sheets 4,741,820

REFORMING/DEHYDROCYCLIZATION CATALYSTS AND PROCESSES

FIELD OF THE INVENTION

The instant invention relates to reforming and dehydrocyclization catalysts and to processes employing such catalysts. The catalysts contain novel non-zeolitic molecular sieves, as hereinafter described.

BACKGROUND OF THE INVENTION

Reforming is a process generally known to the petroleum industry as a process for the treatment of naphtha fractions of petroleum distillates to improve their octane rating by producing aromatic components from components present in the naphtha feedstock. Reforming is a complex process and involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, and hydrocracking of paraffins to light products boiling outside the gasoline range. In addition, the dealkylation of alkylbenzenes and the isomerization of paraffins occur in reforming processes. Some of the reactions occurring during reforming are not desirable owing to their deleterious effect on the yield of commercially valuable products or upon the octane of the products. For example, hydrocracking reactions produce light paraffin gases, e.g., $C_1$-$C_4$, and reduce the yield of products boiling in the gasoline range.

The interest in catalytic reforming processes is fueled by a desire to improve the production (yield) of the gasoline fraction while concurrently increasing its octane, while also having sufficient catalytic activity to minimize the use of excessive temperature conditions for the dehydrocyclization process.

Several catalysts have been generally employed for catalytic reforming. Catalysts comprising platinum on chlorinated-alumina supports and Pt-X on alumina or chlorinated-alumina supports, where X is rhenium, iridium or tin, have been used for reforming naphthas. U.S. Pat. No. 4,370,224 discloses a multimetallic reforming catalyst comprised of platinum, iridium, copper, selenium and halogen, composited with an inorganic oxide support or carrier, preferably alumina. In addition, several patents have been issued for catalysts and/or processes employing zeolite-containing reforming catalysts. For example, several patents have disclosed the use of the zeolite mordenite in reforming catalysts, e.g., see U.S. Pat. Nos. 3,546,102; 3,679,575; 4,018,711 and 3,574,092. In addition, the use of ZSM-type zeolites in reforming catalysts and/or processes have been disclosed in U.S. Pat. Nos. 4,104,320; 4,417,083; 4,434,311 and 4,347,394. Further, the use of various forms of zeolite L is disclosed in U.S. Pat. Nos. 4,104,320, 4,447,316, 4,347,394 and 4,434,311. U.S. Pat. No. 4,417,083 discloses a process for the production of aromatic hydrocarbons in the presence of a two-bed process configuration employing a catalyst containing from 0.1 to 1.5% by weight of at least one metal selected from the group consisting of platinum, rhenium, iridium, tin and germanium, and containing sulfur in an atomic sulfur/metals ratio of from 0 to less than 1, supported on a crystalline, zeolitic aluminosilicate compensated by alkali metal cations, having a pore dimension larger than 6.5 Angstroms. The zeolite component is employed as a carrier. Among the zeolites that can be used are the Faujasites X and Y, the zeolite L and the zeolite omega.

Several chemical reactions occur during reforming. The most difficult of the desired reactions in reforming is the dehydrocyclization of paraffins and may be employed to evaluate a catalyst for its usefulness in reforming. The dehydrocyclization of paraffins containing six carbon atoms is one reaction carried out in reforming and is known to be relatively difficult. The ease of paraffin dehydrocyclization is known to generally increase with the number of carbon atoms present in the paraffin. Accordingly, an acidic reforming catalyst useful in forming aromatics from $C_6$ paraffins would also be considered to be equal or more effective in the conversion of paraffins containing seven or more carbon atoms. This conversion of acyclic hydrocarbons to cyclized and dehydrogenated aromatic products produces valuable aromatic products having higher octane value than the paraffins from which they were formed. Thus, the octane of the gasoline fraction increases as a result of both the decrease in paraffins and as a result of the increase in the higher octane value aromatic products with minimum yield loss as compared with simple paraffin cracking.

Although the prior art catalysts for reforming and dehydrocyclization have included the use of Group VIII metals with chlorinated-alumina and, in some instances, selected zeolite materials, the prior art has generally not disclosed the use of molecular sieves as components with noble metal/chlorinated-alumina catalysts and has not disclosed the use of non-zeolitic molecular sieves as components in reforming/dehydrocyclization catalysts.

U.S. Pat. No. 4,440,871 discloses a class of crystalline silicoaluminophosphates denominated as "SAPOs". The SAPOs of U.S. Pat. No. 4,440,871 are disclosed to be useful for hydrocarbon conversion reactions, including reforming and dehydrocyclization. The discussion of the use of SAPOs in reforming is set forth at column 70, lines 39 to 46 and reads as follows:

"The SAPO catalyst compositions employed in hydrocracking are also suitable for use in reforming processes in which the hydrocarbon feedstocks contact the catalyst at temperatures of from about 700° F. to 1,000° F., hydrogen pressures of from 100 to 500 psig, LHSV values in the range of 0.1 to 10 and hydrogen to hydrocarbon molar ratios in the range of 1 to 20, preferably between 4 and 12."

The discussion of the use of SAPOs in dehydrocyclization is set forth at column 71, lines 25 to 32, and reads as follows:

"Dehydrocyclization reactions employing paraffinic hydrocarbon feedstocks, preferably normal paraffins having more than 6 carbon atoms, to form benzene, xylenes, toluene and the like are carried out using essentially the same reaction conditions as for catalyst cracking. For these reactions it is preferred to use the SAPO catalyst in conjunction with a Group VII non-noble metal cation such as cobalt and nickel."

The above disclosures generally refer to the use of the class of SAPOs of U.S. Pat. No. 4,440,871 as catalysts for reforming and dehydrocyclization. This general disclosure is supported by evaluation of representative SAPO samples for their first-order rate constant. The first-order rate constant ($k_A$) is derived from a n-butane cracking experiment described at column 72, line 63 to column 73, line 30. The values for the first-order rate constants for SAPOs are set forth at column 73, lines 21 to 30. SAPO-5 is reported to have a $k_A$ of 1.4 and 7.4 for two preparative examples, SAPO-11 is reported to have a $k_A$ of 0.5 and SAPO-31 is reported to have a $k_A$ of 0.2. The meaning of the relative values of the first-order rate constants and their relationship to hydrocarbon conversion processes is not discussed. Further, U.S. Pat. No. 4,440,871 does not discuss the selection of SAPOs for the hydrocarbon conversion processes.

The instant invention relates to novel reforming and dehydrocyclization catalysts and processes wherein the catalyst is formulated using selected non-zeolitic molecular sieves, e.g., such as the silicoaluminophosphates disclosed in U.S. Pat. No. 4,440,871, as components in reforming catalysts.

DESCRIPTION OF THE INVENTION

Figure 1:
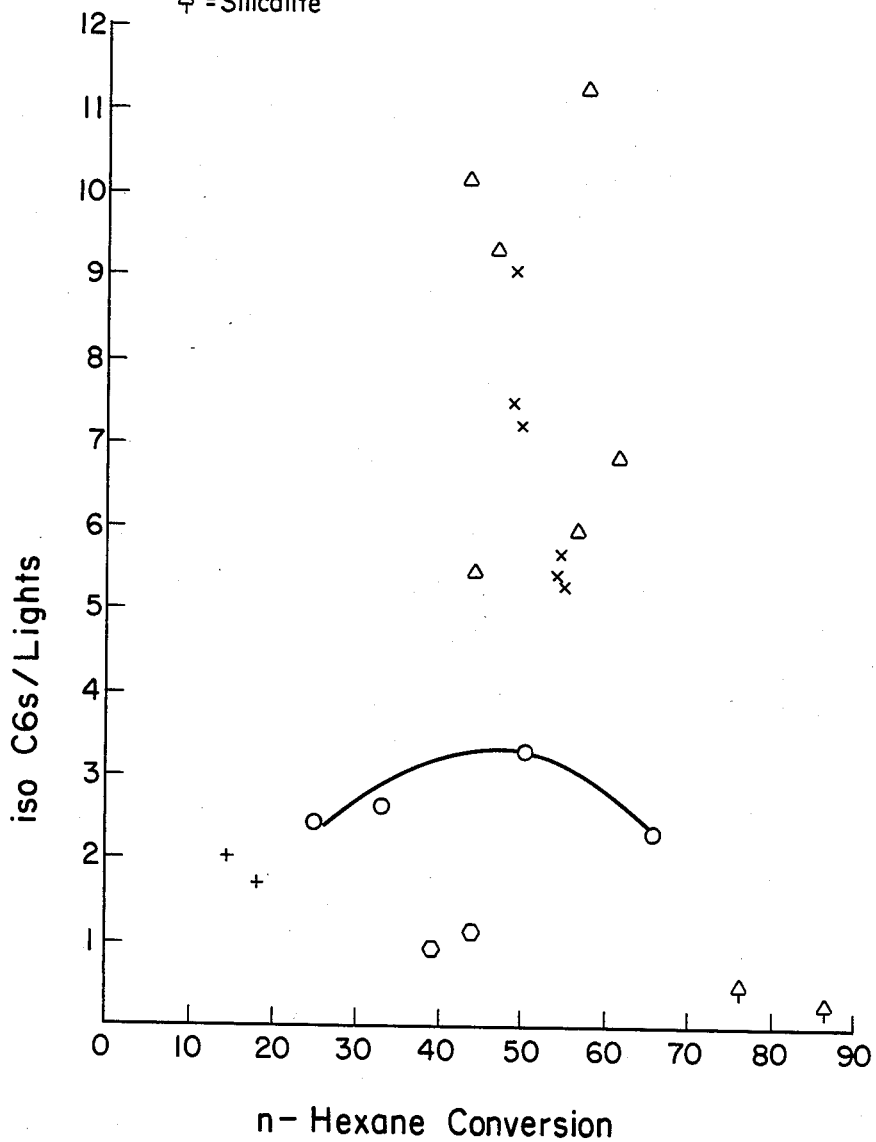
FIG. 1 depicts the relationship between the ratio of iso-$C_6$s/lights in the products as a function of the n-hexane conversion for examples 2 to 10.

The instant invention relates to reforming and dehydrocyclization catalysts and processes employing such catalysts. The term "medium pore" or the prefix "MP-" as employed in the instant invention refers to members of the class of non-zeolitic molecular sieves ("NZMS") which are characterized in their calcined form by an adsorption of isobutane of at least 2 percent by weight, preferably at least 4 percent by weight, at a partial pressure of 500 torr and a temperature of 20° C. and are also characterized in their calcined form by an adsorption of triethylamine less than about 5 percent by weight at a partial pressure of 2.6 torr and a temperature of 22° C., preferably less than 3 percent by weight. These "medium pore non-zeolitic molecular sieves" are referred to herein as "MP-NZMS" to reference the class or individually by the prefix "MP-" followed by the particular class member. For example "MP-SAPO" refers to a medium pore silicoaluminophosphate.

NON-ZEOLITIC MOLECULAR SIEVES ("NZMS")

The term "non-zeolitic molecular sieves" or "NZMS" is defined in the instant invention to include the "SAPO" molecular sieves of U.S. Pat. No. 4,440,871, "ELAPSO" molecular sieves as disclosed in U.S. Ser. No. 600,312, filed Apr. 13, 1984 and certain "MeAPO", "FeAPO", "TAPO" and "ELAPO" molecular sieves, as hereinafter described. Crystalline metal aluminophosphates (MeAPOs where "Me" is at least one of Mg, Mn, Co and Zn) are disclosed in U.S. Pat. No. 4,567,029, issued Jan. 28, 1986; crystalline ferroaluminophosphates (FeAPOs) are disclosed in U.S. Pat. No. 4,554,143, issued Nov. 19, 1985; titanium aluminophosphates (TAPOs) are disclosed in U.S. Pat. No. 4,500,651, issued Feb. 19, 1985; certain non-zeolitic molecular sieves ("ELAPO") are disclosed U.S. in EPC Application No. 85104386.9 (Publication No. 0158976, published Oct. 13, 1985 and No. 85104388.5 (Publication No. 158349, published Oct. 16, 1985); and ELAPSO molecular sieves are disclosed in copending U.S. Ser. No. 600,312, filed Apr. 13, 1984 (EPC Publication No. 0159624, published Oct. 30, 1985). The aforementioned applications and patents are incorporated herein by reference thereto. The nomenclature employed herein to refer to the members of the aformentioned NZMSs is consistent with that employed in the aforementioned applications or patents. A particular member of a class is generally referred to as a "-n" species wherein "n" is an integer, e.g., SAPO-11, MeAPO-11 and ELAPSO-31. In the following discussion on NZMSs set forth hereinafter the mole fraction of the NZMSs are defined as compositional values which are plotted in phase diagrams in each of the identified patents, published applications or copending applications.

ELAPSO MOLECULAR SIEVES

"ELAPSO" molecular sieves are described in copending U.S. Ser. No. 600,312, filed Apr. 13, 1984, (EPC Publication No. 0159,624, published Oct. 30, 1985, incorporated herein by reference) as crystalline molecular sieves having three-dimensional microporous framework structures of $ELO_2$, $AlO_2$, $PO_2$, $SiO_2$ oxide units and having an empirical chemical composition on an anhydrous basis expressed by the formula:

$$mR:(EL_wAl_xP_ySi_z)O_2$$

wherein "R" represents at least one organic templating agent present in the intracrystalline pore system; "m" represents the molar amount of "R" present per mole of $(EL_wAl_xP_ySi_z)O_2$ and has a value of from zero to about 0.3; "EL" represents at least one element capable of forming a three dimensional oxide framework, "EL" is characterized as an element having a mean "T—O" distance in tetrahedral oxide structures between about 1.51 Angstroms and about 2.06 Angstroms, "EL" has a cation electronegativity between about 125 kcal/g-atom to about 310 kcal/gm-atom and "EL" is capable of forming stable M—O—P, M—O—Al or M—O—M bonds in crystalline three dimensional oxide structures having a "M—O" bond dissociation energy greater than about 59 kcal/g-atom at 298° K.; and "w", "x", "y" and "z" represent the mole fractions of "EL", aluminum, phosphorus and silicon, respectively, present as framework oxides said mole fractions being within the limiting compositional values or points as follows:

| Point | Mole Fraction | | |
|---|---|---|---|
| | x | y | (z + w) |
| A | 0.60 | 0.39−(0.01)p | 0.01(p + 1) |
| B | 0.39−(0.01p) | 0.60 | 0.01(p + 1) |
| C | 0.01 | 0.60 | 0.39 |
| D | 0.01 | 0.01 | 0.98 |
| E | 0.60 | 0.01 | 0.39 | where "p" is an integer corresponding to the number of elements "El" in the $(El_wAl_xP_ySi_z)O_2$ constituent.

The "ELAPSO" molecular sieves are also described as crystalline molecular sieves having three-dimensional microporous framework structures of $ELO_2$, $AlO_2$, $SiO_2$ and $PO_2$ tetrahedral oxide units and having an empirical chemical composition on an anydrous basis expressed by the formula:

$$mR:(EL_wAl_xP_ySi_z)O_2$$

wherein "R" represents at least one organic templating agent present in the intracrystalline pore system; "m" represents the molar amount of "R" present per mole of $(EL_wAl_xP_ySi_z)O_2$ and has a value of from zero to about 0.3; "EL" represents at least one element capable of forming a framework tetrahedral oxide and is selected from the group consisting of arsenic, beryllium, boron, chromium, cobalt, gallium, germanium, iron, lithium, magnesium, manganese, titanium and zinc; and "w", "x", "y" and "z" represent the mole fractions of "EL", aluminum, phosphorus and silicon, respectively, present as tetrahedral oxides said mole fractions being within the limiting compositional values or points as follows:

| Point | Mole Fraction | | |
|---|---|---|---|
| | x | y | (z + w) |
| a | 0.60 | 0.39−(0.01)p | 0.01(p + 1) |
| b | 0.39−(0.01p) | 0.60 | 0.01(p + 1) |
| c | 0.10 | 0.55 | 0.35 |
| d | 0.55 | 0.10 | 0.35 | where "p" is as above defined.

The "ELAPSO" molecular sieves include numerous species which are intended herein to be within the scope of the term "non-zeolitic molecular sieves" such being disclosed in the following copending and commonly assigned applications, incorporated herein by reference thereto:

| U.S. Serial No. | Filed | NZMS |
|---|---|---|
| 600,174 | April 13, 1984 | CoAPSO |
| 600,173 | April 13, 1984 now U.S. Pat. No. 683,217 | FeAPSO |
| 600,180 | April 13, 1984 | MgAPSO |
| 600,175 | April 13, 1984 now U.S. Pat. No. 686,052 | MnAPSO |
| 600,179 | April 13, 1984 now U.S. Pat. No. 684,617 | TiAPSO |
| 600,170 | April 13, 1984 | ZnAPSO |
| 600,168 | April 13, 1984 now abandoned | CoMgAPSO |
| 600,182 | April 13, 1984 now abandoned | CoMnMgAPSO |
| 599,808 | April 13, 1984 now abandoned | AsAPSO |
| 600,177 | April 13, 1984 now abandoned | BAPSO |
| 600,176 | April 13, 1984 now abandoned | BeAPSO |
| 599,830 | April 13, 1984 | CAPSO |
| 599,925 | April 13, 1984 now abandoned | GaAPSO |
| 599,971 | April 13, 1984 now abandoned | GeAPSO |
| 599,952 | April 13, 1984 now abandoned | LiAPSO |

TiAPSO MOLECULAR SIEVES

The TiAPSO molecular sieves of U.S. Ser. No. 600,179, filed Apr. 13, 1984 have three-dimensional microporous framework structures of $TiO_2$, $AlO_2$, $PO_2$ and $SiO_2$ tetrahedral oxide units having an empirical chemical composition on an anhydrous basis expressed by the formula:

$$mR:(Ti_wAl_xP_ySi_z)O_2$$

wherein "R" represents at least one organic templating agent present in the intracrystalline pore system; "m" represents the molar amount of "R" present per mole of $(Ti_wAl_xP_ySi_z)O_2$ and has a value of from zero to about 0.3; and "w", "x", "y" and "z" represent the mole fractions of titanium, aluminum, phosphorus and silicon, respectively, present as tetrahedral oxides and each has a value of at least 0.01. The mole fractions "w", "x", "y" and "z" are generally defined being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a subclass of TiAPSO molecular sieves the values "w", "x", "y" and "z" in the above formula are within the tetragonal compositional area defined by points a, b, c and d, said points a, b, c and d representing the following values for "w", "x", "y" and "z".

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

TiAPSO compositions are generally synthesized by hydrothermal crystallization from a reaction mixture containing active resources of titanium, silicon, aluminum and phosphorus, and preferably an organic templating, i.e., structure-directing, agent, preferably a compound of an element or Group VA of the Periodic Table, and/or optionally an alkali or other metal. The reaction mixture is generally placed in a sealed pressure vessel, preferably lined with an inert plastic material such as polytetrafluoroethylene and heated, preferably under autogeneous pressure at a temperature between 50° C. and 250° C., and preferably between 100° C. and 200° C. until crystals of the TiAPSO product are obtained, usually a period of from hours to several weeks.

Generally, the crystallization time is from about 2 hours to about 30 days and typically from about 4 hours to about 20 days. The product is recovered by any convenient method such as centrifugation or filtration.

In synthesizing the TiAPSO, it is preferred to employ a reaction mixture composition expressed in terms of the molar ratios as follows:

$$aR:(Ti_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y" and "z" represent the mole fractions of titanium, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| | Mole Fraction | | |
|---|---|---|---|
| Point | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that (w+x+y+z)=1.00 mole. Molecular sieves containing titanium, aluminum, phosphorus and silicon as framework tetrahedral oxides are prepared as follows:

Preparative Reagents

TiAPSO compositions are typically prepared using numerous regents. Typical reagents which may be employed and abbreviations employed in U.S. Ser. No. 600,179 for such reagents are as follows:

(a) Alipro: aluminum isopropoxide;
(b) LUDOX-LS: LUDOX-LS is the tradename of Du-Pont for an aqueous solution of 30 weight percent $SiO_2$ and 0.1 weight percent $Na_2O$;
(c) $H_3PO_4$: 85 weight percent aqueous phosphoric acid;
(d) Tiipro: titanium isopropoxide;
(e) TEAOH: 40 weight percent aqueous solution of tetraethylammonium hydroxide;
(f) $Pr_2NH$: di-n-propylamine, $(C_3H_7)_2NH$.
(g) $Pr_3NH$: tri-n-propylamine, $(C_3H_7)_3N$;
(h) Quin: Quinuclidine, $(C_7H_{13}N)$;
(i) MQuin: Methyl Quinuclidine hydroxide, $(C_7H_{13}NCH_3OH)$; and
(j) C-hex: cyclohexylamine.

Preparative Procedures

TiAPSOs may be prepared by forming a starting reaction mixture by adding the $H_3PO_4$ and the water. This mixture is mixed and to this mixture aluminum isoproxide is added. This mixture is then blended until a homogeneous mixture is observed. To this mixture the LUDOX-LS is added and the resulting mixture blended (about 2 minutes) until a homogeneous mixture is observed.

The titanium isopropoxide is added to the above mixture and the resulting mixture blended until a homogeneous mixture is observed. The organic templating agent is then added to the resulting mixture and the resulting mixture blended until a homogeneous mixture is observed, i.e., about 2 to 4 minutes. When the organic templating agent is quinuclidine the procedure is modified such that the quinuclidine is dissolved in about one half the water and accordingly the $H_3PO_4$ is mixed with about one half the water. (The pH of the mixture is measured and adjusted for temperature). The mixture is then placed in a lined (polytetrafluoroethylene) stainless steel pressure vessel and digested at a temperature (150° C. or 200° C.) for a time or placed in lined screw top bottles for digestion at 100° C. Digestions are typically carried out at the autogenous pressure.

The products are removed from the reaction vessel and cooled.

MgAPSO MOLECULAR SIEVES

The MgAPSO molecular sieves of U.S. Ser. No. 600,180, filed Apr. 13, 1984 have three-dimensional microporous framework structures of $MgO_2^{-2}$, $AlO_2^-$, $PO_2^+$ and $SiO_2$ tetrahedral oxide units and have an empirical chemical composition on an anhydrous basis expressed by the formula:

$$mR:(Mg_wAl_xP_ySi_z)O_2$$

wherein "R" represents at least one organic templating agent present in the intracrystalline pore system; "m" represents the molar amount of "R" present per mole of $(Mg_wAl_xP_ySi_z)O_2$ and has a value from zero (0) to about 0.3; and "w", "x", "y" and "z" represent the mole fractions of magnesium, aluminum, phosphorus and silicon, respectively, present as tetrahedral oxides and each preferably has a value of at least 0.01. The mole fractions "w", "x", "y" and "z" are generally defined as being within the limiting compositional values or points as follows:

| | Mole Fraction | | |
|---|---|---|---|
| Point | x | y | (z + w) |
| A | 0.60 | 0.38 | 0.02 |
| B | 0.39 | 0.59 | 0.02 |
| C | 0.01 | 0.60 | 0.39 |
| D | 0.01 | 0.01 | 0.98 |
| E | 0.60 | 0.01 | 0.39 |

In a preferred subclass of the MgAPSO molecular sieves the values "w", "x", "y" and "z" in the above formula are within the limiting compositional values or points as follows:

| | Mole Fraction | | |
|---|---|---|---|
| Point | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

MgAPSO compositions are generally synthesized by hydrothermal crystallization for an effective time at effective pressures and temperatures from a reaction mixture containing reactive sources of magnesium, silicon, aluminum and phosphorus, an organic templating, i.e., structure-directing, agent, preferably a compound of an element of Group VA of the Periodic Table, and may be an alkali or other metal. The reaction mixture is generally placed in a sealed pressure vessel, preferably lined with an inert plastic material such as polytetrafluoroethylene and heated, preferably under autogeneous pressure at a temperature between 50° C. and 250° C., and preferably between 100° C. and 200° C. until crystals of the MgAPSO product are obtained, usually a period of from several hours to several weeks. Generally, the crystallization period will be from about 2 hours to about 30 days with it typically being from about 4 hours to about 20 days for obtaining MgAPSO crystals. The product is recovered by any convenient method such as centrifugation or filtration.

In synthesizing the MgAPSO compositions, it is preferred to employ reaction mixture compositions expressed in terms of the molar ratios as follows:

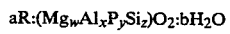

$$aR:(Mg_wAl_xP_ySi_z)O_2:bH_2O$$

wherein "R" is an organic templating agent; "a" is the amount of organic templating agent "R" and can have a value within the range of from zero (0) to about 6 and is more preferably an effective amount greater than zero to about 6; "b" has a value of from zero (0) to about 500, preferably between about 2 and about 300; and "w", "x", "y" and "z" represent the mole fractions of magnesium, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that (w+x+y+z)=1.00 mole. Molecular sieves containing magnesium, aluminum, phosphorus and silicon as framework tetrahedral oxides are prepared as follows:

Preparative Reagents

MgAPSO compositions are prepared using numerous reagents. Typical reagents which may be employed to prepare MgAPSOs include:
(a) Alipro: aluminum isopropoxide;
(b) CATAPAL: Trademark of Condea for hydrated pseudo-boehmite;
(c) LUDOX-LS: Trademark of DuPont for an aqueous solution of 30 weight percent $SiO_2$ and 0.1 weight percent $Na_2O$;
(d) Mg(Ac)$_2$: magnesium acetate tetrahydrate, Mg(C$_2$H$_3$O$_2$).4H$_2$O;
(e) H$_3$PO$_4$: 85 weight percent aqueous phosphoric acid in water;
(f) TBAOH: tetraethylammonium hydroxide (40 wt.% in water);
(g) Pr$_2$NH: di-n-propylamine,
(h) Pr$_3$NH: tri-n-propylamine;
(i) Quin: Quinuclidine;
(j) MQuin: Methyl Quinuclidine hydroxide, (17.9% in water);
(k) C-hex: cyclohexylamine.
(l) TEAOH: tetraethylammonium hydroxide (40 wt.% in water).
(m) DEEA: Diethylethanolamine;
(n) i-Pr$_2$NH: di-isopropylamine;
(o) TEABr: tetraethylammonium bromide; and
(p) TPAOH: tetrapropylammonium hydroxide (40 wt.% in water).

Preparative Procedures

The MgAPSO compositions may be prepared by preparing reaction mixtures having a molar composition expressed as:

$$eR:fMgO:hAl_2O_3:iP_2O_5:gSiO_2:jH_2O$$

wherein e, f, g, h, i and j represent the moles of template R, magnesium (expressed as the oxide), $SiO_2$, $Al_2O_3$, $P_2O_5$ ($H_3PO_4$ expressed as $P_2O_5$) and $H_2O$, respectively.

The reaction mixtures may be prepared by the following representative procedures, designated hereinafter as Methods A, B and C.

Method A

The reaction mixture is prepared by mixing the ground aluminum source (Al-ipro or CATAPAL) with the $H_3PO_4$ and water on a gradual basis with occasional cooling with an ice bath. The resulting mixture is blended until a homogeneous mixture is observed. When the aluminum source is CATAPAL the water and $H_3PO_4$ is first mixed with the CATAPAL added thereto. The magnesium acetate is dissolved in portion of the water and is then added followed by addition of the LUDOX-LS. The combined mixture is blended until a homogenous mixture is observed. The organic templating agent is added to this mixture and blended until a homogenous mixture is observed. The resulting mixture (final reaction mixture) is placed in a lined (polytetrafluoroethylene) stainless stell pressure vessel and digested at a temperature (150° C. or 200° C.) for an effective time. Alternatively, if the digestion temperature is 100° C. the final reaction mixture is placed in a lined (polytetrafluoroethylene) screw top bottle for a time. Digestions are typically carried out at the autogenous pressure. The products are removed from the reaction vessel, cooled and evaluated as set forth hereinafter.

Method B

When methd B is employed the organic templating agent is di-n-propylamine. The aluminum source, silicon source and one-half of the water are first mixed and blended until a homogeneous mixture is observed. A second solution was prepared by mixing the remaining water, the $H_3PO_4$ and the magnesium acetate. This solution is then added to the above mixture. The magnesium acetate and $H_3PO_4$ solution is then added to the above mixture and blended until a homogeneous mixture is observed. The organic templating agent(s) is then added and the resulting reaction mixture digested and product recovered as is done in Method A.

Method C

Method C is carried out by mixing aluminum isopropoxide, LUDOX LS and water in a blender or by mixing water and aluminum iso-propoxide in a blender followed by addition of the LUDOX LS. H$_3$PO$_4$ and magnesium acetate are then added to this mixture. The organic templating agent is then added to the resulting mixture and digested and product recovered as is done in Method A.

MnAPSO MOLECULAR SIEVES

The MnAPSO molecular sieves of U.S. Ser. No. 600,175, filed Apr. 13, 1984 have a framework structure of MnO$_2^{-2}$, AlO$_2^{-}$, PO$_2^{+}$, and SiO$_2$ tetrahedral units having an empirical chemical composition on an anhydrous basis expressed by the formula:

$$mR:(Mn_wAl_xP_ySi_z)O_2$$

wherein "R" represents at least one organic templating agent present in the intracrystalline pore system; "m" represents the molar amount of "R" present per mole of (Mn$_w$Al$_x$P$_y$Si$_z$)O$_2$ and has a value of zero to about 0.3; and "w", "x", "y" and "z" represent the mole fractions of element manganese, aluminum, phosphorus and silicon, respectively, present as tetrahedral oxides. The mole fractions "w", "x", "y" and "z" are generally defined as being within the limiting compositional values or points as follows:

| Point | Mole Fraction | | |
|---|---|---|---|
| | x | y | (w + z) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

The values of w, x, y and z may be as follows:

| Point | Mole Fraction | | |
|---|---|---|---|
| | x | y | (w + z) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

MnAPSO compositions are generally synthesized by hydrothermal crystallization from a reaction mixture containing reactive sources of manganese, silicon, aluminum and phosphorus, preferably an organic templating, i.e., structure-directing, agent, preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogeneous pressure at a temperature between about 50° C. and about 250° C., and preferably between about 100° C. and about 200° C. until crystals of the MnAPSO product are obtained, usually a period of from several hours to several weeks. Typical effective times of from 2 hours to about 30 days with generally from about 4 hours to about 20 days have been observed. The product is recovered by any convenient method such as centrifugation or filtration.

In synthesizing the MnAPSO compositions, it is preferred to employ a reaction mixture composition expressed in terms of the molar ratios as follows:

$$aR:(Mn_wAl_xP_ySi_z)O_2:bH_2O$$

wherein "R" is an organic templating agnet; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y" and "z" represent the mole fractions of manganese, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (w + z) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that (w+x+y+z)=1.00 mole. Molecular sieves containing manganese, aluminum, phosphorus and silicon as framework tetrahedral oxide units are prepared as follows:

Preparative Reagents

MnAPSO compositions may be prepared by using numerous reagents. Reagents which may be employed to prepare MnAPSOs include:

(a) Alipro: aluminum isopropoxide;
(b) CATAPAL; Trademark of Condea Corporation for hydrated pseudoboehmite;
(c) LUDOX-LS: LUDOX-LS is the tradename of DuPont for an aqueous solution of 30 weight percent SiO$_2$ and 0.1 weight percent Na$_2$O;
(d) H$_3$PO$_4$: 85 weight percent aqueous phosphoric acid;
(e) MnAc: Manganese acetate, Mn(C$_2$H$_3$O$_2$)$_2$.4H$_2$O;
(f) TEAOH: 40 weight percent aqueous solution of tetraethylammonium hydroxide;
(g) TBAOH: 40 weight percent aqueous solution of tetrabutylammonium hydroxide;
(h) Pr$_2$NH: di-n-propylamine, (C$_3$H$_7$)$_2$NH;
(i) Pr$_3$N: tri-n-propylamine (C$_3$H$_7$)$_3$N;
(j) Quin: Quinuclidine, (C$_7$H$_{13}$N);
(k) MQuin: Methyl Quinuclidine hydroxide, (C$_7$H$_{13}$NCH$_3$OH);
(l) C-hex: cyclohexylamine;
(m) TMAOH: tetramethylammonium hydroxide;
(n) TPAOH: tetrapropylammonium hydroxide; and
(o) DEEA: 2-diethylaminoethanol.

Preparative Procedures

MnAPSOs are prepared by forming a starting reaction mixture by adding the H$_3$PO$_4$ to one half of the quantity of water. This mixture is mixed and to this mixture the aluminum isopropoxide or CATAPAL is added. This mixture is then blended until a homogeneous mixture is observed. To this mixture the LUDOX LS is added and the resulting mixture blended (about 2 minutes) until a homogeneous mixture is observed. A second mixture is prepared using the manganese acetate and the remainder (about 50%) of the water. The two mixtures are admixed and the resulting mixture blended until a homogeneous mixture is observed. The organic templating agent is then added to the resulting mixture and the resulting mixture blended until a homogeneous mixture is observed, i.e., about 2 to 4 minutes. (The pH of the mixture is measured and adjusted for temperature). The mixture is then placed in a lined (polytetrafluoroethylene) stainless steel pressure vessel and digested at a temperature (150° C. or 200° C.) for a time or placed in lined screw top bottles for digestion at 100° C. Digestions are typically carried out at the autogenous pressure.

CoAPSO MOLECULAR SIEVES

The CoAPSO molecular sieves of U.S. Ser. No. 600,174, filed Apr. 13, 1984 have three-dimensional microporous framework structures of $CoO_2^{-2}$, $AlO_2^{-}$, $PO_2^{+}$ and $SiO_2$ tetrahedral units and have an empirical chemical composition on an anhydrous basis expressed by the formula $$mR:(Co_wAl_xP_ySi_z)O_2$$

wherein "R" represents at least one organic templating agent present in the intracrystalline pore system; "m" represents the molar amount of "R" present per mole of $(Co_wAl_xP_ySi_z)O_2$ and has a value of from zero to about 0.3; and "w", "x", "y" and "z" represent the mole fractions of cobalt, aluminum, phosphorus and silicon, respectively, present as tetrahedral oxides, where the mole fractions "w", "x", "y" and "z" are each at least 0.01 and are generally defined, as being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the CoAPSO molecular sieves the values of "w", "x", "y", and "z" in the above formula are within the limiting compositional values or points as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

CoAPSO compositions are generally synthesized by hydrothermal crystallization from a reaction mixture containing reactive sources of cobalt, silicon, aluminum and phosphorus, an organic templating, i.e., structure-directing, agent, preferably a compound of an element of Group VA of the Periodic Table, and optionally an alkali metal. The reaction mixture is generally placed in a sealed pressure vessel, preferably lined with an inert plastic material such as polytetrafluoroethylene and heated, preferably under autogenous pressure at an effective temperature which is generally between 50° C. and 250° C. and preferably between 100° C. and 200° C. until crystals of the CoAPSO product are obtained, usually for an effective time of from several hours to several weeks. Generally the effective crystallization time will be from about 2 hours to about 30 days and typically from about 4 hours to about 20 days. The product is recovered by any convenient method such as centrifugation or filtration.

In synthesizing the CoAPSO, it is preferred to employ a reaction mixture composition expressed in terms of the molar ratios as follows:

$$aR:(Co_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and 300; and "w", "x", "y" and "z" represent the mole fractions of cobalt, aluminum, phosphorus and silicon, respectively, and each has a value of at least 0.01. In a preferred embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that (w+x+y+z)=1.00 mole. Molecular sieves containing cobalt, aluminum, phosphorus and silicon as framework tetrahedral oxide units are prepared as follows:

Preparative Reagents

CoAPSO compositions may be prepared using numerous reagents. Reagents which may be employed to prepared CoAPSOs include:
(a) Alipro: aluminum isoproproxide;
(b) CATAPAL: Trademark of Condea Corporation for pseudoboehmite;
(c) LUDOX-LS: Trademark of DuPont for an aqueous solution of 30 weight percent $SiO_2$ and 0.1 weight percent $Na_2O$;
(d) Co(Ac)$_2$: cobalt acetate $Co(C_2H_3O_2)_2.4H_2O$;
(e) CoSO$_4$: cobalt sulfate $(CoSO_4.7H_2O)$;
(f) H$_3$PO$_4$: 85 weight percent phosphoric acid in water;
(g) TBAOH: tetrabutylammonium hydroxide (25 wt % in methanol);
(h) Pr$_2$NH: di-n-propylamine, $(C_3H_7)_2NH$;
(i) Pr$_3$N: tri-n-propylamine, $(C_3H_7)_3N$;
(j) Quin: Quinuclidine $(C_7H_{13}N)$;
(k) MQuin: Methyl Quinuclidine hydroxide, $(C_7H_{13}NCH_3OH)$;
(l) C-hex; cyclohexylamine;

(m) TEAOH: tetraethylammonium hydroxide (40 wt. % in water);
(n) DEEA: diethanolamine;
(o) TPAOH: tetrapropylammonium hydroxide (40 wt. % in water); and
(p) TMAOH: tetramethylammonium hydroxide (40 wt. % in water).

Preparative Procedure

CoAPSO compositions may be prepared by preparing reaction mixtures having a molar composition expressed as:

$$eR:fCoO:hAl_2O_3:iP_2O_5:gSiO_2:jH_2O$$

wherein e, f, h, i, g and j represent the moles of template R, cobalt (expressed as the oxide), $Al_2O_3$, $P_2O_5$ ($H_3PO_4$ expressed as $P_2O_5$), $SiO_2$ and $H_2O$, respectively.

The reaction mixtures are prepared by forming a starting material mixture comprising the $H_3PO_4$ and one half of the water. This mixture is stirred and the aluminum source (Alipro or CATAPAL) added. The resulting mixture is blended until a homogeneous mixture is observed. The LUDOX-LS is then added to the resulting mixture and the new mixture blended until a homogeneous mixture is observed. The cobalt source (e.g., $Co(Ac)_2$, $Co(SO_4)$ or mixtures thereof) is dissolved in the remaining water and combined with the first mixture. The combined mixture is blended until a homogeneous mixture is observed. The organic templating agent is added to this mixture and blended for about two to four minutes until a homogeneous mixture is observed. The resulting mixture (final reaction mixture) is placed in a lined (polytetrafluoroethylene) stainless steel pressure vessel and digested at a temperature (150° C., 200° C. or 225° C.) for a time. Digestions are typically carried out at the autogenous pressure. The products are removed from the reaction vessel and cooled.

ZnAPSO MOLECULAR SIEVES

The ZnAPSO molecular sieves of U.S. Ser. No. 600,170, filed Apr. 13, 1984 comprises framework structures of $ZnO_2^{-2}$, $AlO_2^{-}$, $PO_2^{+}$ and $SiO_2$ tetrahedral units having an empirical chemical composition on an anhydrous basis expressed by the formula:

$$mR:(Zn_wAl_xP_ySi_z)O_2$$

wherein "R" represents at least one organic templating agent present in the intracrystalline pore system; "m" represents the molar amount of "R" present per mole of $(Zn_wAl_xP_ySi_z)O_2$ and has a value of zero to about 0.3; and "w", "x", "y" and "z" represent the mole fractions of zinc, aluminum, phosphorus and silicon, respectively, present as tetrahedral oxides and each has a value of at least 0.01. The mole fractions "w", "x", "y" and "z" are generally defined being within the limiting compositional values or points as follows:

| Point | Mole Fraction | | |
|-------|------|------|---------|
|       | x    | y    | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of ZnAPSO molecular sieves the values "w", "x", "y" and "z" in the above formula are within the limiting compositional values or points as follows:

| Point | Mole Fraction | | |
|-------|------|------|---------|
|       | x    | y    | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

ZnAPSO compositions are generally synthesized by hydrothermal crystallization at effective process conditions from a reaction mixture containing active sources of zinc, silicon, aluminum and phosphorus, preferably an organic templating, i.e., structure-directing, agent, preferably a compound of an element or Group VA of the Periodic Table, and/or optionally an alkali of other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the ZnAPSO product are obtained, usually a period of from several hours to several weeks. Generally the effective crystallization period is from about 2 hours to about 30 days with typical periods of from about 4 hours to about 20 days being employed to obtain ZnAPSO products. The product is recovered by any convenient method such as centrifugation or filtration.

In synthesizing the ZnAPSO compositions, it is preferred to employ a reaction mixture composition expressed in terms of the molar ratios as follows:

$$aR:(Zn_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, more preferably between about 2 and about 300; and "w", "x", "y" and "z" represent the mole fractions of zinc, aluminum, phosphorus and silicon, respectively, and each has a value of at least 0.01. In a preferred embodiment the reaction mixture is selected such that the mole fractions "w", "x", "y" and "z" are generally defined as being within the limiting compositional values or points as follows:

| Point | Mole Fraction | | |
|-------|------|------|---------|
|       | x    | y    | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ mole. Molecular sieves containing zinc, aluminum, phosphorus and silicon as framework tetrahedral oxide units are prepared as follows:

Preparative Reagents

ZnAPSO compositions are typically prepared using numerous reagents. Reagents which may be employed to prepare ZnAPSOs include:

(a) Alipro: aluminum isopropoxide;
(b) LUDOX-LS: LUDOX-LS is the trade name of DuPont for an aqueous solution of 30 weight percent $SiO_2$ and 0.1 weight percent $Na_2O$;
(c) CATAPAL: Trademark of Condea Corporation for hydrated pseudoboehmite;
(d) $H_3PO_4$: 85 weight percent aqueous phosphoric acid;
(e) ZnAc: Zinc Acetate, $Zn(C_2H_3O_2)_2 \cdot 4H_2O$;
(f) TEAOH: 40 weight percent aqueous solution of tetraethylammonium hydroxide;
(g) TBAOH: 40 weight percent aqueous solution of tetrabutylammonium hydroxide;
(h) TMAOH: Tetramethylammonium hydroxide pentahydrate, $(CH_3)_4NOH \cdot 5H_2O$;
(i) TPAOH: 40 weight percent aqueous solution of tetrapropylammonium hydroxide, $(C_3H_7)_4NOH$;
(j) $Pr_2NH$: di-n-propylamine, $(C_3H_7)_2NH$;
(k) $Pr_3N$: Tri-n-propylamine, $(C_3H_7)_3NH$;
(l) Quin: Quinuclidine, $(C_7H_{13}N)$;
(m) C-hex: cyclohexylamine; and
(n) DEEA: diethylethanolamine, $(C_2H_5)_2NC_2H_5OH$.

Preparative Procedure

ZnAPSO compositions are typically prepared by forming reaction mixtures having a molar composition expressed as:

$$eR:fZnO:gAl_2O_3:hP_2O_5:iSiO_2:jH_2O$$

wherein e, f, g, h, i and j represent the moles of template R, zinc (expressed as the oxide), $Al_2O_3$, $P_2O_5$ ($H_3PO_4$ expressed as $P_2O_5$), $SiO_2$ and $H_2O$, respectively.

The reaction mixtures are generally prepared by forming a starting reaction mixture comprising the $H_3PO_4$ and a portion of the water. This mixture is stirred and the aluminum source added. The resulting mixture is blended until a homogeneous mixture is observed. The LUDOX LS is then added to the resulting mixture and the new mixture blended until a homogeneous mixture is observed. The zinc source (zinc acetate) is dissolved in the remaining water and combined with the first mixture. The combined mixture is blended until a homogenous mixture is observed. The organic templating agent is added to this mixture and blended for about two to four minutes until a homogenous mixture is observed. The resulting mixture (final reaction mixture) is placed in a lined (polytetrafluoroethylene) stainless steel pressure vessel and digested at an effective temperature for an effective time. Digestions are typically carried out at the autogenous pressure. The products are removed from the reaction vessel and cooled.

FeAPSO MOLECULAR SIEVES

The FeAPSO of U.S. Ser. No. 600,173, filed Apr. 13, 1984 have molecular sieves having a three-dimensional microporous crystal framework structures of $FeO_2^{-2}$ (and/or $FeO_2^{-}$), $AlO_2^{-}$, $PO_2^{+}$ and $SiO_2$ tetrahedral oxide units and having a unit empirical formula, on an anhydrous basis, of:

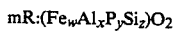

$$mR:(Fe_wAl_xP_ySi_z)O_2 \quad (1)$$

wherein "R" represents at least one organic templating agent present in the intracrystalline pore system; "m" represents the moles of "R" present per mole of $(Fe_wAl_xP_ySi_z)O_2$ and has a value of from zero (0) to about 0.3; the maximum value of "m" in each case depends upon the molecular dimensions of the templating agent and the available void volume of the pore system of the particular molecular sieve involved; and "w", "x", "y" and "z" represent the mole fractions of iron, aluminum, phosphorus and silicon, respectively, present as tetrahedral oxides, said mole fractions being such that they are within the limiting compositional values or points as follows:

| Point | Mole Fraction | | |
|-------|------|------|---------|
|       | x    | y    | (z + w) |
| A     | 0.60 | 0.38 | 0.02    |
| B     | 0.38 | 0.60 | 0.02    |
| C     | 0.01 | 0.60 | 0.39    |
| D     | 0.01 | 0.01 | 0.98    |
| E     | 0.60 | 0.01 | 0.39    |

The values of w, x, y and z may be as follows:

| Point | Mole Fraction | | |
|-------|------|------|---------|
|       | x    | y    | (z + w) |
| a     | 0.55 | 0.43 | 0.02    |
| b     | 0.43 | 0.55 | 0.02    |
| c     | 0.10 | 0.55 | 0.35    |
| d     | 0.55 | 0.10 | 0.35    |

The FeAPSOs of the instant invention are generally synthesized by hydrothermal crystallization from a reaction mixture comprising reactive sources of iron, aluminum, phosphorus and silicon, and preferably one or more organic templating agents. Optionally, alkali or other metal(s) may be present in the reaction mixture and may act as templating agents. The reaction mixture is generally placed in a pressure vessel, preferably lined with an inert plastic material, such as polytetrafluoroethylene, and heated, preferably under the autogenous pressure, at an effective temperature which is generally between about 50° C., and about 250° C. and preferably between about 100° C. and 200° C. until crystals of the FeAPSO product are obtained, usually a period of from several hours to several weeks. Molecular sieves containing iron, aluminum phosphorus and silicon as framework tetrahedral oxide units are typically prepared as follows:

Preparative Reagents

FeAPSO compositions may be prepared using numerous reagents. Reagents which may employed to prepare FeAPSOs include:

(a) Alipro: aluminum isopropoxide, $Al(OCH(CH_3)_2)_3$;
(b) LUDOX-LS: LUDOX-LS is the trademark of Du Pont for an aqueous solution of 30 weight percent $SiO_2$ and 0.1 weight percent $Na_2O$;
(c) CATAPAL: trademark for hydrated aluminum oxide containing about 75 wt. % $Al_2O_3$ (pseudoboehmite phase) and about 25 wt. percent water.
(c) $Fe(Ac)_2$: Iron (II) acetate;
(d) $FeSO_4$: Iron (II) sulfate hexahydrate;
(e) $H_3PO_4$: 85 weight percent phosphoric acid in water;
(f) TEAOH: 40 weight percent aqueous solution of tetraethylammonium hydroxide;
(g) TBAOH: 40 weight percent aqueous solution of tetrabutylammonium hydroxide;

(h) Pr₂NH: di-n-propylamine ((C₃H₇)₂NH);
(i) Pr₃N: tri-n-propylamine ((C₃H₇)₃N);
(j) Quin: Quinuclidine (C₇H₁₃N);
(k) MQuin: Methyl Quinuclidine hydroxide (C₇H₁₃NCH₃OH);
(l) TMAOH: tetramethylammonium hydroxide pentahydrate; and
(m) C-hex; cyclohexylamine.

(a) Reaction mixtures to prepare FeAPSOs are typically prepared by grinding an aluminum isopropoxide in a blender followed by slowly adding a H₃PO₄ solution with mixing. A solution/dispersion of iron acetate in water is added and then a silica (e.g., LUDOX-LS) is added. The organic templating agent is then added to this mixture, or in some cases one-half of this mixture, and the mixture blended to form a homogeneous mixture. For example, in one embodiment, the number of moles of each component in the reaction mixture is as follows:

| Component | Moles |
|---|---|
| Al₂O₃ | 0.9 |
| P₂O₅ | 0.9 |
| SiO₂ | 0.2** |
| FeO* | 0.2 |
| TEAOH | 1.0 |
| H₂O | 50 |

*Iron (II) acetate reported as Iron (II) oxide.
**SiO₂ was 0.6 in examples 5C to 8C The reaction mixture is sealed in a stainless steel pressure vessel lined with polytetrafluoroethylene and heated in an oven at a temperature, time and at the autogenous pressure. The solid reaction product is recovered by filtration, washed with water and dried at room temperature.

In another embodiment, reaction mixtures are prepared by grinding the aluminum isopropoxide in a blender followed by addition of a solution/dispersion of iron (II) acetate. H₃PO₄ is added to this mixture and the resulting mixture blended to form a homogeneous mixture. A silica (e.g., LUDOX-LS) is added to this mixture except that in some instances the silica may be added with the H₃PO₄. The resulting mixtures were blended until a homogeneous mixture is observed. Organic templating agent is added to each mixture and the resulting mixtures placed in a stainless steel pressure vessel lined with polytetrafluoroethylene and heated, washed and the product recovered. In this embodiment the number of moles of each component in the reaction mixture is as follows:

| Component | Moles |
|---|---|
| Al₂O₃ | 0.9 |
| P₂O₅ | 0.9 |
| SiO₂ | 0.2 |
| FeO* | 0.2 |
| Template | 1.0 |
| H₂O | 50 |

*Iron (II) acetate reported as Iron (II) oxide.

CoMnAPSO MOLECULAR SIEVES

CoMnAPSO molecular sieves may be expressed by the empirical chemical formula (anhydrous) as follows:

$$mR:(Co_uMn_vAl_xP_ySi_z)O_2$$

where "u", "v", "x", "y" and "z" represent the mole. The CoMnAPSO molecular sieves have an empirical chemical composition on an anhydrous basis expressed by the formula:

$$mR:(Co_uMn_vAl_xP_ySi_z)O_2$$

wherein "R" represents at least one organic templating agent present in the intracrystalline pore system; "m" represents the molar amount of "R" present per mole of $(Co_uMn_vAl_xP_ySi_z)O_2$ from zero (0) to about 0.3; and "u", "v", "x", "y" and "z" represent the mole fractions of cobalt, manganese, aluminum, phosphorus and silicon, respectively, present as tetrahedral oxides. The mole fractions "u", "v", "x", "y", and "z" are generally defined as being within the limiting compositional values or points as follows, wherein "w", the combined mole fractions of manganese and cobalt, is the sum of "u" and "v":

| Point | Mole Fraction | | |
|---|---|---|---|
| | x | y | (z + w) |
| A | 0.60 | 0.37 | 0.03 |
| B | 0.37 | 0.60 | 0.03 |
| C | 0.01 | 0.60 | 0.39 |
| D | 0.01 | 0.01 | 0.98 |
| E | 0.60 | 0.01 | 0.39 |

Preferably the mole fractions u, v, x, y and z will fall within the limiting compositional values or points as follows:

| | Mole Fraction | | |
|---|---|---|---|
| | x | y | (z + w) |
| a | 0.55 | 0.42 | 0.03 |
| b | 0.42 | 0.55 | 0.03 |
| c | 0.10 | 0.55 | 0.35 |
| d | 0.55 | 0.10 | 0.35 |

CoMnAPSO compositions are generally synthesized by hydrothermal crystallization from a reaction mixture containing reactive sources of cobalt, manganese, aluminum, phosphorus and silicon and preferably an organic templating agent, i.e., structure-directing, agent. The structure-directing agents are preferably a compound of an element of Group VA of the Periodic Table, and may be an alkali or other metal. The reaction mixture is generally placed in a sealed pressure vessel, preferably lined with an inert plastic material such as polytetrafluoroethylene and heated, preferably under autogenous pressure and at typical effective temperatures between 50° C. and 250° C., preferably between 100° C. and 200° C., until crystals of the CoMnAPSO product are obtained, usually over a period of from several hours to several weeks. Typical effective crystallization times are from about 2 hours to 30 days with from about 4 hours to about 20 days being generally employed to obtain CoMnAPSO products. The product is recovered by any convenient method such as centrifugation or filtration.

In synthesizing the CoMnAPSO compositions, it is preferred to employ a reaction mixture composition expressed in terms of the molar ratios as follows:

$$aR:(Co_uMn_vAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "u", "v", "x", "y", and "z" represent the mole fractions of elements cobalt, manganese, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

|   | Mole Fraction | | |
|---|---|---|---|
|   | x | y | (z + w) |
| F | 0.60 | 0.37 | 0.03 |
| G | 0.37 | 0.60 | 0.03 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "u", "v", "x", "y" and "z" such that (u+v+x+y+z)=1.00 mole. CoMnAPSO compositions were prepared using numerous regents.

Reagents which may be employed to prepare CoMnAPSOs include:
(a) Alipro: aluminum isopropoxide;
(b) LUDOX-LS: LUDOX-LS is the tradename of DuPont for an aqueous solution of 30 weight percent $SiO_2$ and 0.1 weight percent $Na_2O$;
(c) $H_3PO_4$: 85 weight percent phosphoric acid;
(d) MnAc: Manganese acetate, $Mn(C_2H_3O_2)_2 \cdot 4H_2O$;
(e) CoAc: Cobalt Acetate; $Co(C_2H_3O_2)_2 \cdot 4H_2O$;
(f) TEAOH: 40 weight percent aqueous solution of tetraethylammonium hydroxide; and
(g) $Pr_2NH$: di-n-propylamine, $(C_3H_7)_2NH$.

Preparative Procedures

CoMnAPSOs may be prepared by forming a starting reaction mixture by adding $H_3PO_4$ and one half of the quantity of water. To this mixture an aluminum isopropoxide is added. This mixture is then blended until a homogeneous mixture is observed. To this mixture a silica (e.g., LUDOX-LS) is added and the resulting mixture blended (about 2 minutes) until a homogeneous mixture is observed. A second mixture is prepared using manganese acetate and one half of the remained water. A third mixture is prepared using cobalt acetate and one half of the remaining water. The three mixtures are admixed and the resulting mixture blended until a homogeneous mixture is observed. The organic templating agent is then added to the resulting mixture and the resulting mixture blended until a homogeneous mixture is observed, i.e., about 2 to 4 minutes. The pH of the mixture is measured and adjusted for temperature. The mixture is then placed in a lined (polytetrafluoroethylene) stainless steel pressure vessel and digested at a temperature. Digestions are typically carried out at the autogenous pressure.

CoMnMgAPSO MOLECULAR SIEVES

The CoMnMgAPSO molecular sieves of U.S. Ser. No. 600,182, filed Apr. 13, 1984 have three-dimensional microporous framework structures of $CoO_2^{-2}$, $MgO_2^{-2}$, $MgO_2^{-2}$, $AlO_2^{-}$, $PO_2^{+}$ and $SiO_2$ tetrahedral oxide units and have an empirical chemical composition on an anhydrous basis expressed by the formula:

$$mR:(Co_tMn_uMg_vAl_xP_ySi_z)O_2$$

wherein "R" represents at least one organic templating agent present in the intracrystalline pore system; "m" represents the molar amount of "R" present per mole of $(Co_tMn_uMg_vAl_xP_ySi_z)O_2$, and has a value of from zero to about 0.3; and "t", "u", "v", "x", "y" and "z" represent the mole fractions of cobalt, manganese, magnesium, aluminum, phosphorus and silicon, respectively, present as tetrahedral oxides, each having a value of at least 0.01. The mole fractions "t", "u", "v", "x", "y" and "z" are generally defined as being within the limiting compositional values or points as follows, wherein "w", the combined mole fractions of cobalt, manganese and magnesium, is the sum of "t", "u" and "v":

|   | Mole Fraction | | |
|---|---|---|---|
| Point | x | y | (z + w) |
| A | 0.60 | 0.36 | 0.04 |
| B | 0.36 | 0.60 | 0.04 |
| C | 0.01 | 0.60 | 0.39 |
| D | 0.01 | 0.01 | 0.98 |
| E | 0.60 | 0.01 | 0.39 |

In a preferred subclass of the CoMnMgAPSO molecular sieves the values of "w", "x", "y" and "z" in the above formula are within the limiting compositional values or points as follows:

|   | Mole Fraction | | |
|---|---|---|---|
| Point | x | y | (z + w) |
| a | 0.55 | 0.41 | 0.04 |
| b | 0.41 | 0.55 | 0.04 |
| c | 0.10 | 0.55 | 0.35 |
| d | 0.55 | 0.10 | 0.35 |

CoMnMgAPSO compositions are generally synthesized by hydrothermal crystallization from a reaction mixture containing reactive sources of cobalt, manganese, magnesium, aluminum, phosphorus and silicon, and preferably an organic templating agent, i.e., structure-directing, agent. The structure-directing agents are preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the CoMnMgAPSO product are obtained, usually over a period of from several hours to several weeks. Typical crystallization times are from about 2 hours to about 30 days with from about 4 hours to about 20 days generally being employed to obtain CoMnMgAPSO products. The product is recovered by any convenient method such as centrifugation or filtration.

In synthesizing the CoMnMgAPSO compositions, it is preferred to employ a reaction mixture composition expressed in terms of the molar ratios as follows:

$$aR:(Co_tMn_uMg_vAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6 and more preferably from greater than zero to about 2; "b" has a value of from zero (0) to about 500, preferably between about 2 and about 300; and "t", "u", "v", "x", "y", and "z" represent the mole fractions of cobalt, manganese, magnesium, aluminum, phosphorus and silicon, respectively, and each has a value of at least 0.01.

In a preferred embodiment the reaction mixture is selected such that the mole fractions "w", "x", "y" and "z", where "w" is the sum of "t"+"u"+"v", are generally defined as being within the limiting compositional values or points as follows:

| Point | Mole Fraction | | |
|-------|------|------|---------|
|       | x    | y    | (z + w) |
| F     | 0.60 | 0.36 | 0.04    |
| G     | 0.36 | 0.60 | 0.04    |
| H     | 0.01 | 0.60 | 0.39    |
| I     | 0.01 | 0.01 | 0.98    |
| J     | 0.60 | 0.01 | 0.39    |

In the foregoing expression of the reaction composition, the reactants are normalized with respect to the total of "t", "u", "v", "x", "y" and "z" such that (t+u+v+x+y+z)=1.00 mole. Molecular sieves containing cobalt, manganese, magnesium, aluminum, phosphorus and silicon as framework tetrahedral oxide units are prepared as follows:

Preparative Reagents

CoMnMgAPSO compositions may be prepared by using numerous reagents. Reagents which may be employed to prepare CoMnAPSOs include:

(a) Alipro: aluminum isopropoxide;
(b) LUDOX-LS: LUDOX-LS is the tradename of Du Pont for an aqueous solution of 30 weight percent SiO$_2$ and 0.1 weight percent Na$_2$O;
(c) H$_3$PO$_4$: aqueous solution which is 85 weight percent phosphoric acid;
(d) MnAc: Manganese acetate, Mn(C$_2$H$_3$O$_2$)$_2$.4H$_2$O;
(e) CoAc: Cobalt Acetate, Co(C$_2$H$_3$O$_2$)$_2$.4H$_2$O;
(f) MgAc: Magnesium Acetate Mg(C$_2$H$_3$O$_2$).4H$_2$O;
(g) TEAOH: 40 weight percent aqueous solution of tetraethylammonium hydroxide; and
(h) Pr$_2$NH: di-n-propylamine, (C$_3$H$_7$)$_2$NH.

Preparative Procedures

CoMnMgAPSOs may be prepared by forming a starting reaction mixture by adding H$_3$PO$_4$ and one half of the quantity of water. To this mixture an aluminum isoproxide is added. This mixture is then blended until a homogeneous mixture is observed. To this mixture a silica (e.g., LUDOX-LS) is added and the resulting mixture blended (about 2 minutes) until a homogeneous mixture is observed.

Three additional mixtures are prepared using cobalt acetate, magnesium acetate and manganese acetate using one third of the remainder of the water for each mixture. The four mixtures are then admixed and the resulting mixture blended until a homogeneous mixture is observed. An organic templating agent is then added to the resulting mixture and the resulting mixture blended until a homogeneous mixture is observed, i.e., about 2 to 4 minutes. The mixture is then placed in a lined (polytetrafluoroethylene) stainless steel pressure vessel and digested at a temperature for a time. Digestions are typically carried out at the autogenous pressure.

MeAPO MOLECULAR SIEVES

MeAPO molecular sieves are crystalline microporous aluminophosphates in which the substituent metal is one of a mixture of two or more divalent metals of the group magnesium, manganese, zinc and cobalt and are disclosed in U.S. Pat. No. 4,567,029. Members of this novel class of compositions have a three-dimensional microporous crystal framework structure of MO$_2^{-2}$, AlO$_2^-$ and PO$_2^+$ tetrahedral units and have an essential empirical chemical composition, on an anhydrous basis, of:

mR:(M$_x$Al$_y$P$_z$)O$_2$ wherein "R" represents at least one organic templating agent present in the intracrystalline pore system; "m" represents the moles of "R" present per mole of (M$_x$Al$_y$P$_z$)O$_2$ and has a value of from zero to 0.3, the maximum value in each case depending upon the molecular dimensions of the templating agent and the available void volume of the pore system of the particular metal aluminophosphate involved; "x", "y", and "z" represent the mole fractions of the metal "M", (i.e., magnesium, manganese, zinc and cobalt), aluminum and phosphorus, respectively, present as tetrahedral oxides, said mole fractions being such that they are representing the following values for "x", "y", and "z":

| Point | Mole Fraction | | |
|-------|------|------|------|
|       | x    | y    | z    |
| A     | 0.01 | 0.60 | 0.39 |
| B     | 0.01 | 0.39 | 0.60 |
| C     | 0.35 | 0.05 | 0.60 |
| D     | 0.35 | 0.60 | 0.05 |

When synthesized the minimum value of "m" in the formula above is 0.02. In a preferred subclass of the metal aluminophosphates of this invention, the values of "x", "y" and "z" in the formula above are representing the following values for "x", "y" and "z":

| Point | Mole Fraction | | |
|-------|------|------|------|
|       | x    | y    | z    |
| a     | 0.01 | 0.52 | 0.47 |
| b     | 0.01 | 0.39 | 0.60 |
| c     | 0.25 | 0.15 | 0.60 |
| d     | 0.25 | 0.40 | 0.35 |

The as-synthesized compositions are capable of withstanding 350° C. calcination in air for extended periods, i.e., at least 2 hours, without becoming amorphous. While it is believed that the M, Al and P framework constituents are present in tetrahedral coordination with oxygen, it is theoretically possible that some minor fraction of these framework constituents are present in coordination with five or six oxygen atoms. It is not, moreover, necessarily the case that all of the M, Al and/or P content of any given synthesized product be a part of the framework in the aforesaid types of coordination with oxygen. Some of each constituent may be merely occluded or in some as yet undetermined form and may or may not be structurally significant.

Since the term "metal aluminophosphate" is somewhat cumbersome, particularly in view of the need for numerous repetitions thereof in describing such compositions, the "short-hand" reference "MeAPO" is employed hereinafter. Also in those cases where the metal "Me" in the composition is magnesium, the acronym MAPO is applied to the composition. Similarly, ZAPO, MnAPO, and CoAPO are applied to the compositions which contain zinc, manganese and cobalt, respectively. To identify the various structural species which make up each of the subgeneric classes MAPO, ZAPO, CoAPO and MnAPO, each species is assigned a number and is identified, for example, as ZAPO-5, MAPO-11, CoAPO-11 and so forth.

The term "essential empirical chemical composition" is meant to include the crystal framework and can include any organic templating agent present in the pore system, but does not include alkali metal or other ions which can be present by virtue of being contained in the reaction mixture or as a result of post-synthesis ion-exchange. Such ionic species, when present, function primarily as charge-balancing ions for $AlO_2^-$ and/or $MO_2^{-2}$ tetrahedra not associated with $PO_2^+$ tetrahedra or an organic ion derived from the organic templating agent.

The metal aluminophosphates ("MeAPOs") are synthesized by hydrothermal crystallization from a reaction mixture containing reactive sources of the metal "M", alumina and phosphate, an organic templating, i.e., structure-directing, agent, preferably a compound of an element of Group VA of the Periodic Table, and optionally an alkali metal. The reaction mixture is placed in a sealed pressure vessel, preferably lined with an inert plastic material such as polytetrafluoroethylene and heated, preferably under autogenous pressure at a temperature between 100° C. and 225° C., and preferably between 100° C. and 200° C. until crystals of the metal aluminophosphate product are obtained, usually a period of from 4 hours to 2 weeks. The product is recovered by any convenient method such as centrifugation or filtration.

In synthesizing the MeAPO compositions, it is preferred to employ a reaction mixture composition expressed in terms of molar ratios as follows:

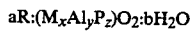

$$aR:(M_xAl_yP_z)O_2:bH_2O$$

wherein "R" is an organic templating agent; "a" has a value great enough to constitute an effective concentration of "R" and is within the range of >0 to 6; "b" has a value of from zero to 500, preferably 2 to 30; "M" represents a metal of the group zinc, magnesium, manganese and cobalt, "x", "y" and "z" reprsent the mole fractions, respectively, of "M", aluminum and phosphorus in the $(M_xAl_yP_z)O_2$ constituent, and each has a value of at least 0.01, the said points E, F, G, H, I, and J representing the following values for "x", "y" and "z":

| Point | Mole Fraction | | |
|---|---|---|---|
| | x | y | z |
| E | 0.01 | 0.70 | 0.29 |
| F | 0.01 | 0.29 | 0.70 |
| G | 0.29 | 0.01 | 0.70 |
| H | 0.40 | 0.01 | 0.59 |
| I | 0.40 | 0.59 | 0.01 |

| Point | Mole Fraction | | |
|---|---|---|---|
| | x | y | z |
| J | 0.29 | 0.70 | 0.01 |

In the foregoing expression of the reaction composition, the reactants are normalized with respect to a total of $(M+Al+P) = (x+y+z) = 1.00$ mole.

In forming the reaction mixture from which the metal aluminophosphates are crystallized the organic templating agent can be any of those heretofore proposed for use in the synthesis of conventional zeolite aluminosilicates and microporous aluminophosphates. In general these compounds contain elements of Group VA of the Periodic Table of Elements, particularly nitrogen, phosphorus, arsenic and antimony, preferably N or P and most preferably N, which compounds also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents can either produce mixtures of the desired metal aluminophosphates or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; di-n-propylamine; tripropylamine; triethylamine; triethanolamine; piperidine; cyclohexylamine; 2-methylpyridine; N,N-dimethylbenzylamine; N-N-dimethylethanolamine; choline; N,N'-dimethylpiperazine; 1,4-diazabicyclo(2,2,2)octane; N-methyldiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo(2,2,2)octane ion; di-n-butylamine, neopentylamine; di-n-pentylamine; isopropylamine; t-butylamine; ethylenediamine; pyrrolidine; and 2-imidazolidone. Not every templating agent will direct the formation of every species of metal aluminophosphate (MeAPO), i.e., a single templating agent can, with proper manipulation of the reaction conditions, direct the formation of several MeAPO compositions, and a given MeAPO composition can be produced using several different templating agents.

The preferred phosphorus source is phosphoric acid, but organic phosphates such as triethylphosphate have been found satisfactory, and so also have crystalline or amorphous aluminophosphates such as the AlPO4 composition of U.S. Pat. No. 4,310,440. Organo-phosphorus compounds, such as tetrabutylphosphonium bromide do not, apparently serve as reactive sources of phosphorus, but these compounds do function as templating agents. Conventional phosphorus salts such as sodium metaphosphate, may be used, at least in part, as the phosphorus source, but are not preferred.

The aluminum source is preferably either an aluminum alkoxide, such as aluminum isoproproxide, or pseudoboehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

The metals zinc, cobalt, magnesium and manganese can be introduced into the reaction system in any form which permits the formation in situ of reactive divalent ions of the respective metals. Advantageously salts, oxides or hydroxides of the metals are employed such as cobalt chloride hexahydrate, alpha cobaltous iodide, cobaltous sulfate, cobalt acetate, cobaltous bromide, cobaltous chloride, zinc acetate, zinc bromide, zinc formate, zinc iodide, zinc sulfate heptahydrate, magnesium acetate, magnesium bromide, magnesium chloride, magnesium iodide, magnesium nitrate, magnesium sulfate, manganous acetate, manganous bromide, manganous sulfate, and the like.

While not essential to the synthesis of MeAPO compositions, it has been found that in general, stirring or other moderate agitation of the reaction mixture and/or seeding the reaction mixture with seed crystals of either the MeAPO species to be produced or a topologically similar aluminophosphate or aluminosilicate composition, facilitates the crystallization procedure.

After crystallization the MeAPO product is isolated and advantageously washed with water and dried in air. The as-synthesized MeAPO contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular MeAPO species. As a general rule, the templating agent, and hence the occluded organic species, is too large to move freely through the pore system of the MeAPO product and must be removed by calcining the MeAPO at temperatures of 200° C. to 700° C. to thermally degrade the organic species. In a few instances the pores of the MeAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein and in the claims does not include the condition of the MeAPO phase wherein the organic moiety occupying the intracrystalline pore system as a result of the hydrothermal crystallization process has been reduced by post-synthesis treatment such that the value of "m" in the composition formula $mR:(M_xAl_yP_z)O_2$ has a value of less than 0.02. The other symbols of the formula are as defined hereinabove. In those preparations in which an aluminum alkoxide is employed as the source of aluminum, the corresponding alcohol is necessarily present in the reaction mixture since it is a hydrolysis product of the alkoxide. It has not been determined whether this alcohol participates in the syntheses process as a templating agent. For the purposes of this application, however, this alcohol is arbitrarily omitted from the class of templating agents, even if it is present in the as-synthesized MeAPO material.

Since the MeAPO compositions are formed from $AlO_2$, $PO_2$, and $MO_2$ tetrahedral units which, respectively, have a net charge of $-1$, $+1$, and $-2$, the matter of cation exchangeability is considerably more complicated than in the case of zeolitic molecular sieves in which, ideally, there is a stoichiometric relationship between $AlO_2$ tetrahedra and charge-balancing cations. In the MeAPO compositions, an $AlO_2^-$ tetrahedron can be balanced electrically either by association with a $PO_2^+$ tetrahedron or a simple cation such as an alkali metal cation, a cation of the metal "M" present in the reaction mixture, or an organic cation derived from the templating agent. Similarly an $MO_2^{-2}$ tetrahedron can be balanced electrically by assocation with $PO_2^+$ tetrahedra, a cation of the metal "M", organic cations derived from the templating agent, or other divalent or polyvalent metal cations introduced from an extraneous source. It has also been postulated that non-adjacent $AlO_2^-$ and $PO_2^+$ tetrahedral pairs can be balanced by $Na^+$ and $OH^-$, respectively [Flanigen and Grose, Molecular Sieve Zeolites-I, ACS, Washington, D.C. (1971)].

FAPO MOLECULAR SIEVES

Ferroaluminophosphates are disclosed in U.S. Pat. No. 4,554,143, incorporated herein by reference, and have a three-dimensional microporous crystal framework structure of $AlO_2$, $FeO_2$, and $PO_2$ tetrahedral units and have an essential empirical chemical composition, on an anhydrous basis, of:

$mR:(Fe_xAl_yP_z)O_2$ wherein "R" represents at least one organic templating agent present in the intracrystalline pore system; "m" represents the moles of "R" present per mole of $(Fe_xAl_yP_z)O_2$ and has a value of from zero to 0.3, the maximum value in each case depending upon the molecular dimensions of the templating agent and the available void volume of the pore system of the particular ferroaluminophosphate involved; "x", "y", and "z" represent the mole fractions of iron, aluminum and phosphorus, respectively, present as tetrahedral oxides, representing the following values for "x", "y", and "z":

| Point | Mole Fraction | | |
|---|---|---|---|
| | x | y | z |
| A | 0.01 | 0.60 | 0.39 |
| B | 0.01 | 0.39 | 0.60 |
| C | 0.35 | 0.05 | 0.60 |
| D | 0.35 | 0.60 | 0.05 |

When synthesized the minimum value of "m" in the formula above is 0.02. In a preferred subclass of the ferroaluminophosphates the values of "x", "y" and "z" in the formula above are representing the following values for "x", "y" and "z":

| Point | Mole Fraction | | |
|---|---|---|---|
| | x | y | z |
| a | 0.01 | 0.52 | 0.47 |
| b | 0.01 | 0.39 | 0.60 |
| c | 0.25 | 0.15 | 0.60 |

| Point | Mole Fraction | | |
|---|---|---|---|
| | x | y | z |
| d | 0.25 | 0.40 | 0.35 |

The iron of the $FeO_2$ structural units can be in either the ferric or ferrous valence state, depending largely upon the source of the iron in the synthesis gel. Thus, an $FeO_2$ tetrahedron in the structure can have a net charge of either $-1$ or $-2$. While it is believed that the Fe, Al and P framework constituents are present in tetrahedral coordination with oxygen (and are referred to herein as such), it is theoretically possible that some minor fraction of these framework constituents are present in co-ordination with five or six oxygen atoms. It is not, moreover, necessarily the case that all of the Fe, Al and/or P content of any given synthesized product is a part of the framework in the aforesaid types of coordination with oxygen. Some of each constituent may be merely occluded or in some as yet undetermined form, and may or may not be structurally significant.

For convenience in describing the ferroaluminophosphates, the "short-hand" acronym "FAPO" is sometimes employed hereinafter. To identify the various structural species which make up the generic class FAPO, each species is assigned a number and is identified, for example, as FAPO-11, FAPO-31 and so forth.

The term "essential empirical chemical composition" is meant to include the crystal framework and can include any organic templating agent present in the pore system, but does not include alkali metal or other ions which can be present by virtue of being contained in the reaction mixture or as a result of post-synthesis ion-exchange. Such ionic species, when present, function primarily as charge-balancin ions for $FeO_2^-$ and/or $AlO_2^{-2}$ tetrahedra, $FeO_2^{-2}$ tetrahedra associated with $PO_2^+$ tetrahedra or not associated with $PO_2^+$ tetrahedra or an organic ion derived from the organic templating agent.

The aforesaid ferroaluminophosphates are synthesized by hydrothermal crystallization from a reaction mixture containing reactive sources of iron oxide, alumina and phosphate, an organic templating, i.e., structure-directing, agent, preferably a compound of an element of Group VA of the Periodic Table, and optionally an alkali metal. The reaction mixture is placed in a sealed pressure vessel, preferably lined with an inert plastic material such as polytetrafluoroethylene and heated, preferably under autogenous pressure at a temperature of at least 100° C., and preferably between 100° C. and 250° C. until crystals of the metal aluminophosphate product are obtained, usually a period of from 2 hours to 2 weeks. The product is recovered by any convenient method such as centrifugation or filtration.

In synthesizing the FAPO compositions, it is preferred to employ a reaction mixture composition expressed in terms of molar ratios as follow:

$$aR:(Fe_xAl_yP_z)O_2:bH_2O$$

wherein "R" is an organic templating agent; "a" has a value great enough to constitute an effective concentration of "R" and is within the range of $>0$ to 6; "b" has a value of from zero to 500, preferably 2 to 80; "x", "y" and "z" represent the mole fractions, respectively, of iron, aluminum and phosphorus in the $(Fe_xAl_yP_z)O_2$ constituent, and each has a value of at least 0.01, and representing the following values for "x", "y" and "z":

| Point | Mole Fraction | | |
|---|---|---|---|
| | x | y | z |
| E | 0.01 | 0.70 | 0.29 |
| F | 0.01 | 0.29 | 0.70 |
| G | 0.29 | 0.01 | 0.70 |
| H | 0.40 | 0.01 | 0.59 |
| I | 0.40 | 0.59 | 0.01 |
| J | 0.29 | 0.70 | 0.01 |

In the foregoing expression of the reaction composition, the reactants are normalized with respect to a total of $(Fe+Al+P)=(x+y+z)=1.00$ mole.

In forming the reaction mixture from which the ferroaluminophosphates are crystallized, the organic templating agent can be any of those heretofore proposed for use in the synthesis of conventional zeolite aluminosilicates and microporous aluminophosphates. In general these compounds contain elements of Group VA of the Periodic Table of Elements, particularly nitrogen, phosphorus, arsenic and antimony, preferably N or P and most preferably N, which compounds also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents can either produce mixtures of the desired metal aluminophosphates or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; di-n-propylamine; tri-n-propylamine; triethylamine; triethanolamine; piperidine; cyclohexylamine; 2-methylpyridine; N,N-dimethylbenzylamine; N-N-dimethylethanolamine; choline; N,N'-dimethylpiperazine; 1,4-diazabicyclo(2,2,2)octane; N-methyldiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo(2,2,2)octane ion; di-n-butylamine, neopentylamine; di-n-pentylamine; isopropylamine; t-butylamine; ethylenediamine; pyrrolidine; and 2-imidazolidone. Not every templating agent will direct the formation of every species of ferroaluminophosphate (FAPO), i.e., a single templating agent can, with proper manipulation of the reaction conditions, direct the formation of several FAPO compositions, and a given FAPO composition can be produced using several different templating agents.

The phosphorus source is preferably phosphoric acid, but organic phosphates such as triethylphosphate have been found satisfactory, and so also have crystalline or amorphous aluminophosphates such as the $AlPO_4$ composition of U.S. Pat. No. 4,310,440. Organo-phosphorus compounds, such as tetrabutylphosphonium bromide do not, apparently serve as reactive sources of phosphorus, but these compounds do function as templating agents. Conventional phosphorus salts such as sodium metaphosphate, may be used, at least in part, as the phosphorus source, but are not preferred.

The aluminum source is preferably either an aluminum alkoxide, such as aluminum isoproproxide, or pseudoboehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

Iron can be introduced into the reaction system in any form which permits the formation in situ of reactive ferrous or ferric ions. Advantageously iron salts, oxides or hydroxides are employed such as iron sulfate, iron acetate, iron nitrate, or the like. Other sources such as a freshly precipitated iron oxide $\gamma$-FeOOH, are also suitable.

While not essential to the synthesis of FAPO compositions, it has been found that in general, stirring or other moderate agitation of the reaction mixture and/or seeding the reaction mixture with seed crystals of either the FAPO species to be produced or a topologically similar aluminophosphate or aluminosilicate composition, facilitates the crystallization procedure.

After crystallization the FAPO product is isolated and advantageously washed with water and dried in air. The as-synthesized FAPO contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular FAPO species. As a general rule, the templating agent, and hence the occluded organic species, is too large to move freely through the pore system of the FAPO product and must be removed by calcining the FAPO at temperatures of 200° C. to 700° C. to thermally degrade the organic species. In a few instances the pores of the FAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein and in the claims does not include the condition of the FAPO phase wherein the organic moiety occupying the intracrystalline pore system as a result of the hydrothermal crystallization process has been reduced by post-synthesis treatment such that the value of "m" in the composition formula $$mR:(Fe_xAl_yP_z)O_2$$

has a value of less than 0.02. The other symbols of the formula are as defined hereinabove. In those preparations in which an aluminum alkoxide is employed as the source of aluminum, the corresponding alcohol is necessarily present in the reaction mixture since it is a hydrolysis product of the alkoxide. It has not been determined whether this alcohol participates in the syntheses process as a templating agent. For the purposes of this application, however, this alcohol is arbitrarily omitted from the class of templating agents, even if it is present in the as-synthesized FAPO material.

Since the FAPO compositions are formed from $AlO_2^-$, $PO_2^+$, $FeO_2^-$ and/or $FeO_2^{-2}$ units the matter of cation exchangeability is considerably more complicated than in the case of zeolitic molecular sieves in which, ideally, there is a stoichiometric relationship between $AlO_2$ tetrahedra and charge-balancing cations. In the FAPO compositions, an $AlO_2^-$ tetrahedron can be balanced electrically either by association with a $PO_2^+$ tetrahedron or a simple cation such as an alkali metal cation, a $Fe^{+2}$ or $Fe^{+3}$ cation present in the reaction mixture, or an organic cation derived from the templating agent. Similarly an $FeO_2^-$ or $FeO_2^{-2}$ tetrahedron can be balanced electrically by association with $PO_2^+$ tetrahedron, a $Fe^{+2}$ or $Fe^{+3}$ cation, organic cations derived from the templating agent, or other metal cation introduced from an extraneous source. It has also been postulated that non-adjacent $AlO_2^-$ and $PO_2^+$ tetrahedral pairs can be balanced by $Na^+$ and $OH^-$, respectively [Flanigen and Grose, Molecular Sieve Zeolites-I, ACS, Washington, D.C. (1971)].

TAPO MOLECULAR SIEVES

TAPO molecular sieves are disclosed in U.S. Pat. No. 4,500,561, incorporated herein by reference, and comprise a three-dimensional microporous crystal framework structure of [$TiO_2$], [$AlO_2$] and [$PO_2$] tetrahedral units which has a unit empirical formula on an anhydrous basis of:

$$mR:(Ti_xAl_yP_z)O_2$$

wherein "R" represents at least one organic templating agent present in the intracrystalline pore system; "m" represents the moles of "R" present per mole of $(Ti_xAl_yP_z)O_2$ and has a value of between zero and about 5.0, the maximum value in each case depending upon the molecular dimensions of the templating agent and the available void volume of pore system of the particular titanium molecular sieve; "x", "y" and "z" represent the mole fractions of titanium, aluminum and phosphorus, respectively, present as tetrahedral oxides, representing the following values for "x", "y" and "z":

| Point | Mole Fraction | | |
|---|---|---|---|
| | x | y | z |
| A | 0.001 | 0.45 | 0.549 |
| B | 0.88 | 0.01 | 0.11 |
| C | 0.98 | 0.01 | 0.01 |
| D | 0.29 | 0.70 | 0.01 |
| E | 0.001 | 0.70 | 0.299 |

The parameters "x", "y" and "z" are preferably within the following values for "x", "y" and "z":

| Point | Mole Fraction | | |
|---|---|---|---|
| | x | y | z |
| a | 0.002 | 0.499 | 0.499 |
| b | 0.20 | 0.40 | 0.40 |
| c | 0.20 | 0.50 | 0.30 |
| d | 0.10 | 0.60 | 0.30 |
| e | 0.002 | 0.60 | 0.398 |

The titanium-containing molecular sieves are referred to hereinafter, solely for point of reference herein as "TAPO" molecular sieves, or as "TAPOs" if the reference is to the class as a whole. This designation is simply made for the sake of convenient reference herein and is not meant to designate a particular structure for any given TAPO molecular sieve. The members of the class of TAPO's employed hereinafter in the examples will be characterized simply by referring to such members as TAPO-5, TAPO-11, etc, i.e., a particular species will be referred to as TAPO-n where "n" is a number specific to a given class member as its preparation is reported herein. This designation is an arbitrary one and is not intended to denote structural relationship to another material(s) which may also be characterized by a numbering system.

The term "unit empirical formula" is used herein according to its common meaning to designate the simplest formula which gives the relative number of moles of titanium, aluminum and phosphorus which form the [$TiO_2$], [$PO_2$] and [$AlO_2$] tetrahedral unit within a titanium-containing molecular sieve and which forms the molecular framework of the TAPO composition(s). The unit empirical formula is given in terms of titanium, aluminum and phosphorus as shown in Formula (1), above, and does not include other compounds, cations or anions which may be present as a result of the preparation or the existence of other impurities or materials in the bulk composition not containing the aforementioned tetrahedral unit. The amount of template R is reported as part of the composition when the as-synthesized unit empirical formula is given, and water may also be reported unless such is defined as the anhydrous form. For convenience, coefficient "m" for template "R" is reported as a value that is normalized by dividing the number of moles of organic by the total moles of titanium, aluminum and phosphorus.

The unit empirical formula for a TAPO may be given on an "as-synthesized" basis or may be given after an "as-synthesized" TAPO composition has been subjected to some post treatment process, e.g., calcination. The term "as-synthesized" herein shall be used to refer to the TAPO composition(s) formed as a result of the hydrothermal crystallization but before the TAPO composition has been subjected to post treatment to remove any volatile components present therein. The actual value of "m" for a post-treated TAPO will depend on several factors (including: the particular TAPO, template, severity of the post-treatment in terms of its ability to remove the template from the TAPO, the proposed application of the TAPO composition, and etc.) and the value for "m" can be within the range of values as defined for the as-synthesized TAPO compositions although such is generally less than the as-synthesized TAPO unless such post-treatment process adds template to the TAPO so treated. A TAPO composition which is in the calcined or other post-treatment form generally has an empirical formula represented by Formula (1), except that the value of "m" is generally less than about 0.02. Under sufficiently severe post-treatment conditions, e.g., roasting in air at high temperature for long periods (over 1 hr.), the value of "m" may be zero (0) or, in any event, the template, R, is undetectable by normal analytical procedures.

The TAPO molecular sieves are generally further characterized by an intracrystalline adsorption capacity for water at 4.6 torr and about 24° C. of about 3.0 weight percent. The adsorption of water has been observed to be completely reversible while retaining the same essential framework topology in both the hydrated and dehydrated state. The term "essential framework topology" is meant to designate the spatial arrangement of the primary bond linkages. A lack of change in the framework topology indicates that there is no disruption of these primary bond linkages.

The TAPO molecular sieves are generally synthesized by hydrothermal crystallization from a reaction mixture comprising reactive sources of titanium, aluminum and phosphorus, and one or more organic templating agents. Optionally, alkali metal(s) may be present in the reaction mixture. The reaction mixture is placed in a pressure vessel, preferably lined with an inert plastic material, such as polytetrafluoroethylene, and heated, preferably under the autogenous pressure, at a temperature of at least about 100° C., and preferably between 100° C. and 250° C., until crystals of the molecular sieve product are obtained, usually for a period of from 2 hours to 2 weeks. While not essential to the synthesis of the TAPO molecular sieves, it has been found that in general stirring or other moderate agitation of the reaction mixture and/or seeding the reaction mixture with seed crystals of either the TAPO to be produced, or a topologically similar composition, facilitates the crystallization procedure. The product is recovered by any convenient method such as centrifugation or filtration.

After crystallization the TAPO(s) may be isolated and washed with water and dried in air. As a result of the hydrothermal crystallization, the as-synthesized TAPO contains within its intracrystalline pore system at least one form of the template employed in its formation. Generally, the template is a molecular species, but it is possible, steric considerations permitting, that at least some of the template is present as a charge-balancing cation. Generally the template is too large to move freely through the intracrystalline pore system of the formed TAPO and may be removed by a post-treatment process, such as by calcining the TAPO at temperatures of between about 200° C. and to about 700° C. so as to thermally degrade the template or by employing some other post-treatment process for removal of at least part of the template from the TAPO. In some instances the pores of the TAPO are sufficiently large to permit transport of the template, and, accordingly, complete or partial removal thereof can be accomplished by conventional desorption procedures such as carried out in the case of zeolites.

The TAPOs are preferably formed from a reaction mixture having a mole fraction of alkali metal cation which is sufficiently low that it does not interfere with the formation of the TAPO composition. The TAPO compositions are generally formed from a reaction mixture containing reactive sources of $TiO_2$, $Al_2O_3$, and $P_2O_5$ and an organic templating agent, said reaction mixture comprising a composition expressed in terms of molar oxide ratios of:

$fR_2O:(Ti_xAl_yP_z)O_2:gH_2O$ wherein "R" is an organic templating agent; "f" has a value large enough to constitute an effective amount of "R" said effective amount being that amount which form said TAPO compositions; "g" has a value of from zero to 500; "x", "y" and "z" represent the mole fractions, respectively of titanium, aluminum and phosphorus in the $(Ti_xAl_yP_z)O_2$ constituent, and each has a value of at least 0.001 and being within the following values for "x", "y" and "z":

| Point | Mole Fraction | | |
|---|---|---|---|
| | x | y | z |
| h | 0.001 | 0.989 | 0.01 |
| i | 0.001 | 0.01 | 0.989 |
| j | 0.32 | 0.24 | 0.44 |
| k | 0.98 | 0.01 | 0.01 |

Although the TAPO compositions will form if higher concentrations of alkali metal cation are present, such reaction mixtures are not generally preferred. A reaction mixture, expressed in terms of molar oxide ratios, comprising the following bulk composition is preferred:

$$oR_2O:wM_2O:(Ti_xAl_yP_z)O_2:nH_2O$$

wherein "R" is an organic template; "o" has a value great enough to constitute an effective concentration of "R" and is preferably within the range of from greater than zero (0) to about 5.0; "M" is an alkali metal cation; "w" has a value of from zero to 2.5; "n" has a value between about zero (0) and about 500; "x", "y" and "z" represent the mole fractions, respectively, of titanium, aluminum and phosphorus in $(Ti_xAl_yP_z)O_2$ "x", "y" and "z" represent the mole fractions, respectively, of titanium, aluminum and phosphorus in the $(Ti_xAl_yP_z)O_2$ constituent, and each has a value of at least 0.001 and being within the following values for "x", "y" and "z":

| Point | Mole Fraction | | |
|---|---|---|---|
| | x | y | z |
| h | 0.001 | 0.989 | 0.01 |
| i | 0.001 | 0.01 | 0.989 |
| j | 0.32 | 0.24 | 0.44 |
| k | 0.98 | 0.01 | 0.01 |

When the TAPOs are synthesized by this method the value of "m" in Formula (1) is generally above about 0.02.

Though the presence of alkali metal cations is not preferred, when they are present in the reaction mixture it is preferred to first admix at least a portion (e.g., at least about 10 weight percent) of each of the aluminum and phosphorus sources in the substantial absence (e.g., preferably less than about 20 percent of the total weight of the aluminum source and phosphorus source) of the titanium source. This procedure avoids adding the phosphorus source to a basic reaction mixture containing the titanium source and aluminum source, (as was done in most of the published attempts to substitute isomorphously [PO$_2$] tetrahedra for [SiO$_2$] tetrahedra in zeolitic structures). Although the reaction mechanism is by no means clear at this time, the function of the template may be to favor the incorporation of [PO$_2$] and [AlO$_2$] tetrahedra in the framework structures of the crystalline products with [TiO$_2$] tetrahedra isomorphously replacing [PO$_2$] tetrahedra.

The reaction mixture from which these TAPOs are formed contains one or more organic templating agents (templates) which can be most any of those heretofore proposed for use in the synthesis of aluminosilicates and aluminophosphates. The template preferably contains at least one element of Group VA of the Periodic Table, particularly nitrogen, phosphorus, arsenic and/or antimony, more preferably nitrogen or phosphorus and most preferably nitrogen and are of the formula $R_4X^+$ wherein X is selected from the group consisting of nitrogen, phosphorus, arsenic and/or antimony and R may be hydrogen, alkyl, aryl, aralkyl, or alkylaryl group and is preferably aryl or alkyl containing between 1 and 8 carbon atoms, although more than eight carbon atoms may be present in "R" of group of the template. Nitrogen-containing templates are preferred, including amines and quaternary ammonium compounds, the latter being represented generally by the formula $R'_4N^+$ wherein each R' is an alkyl, aryl, alkylaryl, or araalkyl group; wherein R' preferably contains from 1 to 8 carbon atoms or higher when R' is alkyl and greater than 6 carbon atoms when R' is otherwise, as hereinbefore discussed. Polymeric quaternary ammonium salts such as $[(C_{14}H_{32}N_2)(OH)_2]_x$ wherein "x" has a value of at least 2 may also be employed. The mono-, di- and triamines, including mixed amines, may also be employed as templates either alone or in combination with a quaternary ammonium compound or another template. The exact relationship of various templates when concurrently employed is not clearly understood. Mixtures of two or more templating agents can produce either mixtures of TAPOs or in the instance where one template is more strongly directing than another template the more strongly directing template may control the course of the hydrothermal crystallization wherein with the other template serving primarily to establish the pH conditions of the reaction mixture.

Representative templates include tetramethylammonium, tetraethylammonium, tetrapropylammonium or tetrabutylammonium ions; di-n-propylamine; tripropylamine; triethylamine; triethanolamine,; piperidine; cyclohexylamine; 2-methylpyridine; N,N-dimethylbenzylamine; N,N-diethylethanolamine; dicyclohexylamine; N,N-dimethylethanolamine; 1,4-diazabicyclo(2,2,2)octane; N-methyldiethanolamine, N-methylethanolamine; N-methylcyclohexylamine; 3-methylpyridine; 4-methylpyridine; quinuclidine; N,N'-dimethyl-1,4-diazabicyclo(2,2,2)octane ion; di-n-butylamine, neopentylamine; di-n-pentylamine; isopropylamine; t-butylamine; ethylenediamine; pyrrolidine; and 2-imidazolidone. As will be readily apparent from the illustrative examples set forth hereinafter, not every template will produce every TAPO composition although a single template can, with proper selection of the reaction conditions, cause the formation of different TAPO compositions, and a given TAPO composition can be produced using different templates.

In those instances where an aluminum alkoxide is the reactive aluminum source, the corresponding alcohol is necessarily present in the reaction mixture since it is a hydrolysis product of the alkoxide. It has not as yet been determined whether this alcohol participates in the synthesis process as a templating agent, or in some other function and, accordingly, is not reported as a template in the unit formula of the TAPOs, although such may be acting as templates.

Alkali metal cations, if present in the reaction mixture, may facilitate the crystallization of certain TAPO phases, although the exact function of such cations, when present, in crystallization, if any, is not presently known. Alkali cations present in the reaction mixture generally appear in the formed TAPO composition, either as occluded (extraneous) cations and/or as structural cations balancing net negative charges at various sites in the crystal lattice. It should be understood that although the unit formula for the TAPOs does not specifically recite the presence of alkali cations they are not excluded in the same sense that hydrogen cations and/or hydroxyl groups are not specifically provided for in the traditional formulae for zeolitic aluminosilicates.

Most any reactive titanium source may be employed herein. The preferred reactive titanium sources include titanium alkoxides, water-soluble titanates and titanium chelates.

Most any reactive phosphorous source may be employed. Phosphoric acid is the most suitable phosphorus source employed to date. Accordingly, other acids of phosphorus are generally believed to be suitable phosphorus sources for use herein. Organic phosphates such as triethyl phosphate have been found satisfactory, and so also have crystalline or amorphous aluminophosphates such as the AlPO$_4$ compositions of U.S. Pat. No. 4,310,440. Organo-phosphorus compounds, such as tetrabutyl-phosphonium bromide have not, apparently, served as reactive sources of phosphorus, but these compounds do function as templating agents and may also be capable of being suitable phosphorus sources under proper process conditions (yet to be ascertained). Organic phosphorus compounds, e.g., esters, are believed to be generally suitable since they can generate acids of phosphorus in situ. Conventional phosphorus salts, such as sodium metaphosphate, may be used, at least in part as the phosphorus source, but they are not preferred.

Most any reactive aluminum source may be employed herein. The preferred reactive aluminum sources include aluminum alkoxides, such as aluminum isopropoxide, and pseudoboehmite. Crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but as generally not preferred.

Since the exact nature of the TAPO molecular sieves are not clearly understood at present, although all are believed to contain [TiO$_2$] tetrahedra in the three-dimensional microporous crystal framework structure, it is advantageous to characterize the TAPO molecular sieves by means of their chemical composition. This is due to the low level of titanium present in certain of the TAPO molecular sieves prepared to date which makes it difficult to ascertain the exact nature of the interaction between titanium, aluminum and phosphorus. As a result, although it is believed that titanium, [TiO$_2$], has substituted isomorphously for [AlO$_2$] or [PO$_2$] tetrahedra, it is appropriate to characterize certain TAPO compositions by reference to their chemical composition in terms of the mole ratios of oxides in the as-synthesized and anhydrous form as:

vR:pTiO$_2$:qAl$_2$O$_3$:rP$_2$O$_5$ wherein "R" represents at least one organic templating agent present in the intracrystalline pore system; "v" represents an effective amount of the organic templating agent to form said TAPO compositions and preferably has a value between and including zero and about 3.0; "p", "q" and "r" represent moles, respectively, of titanium, alumina and phosphorus pentaoxide, based on said moles being such that they are within the following values for "p", "q" and "r".

| Point | Mole Fraction | | |
|---|---|---|---|
| | p | q | r |
| A | 0.004 | 1.0 | 1.22 |
| B | 176 | 1.0 | 11.0 |
| C | 196 | 1.0 | 1.0 |
| D | 0.828 | 1.0 | 0.0143 |
| E | 0.003 | 1.0 | 0.427 |

The parameters "p", "q" and "r" are preferably within the following values for "p", "q" and "r":

| Point | Mole Fraction | | |
|---|---|---|---|
| | p | q | r |
| a | 0.008 | 1.0 | 1.0 |
| b | 1.0 | 1.0 | 1.0 |
| c | 0.80 | 1.0 | 0.60 |
| d | 0.333 | 1.0 | 0.50 |
| e | 0.067 | 1.0 | 0.663 |

ELAPO MOLECULAR SIEVES

"ELAPO" molecular sieves are a class of crystalline molecular sieves in which at least one element capable of forming a three-dimensional microporous framework form crystal framework structures of AlO$_2^-$, PO$_2^+$ and MO$_2^n$ tetrahedral oxide units wherein "MO$_2^n$" represents at least one different element (other than Al or P) present as tetrahedral oxide units "MO$_2^n$" with charge "n" where "n" may be $-3$, $-2$, $-1$, 0 or $+1$. The members of this novel class of molecular sieve compositions have crystal framework structures of AlO$_2^-$, PO$_2^+$ and MO$_2^n$ tetrahedral units and have an empirical chemical composition on an anhydrous basis expressed by the formula:

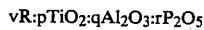
mR:(M$_x$Al$_y$P$_z$)O$_2$ wherein "R" represents at least one organic templating agent present in the intracrystalline pore system; "m" represents the molar amount of "R" present per mole of (M$_x$Al$_y$P$_z$)O$_2$; "M" represents at least one element capable of forming framework tetrahedral oxides; and "x", "y" and "z" represent the mole fractions of "M", aluminum and phosphorus, respectively, present as tetrahedral oxides. "M" is at least one different elements (M$_1$) such that the molecular sieves contain at least one framework tetrahedral units in addition to AlO$_2^-$ and PO$_2^+$. "M" is at least one element selected from the group consisting of arsenic, beryllium, boron, chromium, gallium, germanium and lithium, and when "M" denotes two elements the second element may be one of the aforementioned and/or is at least one element selected from the group consisting of cobalt, iron, magnesium, manganese, titanium and zinc. ELAPOs and their preparation are disclosed in European patent application Ser. No. 85104386.9, filed Apr. 11, 1985 (EPC Publication No. 0158976, published Oct. 13, 1985, incorporated herein by reference) and No. 85104388.5, filed Apr. 11, 1985 (EPC Publication No. 158349, published Oct. 16, 1985, incorporated herein by reference).

The ELAPO molecular sieves are generally referred to herein by the acronym or "ELAPO" to designate element(s) "M" in a framework of AlO$_2^-$, PO$_2^+$ and MO$_2^n$ tetrahedral oxide units. Actual class members will be identified by replacing the "EL" of the acronym with the elements present as MO$_2^n$ tetrahedral units.

For example, "MgBeAPO" designates a molecular sieve comprised of $AlO_2^-$, $PO_2^+$, $MgO_2^{-2}$ and $BeO_2^{-2}$ tetrahedral units. To identify various structural species which make up each of the subgeneric classes, each species is assigned a number and is identified as "ELAPO-i" wherein "i" is an integer. The given species designation is not intended to denote a similarity in structure to any other species denominated by a similar identification system.

The ELAPO molecular sieves comprise at least one additional element capable of forming framework tetrahedral oxide units ($MO_2^n$) to form crystal framework structures with $AlO_2^-$ and $PO_2^+$ tetrahedral oxide units wherein "M" represents at least one element capable of forming tetrahedral units "$MO_2^n$", where "n" is $-3$, $-2$, $-1$, 0 or $+1$ and is at least one element selected from the group consisting of arsenic, beryllium, boron, chromium, gallium, germanium and lithium. When "M" denotes two elements "M" may also be at least one element selected from the group consisting of cobalt, iron, magnesium, manganese, titanium and zinc. For example, in each instance "M" includes at least one of the first group of elements, e.g., As, Be, etc., and when two or more elements are present, the second and further elements may be selected from the first group of elements and/or the second group of elements, as above discussed.

The ELAPO molecular sieves have crystalline three-dimensional microporous framework structures of $AlO_2^-$, $PO_2^+$ and $MO_2^n$ tetrahedral units and have an empirical chemical composition on an anhydrous basis expressed by the formula:

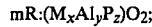

wherein "R" represents at least one organic templating agent present in the intracrystalline pore system; "m" represents the molar amount of "R" present per mole of $(M_xAl_yP_z)O_2$ and has a value of zero to about 0.3; "M" represents at least one element capable of forming framework tetrahedral oxides where "M" is at least one element selected from the group consisting of arsenic, beryllium, boron, chromium, gallium, germanium and lithium. When "M" includes an additional element such additional elements "M" may be at least one element selected from the group consisting of cobalt, iron, magnesium, manganese, titanium, and zinc.

The relative amounts of element(s) "M", aluminum and phosphorus are expressed by the empirical chemical formula (anhydrous):

$mR:(M_xAl_yP_z)O_2$ where "x", "y" and "z" represent the mole fractions of said "M", aluminum and phosphorus. The individual mole fractions of each "M" (or when M denotes two or more elements, $M_1$, $M_2$, $M_3$, etc.) may be represented by "$x_1$", "$x_2$", "$x_3$", etc. wherein "$x_1$", "$x_2$", and "$x_3$", and etc. represent the individual mole fractions of elements $M_1$, $M_2$, $M_3$, and etc. for "M" as above defined. The values of "$x_1$", "$x_2$", "$x_3$", etc. are as defined for "x", hereinafter, where "$x_1$"+"$x_2$"+"$x_3$" ... ="x" and where $x_1$, $x_2$, $x_3$, etc. are each at least 0.01.

The ELAPO molecular sieves have crystalline three-dimensional microporous framework structures of $MO_2^n$, $AlO_2^-$ and $PO_2^+$ tetrahedral units having an empirical chemical composition on an anhydrous basis expressed by the formula:

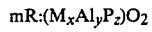

wherein "R" represents at least one organic templating agent present in the intracrystalline pore system; "m" represents a molar amount of "R" present per mole of $(M_xAl_yP_z)O_2$ and has a value of zero to about 0.3; "M" represents at least one different element (other than Al or P) capable of forming framework tetrahedral oxides, as hereinbefore defined, and "x", "y" and "z" represent the mole fractions of "M", aluminum and phosphorus, respectively, present as tetrahedral oxides; said mole fractions "x", "y" and "z" being generally defined as within the following values for "x", "y", and "z":

| Point | Mole Fraction | | |
|---|---|---|---|
| | x | y | z |
| A | 0.02 | 0.60 | 0.38 |
| B | 0.02 | 0.38 | 0.60 |
| C | 0.39 | 0.01 | 0.60 |
| D | 0.98 | 0.01 | 0.01 |
| E | 0.39 | 0.60 | 0.01 |

In a preferred sub-class of the ELAPOs of this invention, the values of "x", "y" and "z" in the formula above are within the following values for "x", "y" and "z":

| Point | Mole Fraction | | |
|---|---|---|---|
| | x | y | z |
| a | 0.02 | 0.60 | 0.38 |
| b | 0.02 | 0.38 | 0.60 |
| c | 0.39 | 0.01 | 0.60 |
| d | 0.60 | 0.01 | 0.39 |
| e | 0.60 | 0.39 | 0.01 |
| f | 0.39 | 0.60 | 0.01 |

ELAPO compositions are generally synthesized by hydrothermal crystallization from a reaction mixture containing reactive sources of the elements "M", aluminum and phosphorus, preferably an organic templating, i.e., structure-directing, agent, preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure at a temperature between 50° C. and 250° C., and preferably between 100° C. and 200° C. until crystals of the ELAPO product are obtained, usually a period of from several hours to several weeks. Typical crystallization times are from about 2 hours to about 30 days with from about 2 hours to about 20 days being generally employed to obtain crystals of the ELAPO products. The product is recovered by any convenient method such as centrifugation or filtration.

In synthesizing the ELAPO compositions of the instant invention, it is preferred to employ a reaction mixture composition expressed in terms of the molar ratios as follows:

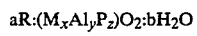

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and 300; "M" represents at least one element, as above described, capable of forming tetrahedral oxide framework units, $MO_2^n$, with $AlO_2^-$ and $PO_2^+$ tetrahedral units; "n" has a value of $-3$, $-2$, $-1$, 0 or $+1$; and "x", "y" and "z" represent the mole fractions of "M", aluminum and phosphorus, respectively, "y" and "z" each have a value of at least 0.01 and "x" has a value of at least 0.01 with each element "M" having a mole fraction of at least 0.01. The mole fractions "x", "y" and "z" are preferably within the following values for "x", "y" and "z":

| Point | Mole Fraction | | |
|-------|------|------|------|
|       | x    | y    | z    |
| F     | 0.01 | 0.60 | 0.39 |
| G     | 0.01 | 0.39 | 0.60 |
| H     | 0.39 | 0.01 | 0.60 |
| I     | 0.98 | 0.01 | 0.01 |
| J     | 0.39 | 0.60 | 0.01 |

In the foregoing expression of the reaction composition, the reactants are normalized with respect to a total of $(M+Al+P)=(x+y+z)=1.00$ mole, whereas in many of the working examples appearing hereinafter the reaction mixtures are expressed in terms of molar oxide ratios and may be normalized to 1.00 mole of $P_2O_5$. This latter form is readily converted to the former form by routine calculations by dividing the total number of moles of "M", aluminum and phosphorus into the moles of each of "M", aluminum and phosphorus. The moles of template and water are similarly normalized by dividing the total moles of "M", aluminum and phosphorus.

In forming the reaction mixture from which the instant molecular sieves are formed the organic templating agent can be any of those heretofore proposed for use in the synthesis of conventional zeolite aluminosilicates. In general these compounds contain elements of Group VA of the Periodic Table of Elements, particularly nitrogen, phosphorus, arsenic and antimony, preferably nitrogen or phosphorus and most preferably nitrogen, which compounds also contain at least one alkyl or aryl group having from 1 to 8 carbon atoms. Particularly preferred compounds for use as templating agents are the amines, quaternary phosphonium compounds and quaternary ammonium compounds, the latter two being represented generally by the formula $R_4X^+$ wherein "X" is nitrogen or phosphorus and each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. The mono-, di- and tri-amines are advantageously utilized, either alone or in combination with a quaternary ammonium compound or other templating compound. Mixtures of two or more templating agents can either produce mixtures of the desired ELAPOs or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; tetrapentylammonium ion; di-n-propylamine; tripropylamine; triethylamine; triethanolamine; piperidine; cyclohexylamine; 2-methylpyridine; N,N-dimethylbenzylamine; N,N-dimethylethanolamine; choline; N,N'-dimethylpiperazine; 1,4-diazabicyclo(2,2,2,)octane; N-methyldiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo(2,2,2)octane ion; di-n-butylamine, neopentylamine; di-n-pentylamine; isopropylamine; t-butylamine; ethylenediamine; pyrrolidine; and 2-dimidazolidone. Not every templating agent will direct the formation of every templating agent will direct the formation of every species of ELAPO, i.e., a single templating agent can, with proper manipulation of the reaction conditions, direct the formation of several ELAPO compositions, and a given ELAPO.composition can be produced using several different templating agents.

The phosphorus source is preferably phosphoric acid, but organic phosphates such as triethyl phosphate may be satisfactory, and so also may crystalline or amaorphous aluminophosphates such as the $AlPO_4$ composition of U.S. Pat. No. 4,310,440. Organo-phosphorus compounds, such as tetrabutylphosphonium bromide, do not apparently serve as reactive sources of phosphorus, but these compounds may function as templating agents. Conventional phosphorus salts such as sodium metaphosphate, may be used, at least in part, as the phosphorus source, but are not preferred.

The aluminum source is preferably either an aluminum alkoxide, such as aluminum isoproproxide, or pseudoboehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

The element(s) "M" can be introduced into the reaction system in any form which permits the formation in situ of reactive form of the element, i.e., reactive to form the framework tetrahedral oxide unit of the element. The organic and inorganic salts, of "M" such as oxides, alkoxides, hydroxides, halides and carboxylates, may be employed including the chlorides, bromides, iodides, nitrates, sulfates, acetates, formates, ethoxides, propoxides and the like.

While not essential to the synthesis of ELAPO compositions, stirring or other moderate agitation of the reaction mixture and/or seeding the reaction mixture with seed crystals of either the ELAPO species to be produced or a topologically similar species, such as aluminophosphate, aluminosilicate or molecular sieve compositions, facilitates the crystallization procedure.

After crystallization the ELAPO product may be isolated and advantageously washed with water and dried in air. The as-synthesized ELAPO generally contains within its internal pore system at least one form of the templating agent employed in its formation. Most commonly the organic moiety is present, at least in part, as a charge-balancing cation as is generally the case with as-synthesized aluminosilicate zeolites prepared from organic-containing reaction systems. It is possible, however, that some or all of the organic moiety is an occluded molecular species in a particular ELAPO species. As a general rule the templating agent, and hence the occluded organic species, is too large to move freely through the pore system of the ELAPO product and must be removed by calcining the ELAPO at temperatures of 200° C. to 700° C. to thermally degrade the organi species. In a few instances the pores of the ELAPO product are sufficiently large to permit transport of the templating agent, particularly if the latter is a small molecule, and accordingly complete or partial removal thereof can be accomplished by conventional desorption procedures such as carried out in the case of zeolites. It will be understood that the term "as-synthesized" as used herein does not include the condition of the ELAPO phase wherein the organic moiety occupying the intracrystalline pore system as a result of the hydrothermal crystallization process has been reduced by post-synthesis treatment such that the value of "m" in the composition formula $$mR:(M_xAl_yP_z)O_2$$

has a value of less than 0.02. The other symbols of the formula are as defined hereinabove. In those preparations in which an alkoxide is employed as the source of element "M", aluminum or phosphorus, the corresponding alcohol is necessarily present in the reaction mixture since it is a hydrolysis product of the alkoxide. It has not been determined whether this alcohol participates in the synthesis process as a templating agent. For the purposes of this application, however, this alcohol is arbitrarily omitted from the class of templating agents, even if it is present in the as-synthesized ELAPO material.

Since the present ELAPO compositions are formed from $MO_2^n$, $AlO_2$, and $PO_2^+$ tetrahedral oxide units which, respectively, have a net charge of "n", (where "m" may be $-3$, $-2$, $-1$, 0 or $+1$), $-1$ and $+1$, the matter of cation exchangeability is considerably more complicated than in the case of zeolite molecular sieves in which, ideally, there is a stoichiometric relationship between $AlO_2^-$ tetrahedra and charge-balancing cations. In the instant compositions, an $AlO_2^-$ tetrahedron can be balanced electrically either by association with a $PO_2^+$ tetrahedron or a simple cation such as an alkali metal cation, a proton ($H^+$), a cation of "M" present in the reaction mixture, or an organic cation derived from the templating agent. Similarly an $MO_2^n$ tetrahedron, where "n" is negative, can be balanced electrically by association with $PO_2^+$ tetrahedra, a cation of "M" present in the reaction mixture, organic cations derived from the templating agent, a simple cation such as an alkali metal cation, or other divalent or polyvalent metal cation, a proton ($H^+$), anions or cations introduced from an extraneous source. It has also been postulated that non-adjacent $AlO_2^-$ and $PO_2^+$ tetrahedral pairs can be balanced by $Na^+$ and $OH^-$ respectively [Flanigan and Grose, Molecular Sieve Zeolites-I, ACS, Washington, DC (1971)]

SILICOALUMINOPHOSPHATE MOLECULAR SIEVES

The preferred NZMSs, to date, are the silicoaluminophosphate molecular sieves described in U.S. Pat. No. 4,440,871. The use of such catalysts in reforming catalysts or as components in heretofore employed reforming/dehydrocyclization catalysts provides improved catalysts and provide products characterized by an improved selectivity to iso-products and provides improved activity in reforming/dehydrocyclization reactions.

Figure 5:
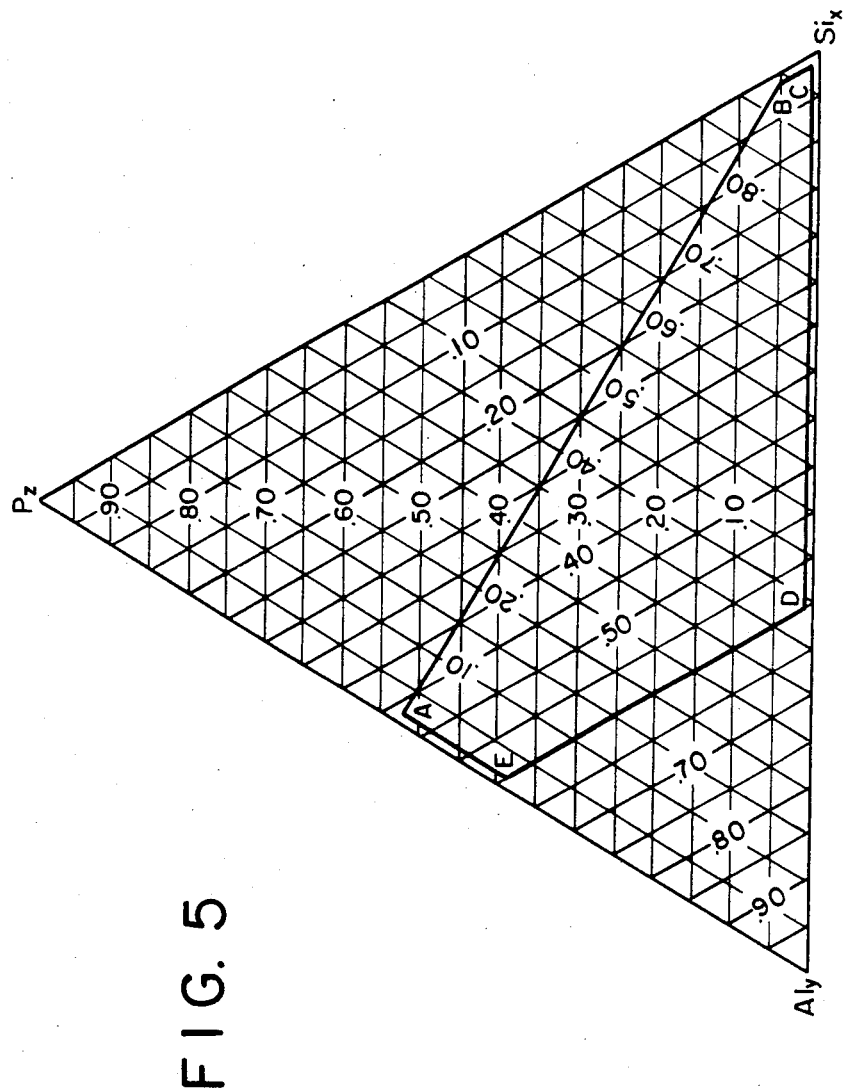
FIG. 5 is a ternary diagram showing the compositional parameters of the silicoaluminophosphates of U.S. Pat. No. 4,440,871 in terms of mole fractions of silicon, aluminum and phosphorus.
Figure 6:
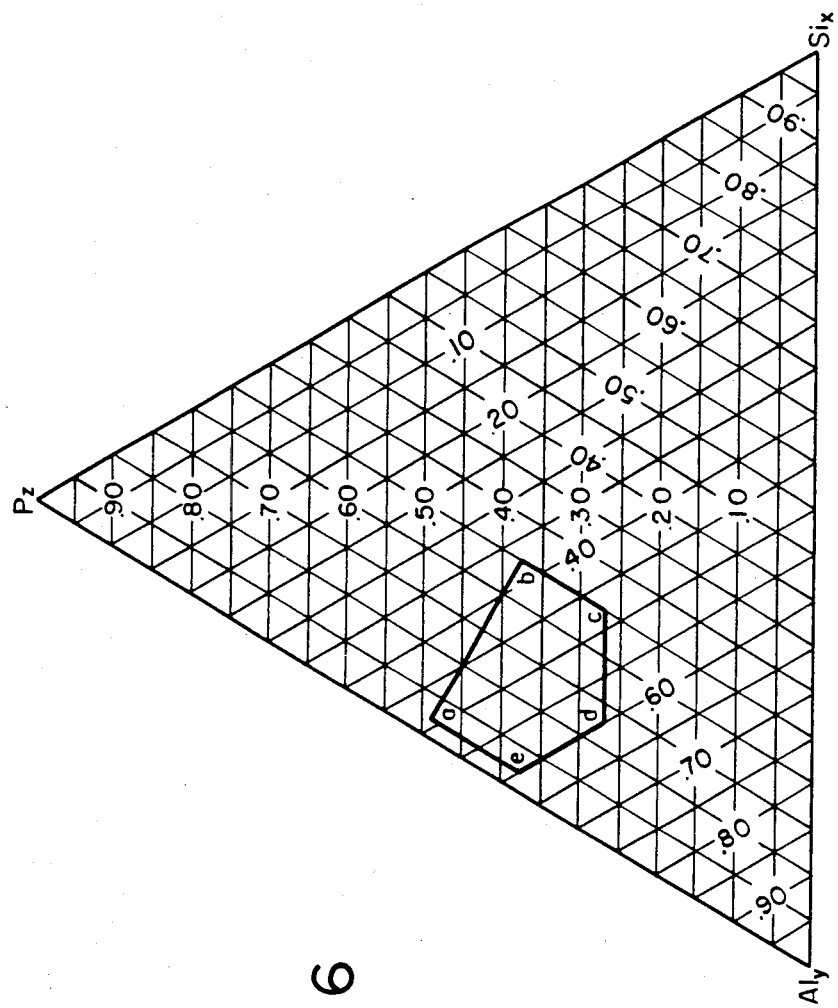
FIG. 6 is a ternary diagram showing the preferred compositional parameters of the silicoaluminophosphates of U.S. Pat. No. 4,440,871 in terms of mole fractions of silicon, aluminum and phosphorus.

The silicoaluminophosphate molecular sieves of U.S. Pat. No. 4,440,871 are disclosed as microporous crystalline silicoaluminophosphates, the pores of which are uniform and have nominal diameters of greater than about 3 Angstroms and whose essential empirical chemical composition in the as-synthesized and anhydrous form is $$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from 0.02 to 0.3; "x", "y" and "z" represent the mole fractions of silicon, aluminum and phosphorus, respectively, present as tetrahedral oxides, said mole fractions being such that they are within the pentagonal compositional area defined by points A, B, C, D and E of the ternary diagram of FIG. 5 and are preferably within the pentagonal compositional area defined by points a, b, c, d and e of FIG. 6. The SAPO molecular sieves of U.S. Pat. No. 4,440,871 are also described as silicoaluminophosphates having a three-dimensional microporous framework structure of $PO_2^+$, $AlO_2^-$ and $SiO_2$ tetrahedral units, and whose essential empirical chemical composition on an anhydrous basis is:

$$mR:(Si_xAl_yP_z)O_2$$

wherein "R" represents at least one oganic templating agent present in the intracrystalline pore system; "m" represents the moles of "R" present per mole of $(Si_xAl_yP_z)O_2$ and has a value of from zero to 0.3; "x", "y" and "z" represent, respectively, the mole fractions of silicon, aluminum and phosphorus present in the oxide moiety, said mole fractions being within the compositional area bounded by points A, B, C, C and E on the ternary diagram which is FIG. 5, said silicoaluminophosphate having a characteristic X-ray powder diffration pattern which contains at least the d-spacings set forth below in any one of Tables I, III, V, VII, IX, XIII, XVII, XXI, XXIII or XXV of U.S. Pat. No. 4,440,871. Further, the as-synthesized crystalline silicoaluminophosphates of U.S. Pat. No. 4,440,871 may be calcined at a temperature sufficiently high to remove at least some of any organic templating agent present in the intracrystalline pore system as a result of such synthesis. The silicoaluminophosphates of U.S. Pat. No. 4,440,871 are generally referred to therein as "SAPO", as a class, or as "SAPO-n" wherein "n" is an integer denoting a particular SAPO as its preparation is reported in U.S. Pat. No. 4,440,871. The preparation of the SAPOs is disclosed in U.S. Pat. No. 4,440,871, incorporated herein by reference.

MP-SAPOs characterized by the aforementioned isobutane and triethylamine adsorption characteristics include SAPO-11, SAPO-31, SAPO-40 and SAPO-41.

The species SAPO-11 as referred to herein is a silicoaluminophosphate material having a three-dimensional microporous crystal framework structure of $PO_2^+$, $AlO_2^-$ and $SiO_2$ tetrahedral units, and whose essential empirical chemical composition on an anhydrous basis is:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from zero to 0.3; "x", "y" and "z" represent, respectively, the mole fractions of silicon, aluminum and phosphorus present in the oxide moiety, said mole fractions being within the compositional area bounded by points A, B, C, D and E on the ternary diagram which is FIG. 5, and preferably within the area bounded by points a, b, c, d and e on the ternary diagram which is FIG. 6, said silicoaluminophosphate having a characteristic X-ray powder diffraction pattern which contains at least the d-spacings set forth below:

| | SAPO-11 | |
|---|---|---|
| 2θ | d(Å) | Relative Intensity |
| 9.4–9.65 | 9.41–9.17 | m |
| 20.3–20.6 | 4.37–4.31 | m |
| 21.0–21.3 | 4.23–4.17 | vs |
| 21.1–22.35 | 4.02–3.99 | m |
| 22.5–22.9 (doublet) | 3.95–3.92 | m |
| 23.15–23.35 | 3.84–3.81 | m–s |

The species SAPO-31 as referred to herein is a silicoaluminophosphate having a three-dimensional microporous crystal framework structure of $PO_2{}^+$, $AlO_2{}^-$ and $SiO_2$ tetrahedral units, and whose essential empirical chemical composition on an anhydrous basis is:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from zero to 0.3; "x", "y" and "z" represent, respectively, the mole fractions of silicon, aluminum and phosphorus present in the oxide moiety, said mole fractions being within the compositional area bounded by points A, B, C, D and E on the ternary diagram which is FIG. 5, and preferably within the area bounded by points a, b, c, d and e on the ternary diagram which is FIG. 6, said silicoaluminophosphate having a characteristic X-ray powder diffraction pattern which contains at least the d-spacings set forth below:

| | SAPO-31 | |
|---|---|---|
| 2θ | d(Å) | Relative Intensity |
| 8.5–8.6 | 10.40–10.28 | m–s |
| 20.2–20.3 | 4.40–4.37 | m |
| 21.9–22.1 | 4.06–4.02 | w–m |
| 22.6–22.7 | 3.93–3.92 | vs |
| 31.7–31.8 | 2.823–2.814 | w–m |

The species SAPO-41 as referred to herein is a silicoaluminophosphate having a three-dimensional microporous crystal framework structure of $PO_2{}^+$, $AlO_2{}^-$ and $SiO_2$ tetrahedral units, and whose essential empirical chemical composition on an anhydrous basis is:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from zero to 0.3; "x", "y" and "z" represent, respectively, the mole fractions of silicon, aluminum and phosporus present in the oxide moiety, said mole fractions being within the compositional area bounded by points A, B, C, D and E on the ternary diagram which is FIG. 5, or preferably within the area bounded by points a, b, c, d and e on the ternary diagram which is FIG. 6, said silicoaluminophosphate having a characteristic X-ray powder diffraction pattern which contains at least the d-spacings set forth below:

| | SAPO-41 | |
|---|---|---|
| 2θ | d(Å) | Relative Intensity |
| 13.6–13.8 | 6.51–6.42 | w–m |
| 20.5–20.6 | 4.33–4.31 | w–m |
| 21.1–21.3 | 4.21–4.17 | vs |
| 22.1–22.3 | 4.02–3.99 | m–s |
| 22.8–23.0 | 3.90–3.86 | m |
| 23.1–23.4 | 3.82–3.80 | w–m |
| 25.5–25.9 | 3.493–3.44 | w–m |

MP-NZMS MOLECULAR SIEVES

The specific NZMSs employed in the instant invention are members of the above described classes and as characterized in their calcined form by an adsorption of isobutane of at least 2 percent by weight, preferably at least 4 percent by weight, at a partial pressure of 500 torr and a temperature of 20° C. and, further, by an adsorption of triethylamine of less than 5 percent by weight, preferably less than 3 percent by weight, at a partial pressure of 2.6 torr and at a temperature of 22° C. For convenient reference, the NZMSs which are characterized by the aforementioned adsorption criteria are denominated herein as "MP-NZMS or as a class as "MP-NZMSs".

As aforementioned, the MP-NZMSs employed herein are characterized by the aforementioned adsorption criteria for isobutane and triethylamine. Specific MP-NZMS species which may be employed herein include MP-NZMSs in one or more of the aforementioned subclasses and having a "−n" designation of −11, −31, −40, and −41. MP-NZMSs include, but are not limited to, ELAPSO-11, ELAPSO-31, ELAPSO-40, ELAPSO-41, CoAPSO-11, CoAPSO-31, FeAPSO-11, FeAPSO-31, MgAPSO-11, MgAPSO-31, MnAPSO-11, MnAPSO-31, TiAPSO-11, ZnAPSO-11, ZnAPSO-31, CoMgAPSO-11, CoMnMgAPSO-11, MeAPO-11, TiAPO-11, TiAPO-31, ELAPO-11, ELAPO-31, ELAPO-40, ELAPO-41 SAPO-11, SAPO-31, SAPO-40 and SAPO-41.

The characterization of the NZMSs employed in the instant invention relates to an adsorption characterization that is carried out on a NZMS which has been subjected to a post synthesis treatment, e.g., calcination, to remove a substantial portion of the template "R" which is present as a result of synthesis. Although a particular MP-NZMS is characterized herein by reference to its adsorption of isobutane or triethylamine as being to the adsorption characteristics of the MP-NZMS in its calcined form, the instant invention necessarily includes the use of a non-calcined or modified MP-NZMSs which are characterized by such adsorption in a modified or calcined form, since upon use of such a non-calcined MP-NZMSs in the instant process at effective reforming conditions the NZMS may be calcined or hydrothermally treated in situ so as to have the characteristic adsorptions of isobutane and triethylamine. Thus, the NZMS may be rendered in situ to a form characterized by the aforementioned adsorption characteristics and, accordingly, such is within the scope of the instant invention. For example, an as-synthesized MnAPO-11 or MgAPSO-11 is not characterized by the aforementioned adsorption characteristics due to the presence of template "R" which is present as a result of synthesis, although the calcined form of MmAPO-11 and MgAPSO-11 are characterized by the aforementioned adsorption of isobutane and triethylamine. Thus, reference to a MP-NZMS having a particular adsorption characteristic in its calcined form is not intended to exclude the use of the MP-NZMS in its as-synthesized form which upon in-situ calcination, hydrothermal treatment and/or other treatment, e.g., ion exchange with suitable atoms, would have such adsorption characteristics.

MP-NZMS-CONTAINING CATALYSTS

The MP-NZMS may be employed in conjunction with a Group VIII metal as a reforming/dehydrocyclization catalyst or may be employed in conjunction with a metal/chlorinated-alumina catalyst(s) as generally employed heretofore as reforming catalysts. In one embodiment a MP-NZMS is employed with a traditional reforming catalyst comprising a Group VIII metal and a chlorinated carrier, e.g., an alumina. The term "carrier" is employed herein in its common meaning to denote a support material for the metal component of the reforming catalyst. In this embodiment the Group VIII metal is generally present in an effective amount from about 0.1 to about 2, preferably from about 0.2 and about 1.2 percent by weight (wt.%), more preferably between about 0.2 and 0.8 wt.%, based on the weight of the carrier, with from about 0.2–2% by weight halogen, preferably chlorine being present, based on the weight of the carrier, e.g., an alumina. (reference to "chlorine" and/or "chlorinated" herein is intended to include the other halogens.) The MP-NZMS component may be present in an amount between about 1 and about 99.9 percent by weight (wt. %), is preferably present in an amount between about 5 and about 70 wt. % and more preferably between about 5 and 40 wt. %, based on the total weight of the catalyst. When a halogenated carrier component is present such as may be present in an effective amount between about 5 and about 95 percent by weight and is preferably present in an effective amount of at least 40 percent by weight, based on the total catalyst weight.

The MP-NZMS-containing catalysts contain an effective amount of one or more Group VIII metals, e.g., nickel, ruthenium, rhodium, palladium, iridium or platinum. In one embodiment the MP-NZMS is employed in a catalyst comprising a first Group VIII metal in conjunction with a second metal component to form a bi-metallic catalyst and, optionally, may also be used with the aforementioned chlorinated-alumina component. The catalyst may contain as the second metal component a second Group VIII metal, a transition metals such as rhenium, tungsten, and/or a metal such as tin.

The preferred Group VIII metal for use herein is platinum. Platinum-containing catalysts generally exhibit high selectivity to high octane products. The percentage of platinum in the catalyst is generally between about 0.1 wt.% and about 2 wt.% and preferably between about 0.2 and about 1.2 wt.%, and most preferably between about 0.2 to 0.8, based on the total catalyst weight. In the prior art it has been observed that the lower limit corresponds to a lower catalyst activity and the upper limit to higher catalyst activity. When a second metal component is employed, the weight ratio of the Group VIII metal, e.g. platinum, to such second metal including a second Group VIII metal or rhenium, is between about 1:5 and about 5:1 and is preferably between about 1:2 and about 2:1. The total amount of the metal components will be in the aforementioned ranges.

The metal component(s) of the MP-NZMS-containing catalyst is generally introduced by means of impregnation using an aqueous solution of an appropriate salt of the desired metal(s). When it is desired to introduce two metal components, the operation may be carried out simultaneously or sequentially. The addition of the metal component(s) to the instant reforming catalyst depends in part on the formulation of the reforming catalyst. If it is desired that the MP-NZMS be employed as the carrier for the metal component, it is believed that the metal component should be added to the MP-NZMS before the MP-NZMS is calcined to remove the organic templating agent present as a result of the MP-NZMS synthesis. It is believed that the addition of the metal to the template-containing MP-NZMS effects the distribution of the metal in a favorable way by preventing the metal species from blocking the pores of the MP-NZMS and affecting the activity of the MP-NZMS. It is believed that when the metal component is added to the MP-NZMS, acting as the carrier for the metal component, as a cationic species, that it is preferred to add such cationic metal component prior to calcination of the MP-NZMS whereby organic templating agent is removed, such being present as a result of the synthesis of the MP-NZMS. This procedure is believed to aid in preventing blockage of the pores of the MP-NZMS by cationic metal species. It is believed that the calcined form of the MP-NZMS may be employed as the carrier for the metal component when anionic metal species are employed as the source of the metal component. When the metal component of the catalyst is added by addition to a separate carrier component, such as an aluminia (including transition aluminas and gamma aluminas), to form a discrete component, the metal/carrier component is admixed with the MP-NZMS. The mixture may then be mixed with a binder, e.g., a silica, if any, and formed, e.g., by coextrusion, into the final catalyst. In another embodiment, an as-synthesized MP-NZMS (containing template) and a carrier may be mixed prior to the impregnation or other introduction of the metal component. The template can then be removed by calcination under conditions effective for the removal of the organic templating agent from the MP-NZMS.

By way of example, platinum can be introduced to the catalyst by impregnating (or other suitable addition process) a carrier, e.g., a gamma-alumina, or a MP-NZMS, e.g., SAPO-11, with an aqueous solution of tetrammineplatinum (II) nitrate, chloroplatinic acid, chloroplatinuous acid, dinitrodiamino-platinum, tetrammineplatinum (II) chloride, anionic platinum complexes or cationic platinum complexes (such as tetrammineplatinum (II) nitrate). Similar compounds of the other metal components may be employed. The use of a halogen containing (e.g., chlorine) salt or complex of platinum is generally beneficial in providing halogen (e.g., chloride or chloro-species) component, if any is desired, in the final catalyst.

An inorganic oxide is generally employed as a carrier for the metal component. In addition, an inorganic oxide may be employed, as an optional component, as a binder component for the final catalyst. The inorganic oxides employable as a carrier for the metal and/or as a matrix component and/or as a binder component can be a natural or synthetically produced inorganic oxide or combination of inorganic oxides. Typical inorganic oxides which can be used include clays, aluminas (preferably transition- and gamma-alumina), silicas, silica-aluminas, titanias, magnesia, alumina-boria, alumina-titania, and mixtures thereof. The preferred inorganic oxide carrier for the metal component(s) is believed to be an alumina, and more preferably a gamma-alumina. The preferred binder components are believed to be aluminas and silicas. The inorganic oxide component present as a binder or matrix component may be present in an amount from zero (0) to about 25 weight percent, based on the total catalyst weight, said amount not including any inorganic oxide present as a carrier for the metal component.

In one embodiment, a MP-NZMS is preferably added to the metal/chlorinated carrier component as a separate component. As discussed above, it is believed that the preparation uses a cationic metal species to provide the metal component to a carrier separate from calcined MP-NZMS that such may prevent possible deactivation of the calcined MP-NZMS by the use of such cationic metal species to provide the metal component in the catalyst containing a calcined MP-NZMS.

The MP-NZMS-containing catalysts can be employed in any of the conventional catalyst forms known to the art for reforming and/or dehydrocyclization catalysts, including pills, pellets, granules, broken fragments, or various special shapes. The catalysts can be employed in heretofore employed bed configurations including a fixed bed within a reaction zone, and the charging stock may be passed therethrough in the liquid, vapor (preferably the vapor phase), or mixed phase in either upward or downward flow. Alternatively, the catalyst may be prepared in a suitable form for use in moving beds, or in fluidized-solid processes, in which the charging stock is passed upward through a turbulent bed of finely divided catalyst. The instant catalyst(s) may be used in semi-regenerative, cyclic, semicyclic, or continuous reforming processes. Such processes are well known. The reaction products from any of the foregoing processes are separated from the catalyst, vented to atmospheric pressure, and fractionated to recover the various components thereof.

In one embodiment the MP-NZMS-containing catalyst(s) of the instant invention may be employed in a tail reactor as the last catalyst bed in a process employing multiple catalyst beds. The first catalyst in such an embodiment would comprise a traditional reforming and-/or dehydrocyclization catalyst and would generally be the same catalyst as employed in the instant process, except such would not contain the MP-SAPO component.

After the desired metal(s) has been introduced, the catalyst is typically treated in air at about 400° to 600° C., preferably about 500° C.±50° C., and then reduced in the presence of a hydrogen-containing gas at temperatures of between about 200° C. and about 700° C., preferably between about 350° C. and about 500° C.

In some instances the selectivity of a MP-NZMS-containing catalyst may benefit from an initial deactivation by steaming, coking or by treatment with sulfur compounds. Such deactivation methods are well known in the art to provide improved selectivity by decreasing the initial activity of the catalyst.

FEEDSTOCKS

The feedstock in reforming is typically a mixed hydrocarbon fraction containing significant quantities of paraffinic hydrocarbons, commonly available in a typical refinery. Suitable feedstocks include, naphthas (virgin, cracked or Fischer-Tropsch), highly paraffinic straight-run naphthas, paraffinic raffinates from aromatic extraction or adsorption, upstream reformate feedstocks, heavy hydrocracked gasoline fractions, $C_6$–$C_9$ paraffin-rich streams and the like refinery streams. In the case of cracked naphthas, the naphtha is generally hydrogenated prior to use to reduce the presence of olefinic compounds. In a typical reforming operation the feedstock is a naphtha or petroleum fraction boiling in the range of between about 80° F. and about 450° F., and preferably between about 180° F. and about 380° F. Such fractions usually contain from about 20 to about 80 volume % paraffins, both normal and branched, which fall in the range of about $C_5$ to $C_{12}$. In one embodiment, the feedstock contains paraffinic hydrocarbons having about 6 to 12 carbon atoms per molecule. It is to be understood that such acyclic hydrocarbons can be charged individually, in admixture with one or more of the other acyclic hydrocarbons, or in admixture or as components of other hydrocarbon mixtures such as naphthenes, aromatics and the like.

Feedstocks comprising essentially acyclic hydrocarbons may be employed herein if dehydrocyclization is the desired reaction and can in general be any acyclic hydrocarbon capable of undergoing ring-closure to produce an aromatic hydrocarbon. That is, it is intended to include within the scope of the present invention, the dehydrocyclization of any acyclic hydrocarbon capable of undergoing ring-closure to produce an aromatic hydrocarbon under effective process conditions for reforming and/or dehydrocyclization. More particularly, suitable acyclic hydrocarbons include acyclic hydrocarbons containing 6 or more carbon atoms per molecule such as $C_6$–$C_{12}$ paraffins. Specific examples of suitable acyclic hydrocarbons are paraffins such as n-hexane, 2-methylpentane, 3-methylpentane, n-heptane, 2-methylhexane, 3-methylhexane, 3-ethyl-pentane, 2,5-dimethylhexane, n-octane, 2-methylheptane, 3-methylheptane, 4-methylheptane, 3-ethylhexane, n-nonane, 2-methyloctane, 3-methyloctane, n-decane and the like compounds.

Preferably, the feedstocks employed in reforming are substantially free of sulfur, nitrogen, metals, and other known poisons for reforming catalysts. The feedstock can have sulfur, nitrogen, metals, and other known poisons removed by conventional hydrotreating techniques plus sorbers that removes such compounds.

In the case of a feedstock which is not already low in sulfur, acceptable sulfur levels can be obtained by hydrofining the feedstock in a pretreatment zone where the naphtha is contacted with a hydrofining catalyst which is resistant to sulfur poisoning. A suitable catalyst for hydrodesulfurization is, for example, an alumina-containing support containing molybdenum oxide, cobalt oxide and/or nickel oxide. Hydrodesulfurization is ordinarily conducted at 315° C. to 455° C., at 200 to 2000 psig, and at a liquid hourly space velocity of 1 to 5. The sulfur and nitrogen contained in the naphtha are converted to hydrogen sulfide and ammonia, respectively, which can be removed prior to reforming by suitable conventional processes.

REFORMING PROCESSES

Reforming processes may be carried out over a wide range of effective reforming process conditions. The actual process conditions depend on the particular reforming catalyst, the feedstock, the desired products, the reforming process design and the like. Process conditions for Catalytic reforming, Magnaforming, Platforming, Powerforming, Rheniforming and Ultraforming are well known in the art (see: "Hydrocarbon Processing," September 1982, at pages 164, 165, 166, 167, 168 and 169, respectively; incorporated herein by reference). Magnaforming is described at pages 111 to 114 of "Hydrocarbon Processing," June 1974 (incorporated herein by reference). A description of a representative reforming process is disclosed in U.S. Pat. No. 4,018,771 at column 5, line 19 to column 6, line 50, said passage incorporated herein by reference.

The feedstock is contacted with the catalyst under effective reforming conditions as heretofore employed in the prior art. This contacting may be accomplished by using the catalyst in a fixed bed sytem, a moving bed system, a fluidized system, or in a batch-type operation. In a fixed bed system, the feedstock is preheated by any suitable heating means to the effective reforming process temperature and pressure and then passed into a reforming zone containing a bed of the catalyst. It is, of course, understood that the reforming process may be one or more separate reactors with suitable means therebetween to ensure that the desired conversion temperature is maintained at the entrance to each reactor. It is also important to note that the reforming feedstock may be contacting with the catalyst bed in either upward, downward, or radial flow fashion. In addition, the reactants may be in a liquid phase, a mixed liquid-vapor phase, or a vapor phase when they contact the catalyst. A reforming process typically comprises two or more fixed beds or dense-phase moving beds of the catalyst. In a multiple bed system, it is, of course, within the scope of the present invention to use the present catalyst in less than all of the beds with a conventional reforming catalyst being used in one or more upstream beds of the multi-bed system. The reforming zone may be one or more separate reactors with suitable heating means therebetween to compensate for the endothermic nature of the reforming process that takes place in each catalyst bed.

Reforming generally results in the production of hydrogen. Thus, exogenous hydrogen need not necessarily be added to the reforming system except for prereduction of the catalyst and when the feed is first introduced. Generally, once reforming is underway, part of the hydrogen produced is recirculated over the catalyst. The presence of hydrogen is generally understood in the art to reduce the formation of coke which tends to deactivate the catalyst. Hydrogen is preferably introduced into the reforming reactor(s) at a rate varying from greater than zero to about 30 moles of hydrogen per mole of feedstock. The hydrogen can be added in admixture with light gaseous hydrocarbons.

Although hydrogen may be used, in some cases other art-recognized diluents may be advantageously utilized, either individually or in admixture with hydrogen. Other diluents include $C_1$ to $C_5$ paraffins such as methane, ethane, propane, butane and pentane and mixtures thereof. If, after a period of operation, the reforming catalyst has become deactivated by the presence of carbonaceous deposits, said deposits can be removed from the catalyst by passing an oxygen-containing gas, such as dilute air. Chlorine and/or chloro-compounds (in the presence of an oxygen-containing gas) are generally brought into contact with the catalyst to aid in redistribution of metal components present in the catalyst, if necessary. Regeneration of the MP-NZMS-containing catalyst may be performed in the semi-regenerative mode in which the reforming operation is interrupted after a period of time and catalyst regeneration is carried out, or in the onstream regenerative mode, in which a portion of the catalyst is regenerated while the reforming operation is continued over the remainder of the catalyst. Two types of onstream regeneration are generally known in the prior art, cyclic and continuous (in situ regeneration). In cyclic reforming, the catalyst in one of a series of reactors is regenerated while reforming is continued in the remainder of the reactors. In continuous reforming, a portion of deactivated catalyst is removed from operation, regenerated in a separate regeneration system while reforming is continued, and the regnerated catalyst is then returned to the reforming operation. The method of regenerating the catalyst will depend on whether there is a fixed bed, moving bed, or fluidized bed operation and the particular process constraints of the refiner. Regeneration methods and conditions for reforming are well known in the art and such are generally employable with the instant MP-NZMS-containing catalysts.

In the following examples the products were evaluated in several respects by determining:

$$\text{Calculated Density of } C_5+ \text{ Product} = \frac{\text{Wt \% } C_5+}{\sum_{i}^{n} (\text{Wt. \%}_i/\text{Density}_i)}$$

where i a component and n is the number of components present in the products.

$$\text{Calculated Volume \% } C_5+ \text{ Yield} = \frac{(\text{Wt. } C_5 \text{ Product})/(\text{Calculated } C_5+)\text{Density}}{(\text{Wt. Feed})/(\text{Feed Density})}$$

The Research Octane Number (RON) of the $C_5+$ product (products containing five or more carbons) was calculated using the published octane numbers for individual $C_5+$ components and from their volume percent in the $C_5+$ product. The volume % of individual $C_5+$ components was calculated as follows:

$$\text{Vol \% Component}_g = \frac{(\text{Wt. \% Component}_g \text{ in } C_5+)/(\text{Density}_g) \times 100}{\sum_{i}^{n} (\text{Wt. \% Component}_i)/(\text{Density}_i)}$$

where "g" is a particular component in products and "i" represents all components summed over all "n" components in $C_5+$ products.

The calculated RON was determined for the $C_5+$ product according to:

$$\text{Calculated RON} = \sum_{i}^{n} \left( RON_i \times \frac{(\text{Volume \% Component})_i}{100} \right)$$

where $RON_i$ is the blending research octane numbers for component "i".

The following examples are provided to illustrate the invention and are not intended to be limiting thereof:

EXAMPLE 1

(a) A reference catalyst (denominated "Reference Catalyst A") was prepared with a CATAPAL (pseudoboehmite) alumina (CATAPAL is a trademark of Condea Alumina SB), which was calcined in air at 200° C. for 4 hours and heated for 16 hours at 540° C. to form a gamma-alumina. A twenty four-gram sample of the gamma alumina was impregnated with a solution containing 0.48 grams of $H_2PtCl_2$ and 0.96 grams of $Al(NO_3)_3$ in 8.4 grams of water. The alumina and the $H_2PtCl_2$ solution were mulled, dried at room temperature for one hour, remulled and then dried at 121° C. for 16 hours. The dried product (Pt/Cl-alumina component) was then calcined in air at 260° C. for two hours. The calcined product was formed into 1/16" extrudates by mixture with $SiO_2$ and the final extrudates contained 20 wt.% $SiO_2$ (LUDOX AS 40) binder. The $SiO_2$ was gelled prior to use with ammonium acetate (1 ml. of 16.7 wt.% ammonium acetate per gram of $SiO_2$). The extrudates were dried in air at 110° C. overnight for 16 hours and calcined in air at 540° C. for 3 hours. The extrudates were ground to form a 40-60 mesh (U.S. Standard). Reference Catalyst A contained the following amounts of platinum and chloride:

|    | Wt. % |
|----|-------|
| Pt | 0.63  |
| Cl | 0.25  |

(b) A catalyst according to the instant invention was prepared by preparing a mixture containing 60 wt.% of the Pt/Cl-alumina component, as prepared in part (a) in the preparation of Reference Catalyst A, and 40 wt.% of a SAPO-11, as disclosed in U.S. Pat. No. 4,440,871.

SAPO-11 was prepared according to example 17 of U.S. Pat. No. 4,440,871, except that the crystallization time was 24 hours instead of 48 hours. A reaction mixture was prepared by combining 23.06 grams of 85 wt.% orthophosphoric acid ($H_3PO_4$) and 23.06 grams of water, to which was added 13.81 grams of a hydrated aluminum oxide (a pseudoboehmite phase, 74.2 wt.% $Al_2O_3$, 25.8 wt.% $H_2O$) and stirred until homogeneous. To this mixture was added a mixture of 3.90 grams of a fumed silica (92.8 wt.% $SiO_2$, 7.2 wt.% $H_2O$) in 103.5 grams of a solution of 25.0 wt.% tetra-n-butylammonium hydroxide (TBAOH) in methanol. This mixture was stirred until homogeneous and then 20.41 grams of di-n-propylamine was added with stirring unitl a homogeneous mixture was obtained. The composition of the final reaction mixture in molar oxide ratios was:

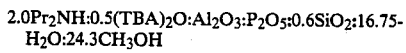

A portion of the reaction mixture was placed in a stainless steel pressure vessel lined with an inert plastic material and heated in an oven at 200° C. at autogenous pressure for 24 hours. The solid reaction product was recovered by centrifuging, washing with water, and was then dried in air at room temperature. A portion of the solids was submitted for X-ray and chemical analysis and gave an X-ray powder diffraction pattern representative of SAPO-11. By chemical analysis, the composition was found to be 31.5 wt.% $Al_2O_3$, 40.9 wt.% $P_2O_5$, 12.0 wt.% $SiO_2$, 8.1 wt.% C, 1.2 wt.% N, and 13.9 wt.% LOI. The SAPO-11 product was then calcined at above 450° C. in air to remove the organic templating agent.

The SAPO-11 and Pt/Cl-alumina component were mixed with 20 wt.% $SiO_2$ binder, as discussed in part (a), and extruded. The extrudate was dried at 110° C. overnight (~16 hours) and calcined in air at 540° C. for 3 hours. This catalyst was denominated "Catalyst B".

(c) A Comparative Catalyst (containing SAPO-5) was prepared according to the procedure employed in part (b), except SAPO-5 was employed in placed of SAPO-11. SAPO-5 was prepared according to examples 9 and 11 of U.S. Pat. No. 4,440,871, except that the organic templating agent was tetrapropylammonium hydroxide, the gel $SiO_2/Al_2O_3$ ratio was 0.6 and the gel contained $40H_2O$. The reaction mixture was prepared by combining triethylphosphate and water, to which was added a pseudoboehmite alumina. The mixture was stirred until homogeneous. To this mixture was added a dispersion of a fumed silica (92.8 wt.% $SiO_2$, 7.2 wt.% $H_2O$), and an aqueous solution of 40% tetra-n-propylammonium hydroxide (TPAOH), and the mixture stirred until homogeneous. The composition of the final reaction mixture in molar oxide ratios was:

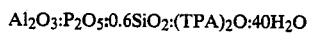

A portion of the reaction mixture was sealed in a stainless steel pressure vessel lined with an inert plastic material and heated in an oven at 200° C. at autogenous pressure for 24 hours. The solid reaction product was recovered by centrifuging, washing with water and then dried in air at room temperature. The product was analyzed and gave an X-ray powder diffraction pattern characteristic of SAPO-5. The product was calcined at above 450° C. in air to remove organic templating agent. This catalyst was denominated "Catalyst C".

EXAMPLE 2

The catalysts prepared in example 1 were evaluated as dehydrocyclization catalysts using a technical grade n-hexane feedstock containing:

|                              | Wt. %  |
|------------------------------|--------|
| n-hexane                     | 86.357 |
| methylcyclopentane           | 9.694  |
| 3-methylpentane              | 3.741  |
| 2-methylpentane              | 0.207  |
| RON (Research Octane Number) | 29.27  |

The catalysts (A, B and C) were evaluated using a micro reactor comprising a stainless steel tube (⅛" (ID)) and using about 0.350 to 0.359 grams of the selected catalyst (40×60 mesh, U.S. Standard). The selected catalyst was heated to 900° F. over 2½ to 3 hours under $H_2$ (120 ml/min 100 psig) and held at 900° F. for one hour and cooled to 860° F. The $H_2$ was lowered to 75 ml./min. and the feed was then introduced into the micro reactor. The micro reactor was maintained at the process temperature by a fluidized sandbath.

Each catalyst was evaluated by preheating the micro reactor at a temperature of about 860° F. or at about 900° F. The n-hexane feed was then introduced at a pressure of 100 psig, a Weight Hourly Space Velocity (WHSV) of 7.7 and a hydrogen/feed molar ratio of 5.4.

Products were collected at selected run times and the products were analyzed by gas chromatography. The weight percent products and other reported values were computed on the basis of a 100% material balance. The volume % was calculated using product densities and assuming no volume changes occurred upon mixing of product components. The RON of the feedstock and products was calculated using the calculated volume percents and the blending research octane numbers of the individual components.

Figure 2:
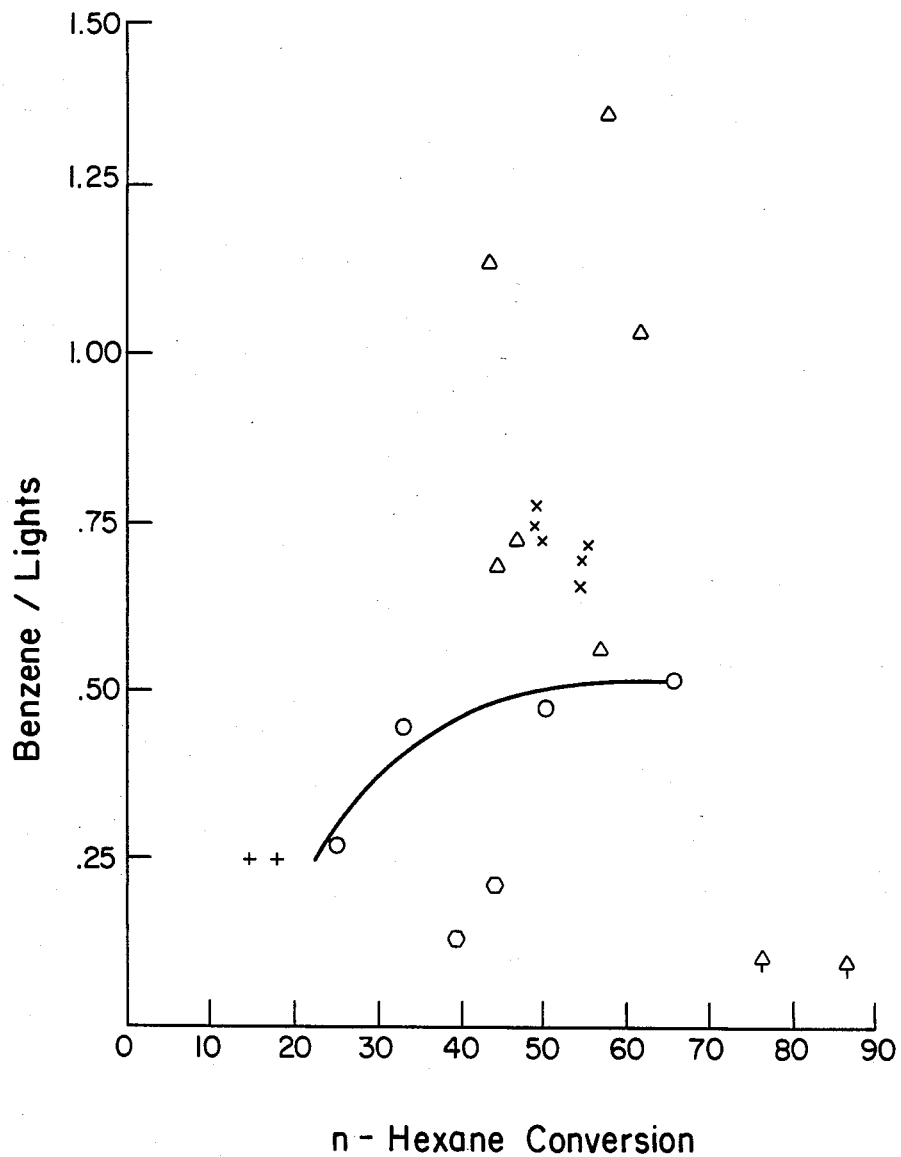
FIG. 2 depicts the relationship between the ratio of benzene/lights in the products as a function of the n-hexane conversion for examples 2 to 10.
Figure 3:
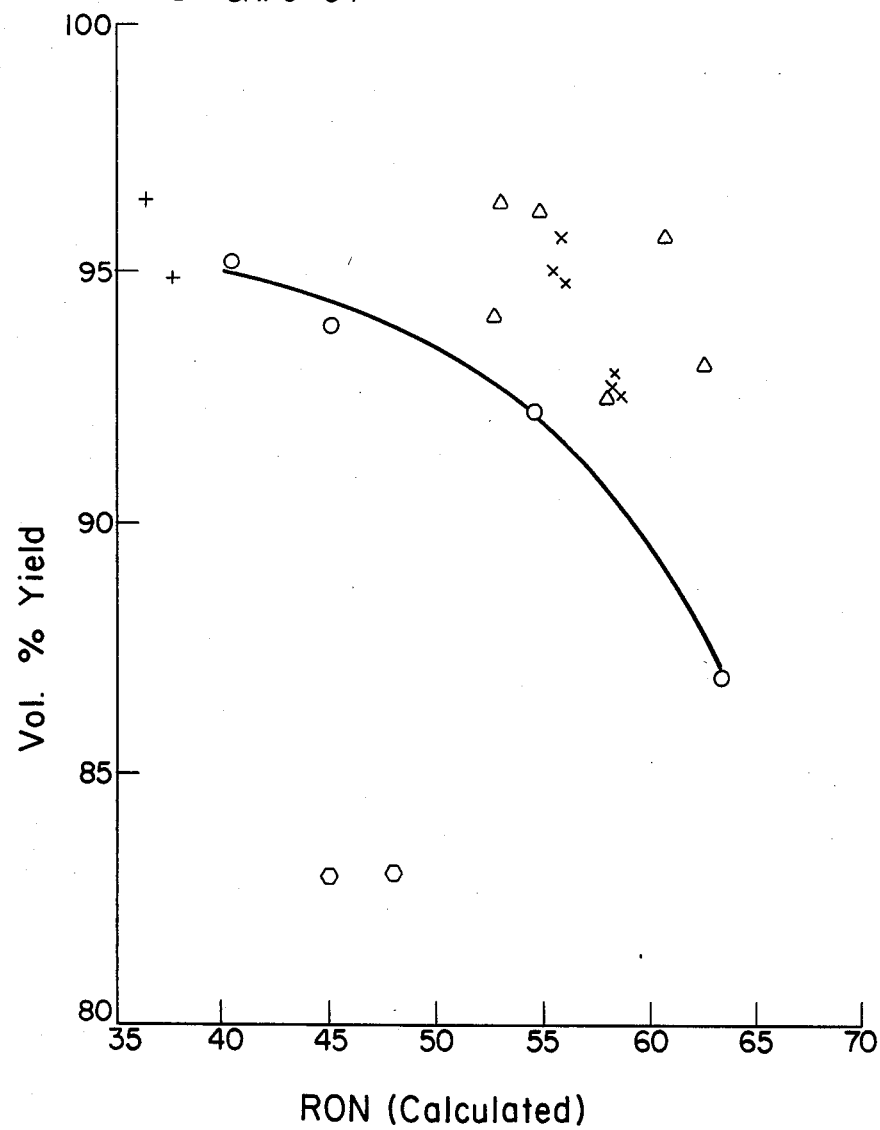
FIG. 3 depicts the relationship between the calculated Volume % Yield and the calculated Research Octane Number (RON) for the products of examples 2 to 9.
Figure 4:
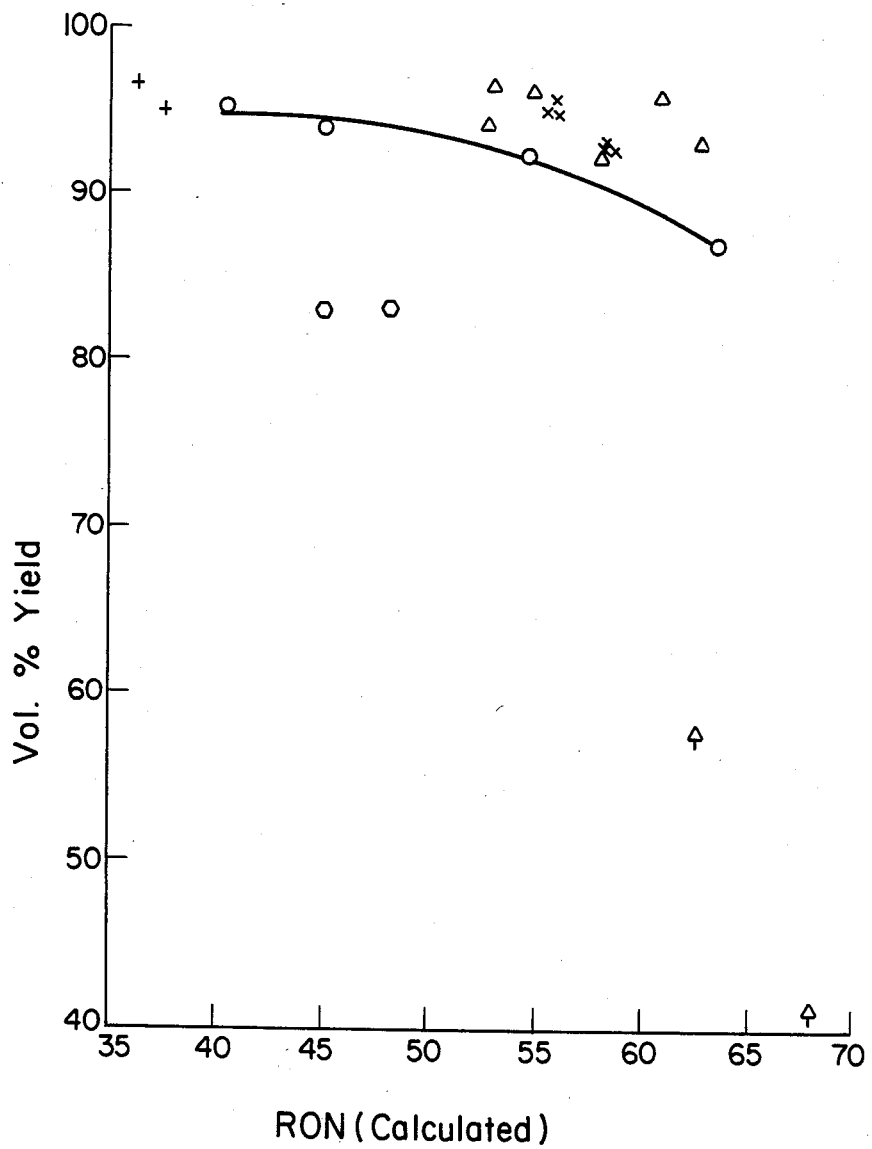
FIG. 4 depicts the relationship between the calculated Volume % Yield and the calculated Research Octane Number (RON) for the products of examples 2 to 10.

The results of the evaluation of Catalysts A, B and C are set forth in Tables I, II and III for each catalyst, respectively, at temperatures of 860° F. (Tables I-1, II-1 and III-1) and 900° F. (Tables I-2, II-2 and III-2). The results, as set forth in Tables I, II and III, demonstrate the dramatic effect that SAPO-11 has in a reforming-/dehydrocyclization process when employed with a Pt/Cl-alumina-type catalyst. The SAPO-11 provides an improvement in the ratio of benzene to lights ("lights" are $C_1$ to $C_5$ products) and iso-$C_6$s to lights as a function of the conversion. FIGS. 1 and 2 graphically depict the ratios of iso-$C_6$s/lights and benzene/lights as a function of n-hexane conversion for Catalysts A, B and C. FIG. 3 and FIG. 4 (containing different scales) graphically depict the volume % yield as a function of the Research Octane Number (RON) for Catalysts A, B and C. The RON (calculated) and $C_5+$ Yield for each catalyst was calculated using the components containing five or more carbon atoms, as above described.

For Reference Catalyst A, the average of the two data points at 20 and 21 hours from Table I-1 showed that 95.05 weight percent of the total hydrocarbon product is $C_5$ or $C_6$ and the $C_5+$ product is 95.23 volume percent of the n-hexane feed from which it was derived. The calculated RON for the $C_5+$ product was 40.41. Table I-2 shows that the corresponding values for a 900° F. reaction temperature were 94.22 weight percent $C_5+$, 93.89 volume percent $C_5+$ and a RON of 45.00. Analysis of the sample taken at 20 hours in Table I-1 gave a 94.9 weight percent $C_5-C_6$ produce (95.1 volume percent), a calculated RON of 39.7, 1.7 weight percent benzene, 20.7 weight percent isohexanes (ISO), 5.2 weight percent $C_1-C_4$ gases (HC), and ISO/HC ratio of 4.1 and a benzene/HC ratio of 0.37.

The results for Catalyst B (SAPO-11) in Table II-1 at 20 hours gave a 97.4 weight percent yield (96.9 volume percent), a calculated RON of 55.4, 2.9 weight percent benzene, 39.4 weight percent isohexanes (ISO), 2.6 weight percent $C_1-C_4$ gases (HC), an ISO/HC weight ratio of 15.0 and a benzene/HC ratio of 1.1. These results demonstrate the improved selectivity to higher octane products of Catalyst B, as compared to Catalyst A. The improvement in the calculated RON of the products from 39.7 to 55.4 occurred with a concurrent increase in the yield (weight percent and volume percent).

The results for Comparative Catalyst C (containing SAPO-5) for the product sampled at 20.25 hours in Table III-1 gave a 97.1 weight percent yield of $C_5-C_6$ products (96.7 volume percent yield), a calculated RON of products of 36.5, 1.0 weight percent benzene, 11.1 weight percent isohexanes (ISO), 2.9 weight percent $C_1-C_4$ gases (HC), an ISO/HC ratio of 3.8 and a benzene/HC ratio of 0.35. A comparison of results obtained by use of Catalyst C and the results obtained by use of Reference Catalyst A demonstrates that the addition of SAPO-5 to Reference Catalyst A did not improve the selectivity to gasoline products. In contrast, a comparison of the results from Reference Catalyst A and Comparative Catalyst C (SAPO-5) with the results obtained by use of Catalyst B (SAPO-11) demonstrates the significant improvement that use of Catalyst B (SAPO-11) had on the calculated RON of the products. This improvement is graphically depicted in FIG. 3 where the solid line denotes Reference Catalyst A and wherein it is shown that Catalyst B (SAPO-11) provide improvement over Reference Catalyst A.

TABLE I-1

| (Catalyst A(Ref))[1] | | |
|---|---|---|
| GC PRODUCT ANALYSIS: (WEIGHT PERCENT): | | |
| METHANE | 0.83 | 0.75 |
| ETHANE | 0.90 | 0.79 |
| PROPANE | 2.26 | 2.02 |
| ISOBUTANE | 0.00 | 0.05 |
| N—BUTANE | 1.23 | 1.07 |
| ISO-PENTANE | 0.21 | 0.19 |
| N—PENTANE | 1.89 | 1.84 |
| TOTAL LIGHTS ($C_5-$) | 7.31 | 6.72 |
| 2,2 DIMETHYL BUTANE | 0.14 | 0.15 |
| 2 METHYL PENTANE | 11.23 | 11.66 |
| 3 METHYL PENTANE | 9.32 | 9.83 |
| N—HEXANE | 65.45 | 63.78 |
| METHYL CYCLOPENTANE (MCP) | 4.88 | 5.59 |
| CYCLOHEXANE | 0.00 | 0.06 |
| TOTAL $C_6$ SATURATES | 91.01 | 91.07 |
| BENZENE | 1.67 | 2.21 |
| CALCULATIONS: | | |
| RON (CALCULATED) | 40.41[2] | —[2] |
| VOLUME % YIELD | 95.23[2] | —[2] |
| METHANE/PROPANE | 0.37 | 0.37 |
| ISO-BUTANE/N—BUTANE | 0.00 | 0.05 |
| ISO-PENTANE/N—PENTANE | 0.11 | 0.10 |
| CONVERSION (Vol. %) | 24.21 | 26.14 |
| BENZENE SEL. %[3] | 6.91 | 8.46 |
| LIGHTS SEL. %[3] | 30.20 | 25.70 |
| MCP SEL. % | −19.90 | −15.70 |
| ISO-$C_6$ SEL. %[3] | 69.15 | 67.91 |
| HOURS ON STREAM | 20.0 | 21.0 |
| TEMPERATURE (°F.) | 860 | 860 |

[1]Catalyst Weight: 0.359 grams.
[2]Average value of both samples.
[3]FIGS. 1 & 2 use average values of both samples.

TABLE I-2

| (Catalyst A (Ref.))[1] | | |
|---|---|---|
| GC PRODUCT ANALYSIS: (WEIGHT PERCENT): | | |
| METHANE | 0.74 | 0.92 |
| ETHANE | 0.83 | 1.07 |
| PROPANE | 1.98 | 2.48 |
| ISOBUTANE | 0.07 | 0.12 |
| N—BUTANE | 0.96 | 1.27 |
| ISO-PENTANE | 0.24 | 0.24 |
| N—PENTANE | 1.39 | 1.58 |
| TOTAL LIGHTS ($C_5-$) | 6.23 | 7.68 |
| 2,2 DIMETHYL BUTANE | 0.36 | 0.35 |
| 2 METHYL PENTANE | 12.90 | 12.35 |
| 3 METHYL PENTANE | 10.73 | 10.24 |
| N—HEXANE | 60.00 | 59.43 |
| METHYL CYCLOPENTANE (MCP) | 6.71 | 6.61 |
| CYCLOHEXANE | 0.00 | 0.00 |
| TOTAL $C_6$ SATURATES | 90.70 | 88.97 |
| BENZENE | 3.07 | 3.35 |
| CALCULATIONS: | | |
| RON (CALCULATED) | 45.00[2] | —[2] |
| VOLUME % YIELD | 93.89[2] | —[2] |
| METHANE/PROPANE | 0.38 | 0.37 |
| ISO BUTANE/N—BUTANE | 0.08 | 0.10 |
| ISO-PENTANE/N—PENTANE | 0.17 | 0.15 |
| CONVERSION (Vol. %) | 30.52 | 31.19 |
| BENZENE SEL. %[3] | 10.05 | 10.74 |
| LIGHTS SEL.%[3] | 20.43 | 24.62 |
| MCP SEL. % | −9.76 | −9.90 |
| ISO-$C_6$ SEL. %[3] | 65.65 | 60.90 |

TABLE I-2-continued (Catalyst A (Ref.))[1]

| | | |
|---|---|---|
| HOURS ON STREAM | 25.00 | 26.25 |
| TEMPERATURE (°F.) | 902 | 901 |

[1]Catalyst Weight: 0.359 grams.
[2]Average value of both samples.
[3]FIGS. 1 & 2 use average values of both samples.

TABLE II-1

(Catalyst B (SAPO-11))[1]

| | | |
|---|---|---|
| GC PRODUCT ANALYSIS: (WEIGHT PERCENT): | | |
| METHANE | 0.14 | 0.21 |
| ETHANE | 0.25 | 0.39 |
| PROPANE | 1.83 | 2.93 |
| ISOBUTANE | 0.06 | 0.07 |
| N—BUTANE | 0.35 | 0.35 |
| ISO-PENTANE | 0.14 | 0.11 |
| N—PENTANE | 0.30 | 0.27 |
| TOTAL LIGHTS ($C_5^-$) | 3.07 | 4.33 |
| 2,2 DIMETHYL BUTANE | 0.42 | 0.31 |
| 2 METHYL PENTANE | 22.31 | 21.20 |
| 3 METHYL PENTANE | 16.72 | 16.09 |
| N—HEXANE | 45.57 | 46.46 |
| METHYL CYCLOPENTANE (MCP) | 8.95 | 9.02 |
| CYCLOHEXANE | 0.09 | 0.07 |
| TOTAL $C_6$ SATURATES | 94.06 | 93.16 |
| BENZENE | 2.87 | 2.51 |
| CALCULATIONS: | | |
| RON (CALCULATED) | 54.89[2] | —[2] |
| VOLUME % YIELD | 96.25[2] | —[2] |
| METHANE/PROPANE | 0.08 | 0.07 |
| ISO-BUTANE/N—BUTANE | 0.17 | 0.20 |
| ISO-PENTANE/N—PENTANE | 0.47 | 0.42 |
| CONVERSION (Vol %) | 47.23 | 46.19 |
| BENZENE SEL. %[3] | 6.08 | 5.43 |
| LIGHTS SEL. %[3] | 6.50 | 9.38 |
| MCP SEL. % | −1.57 | −1.45 |
| ISO-$C_6$ SEL. %[3] | 75.35 | 73.00 |
| HOURS ON STREAM | 20.00 | 23.00 |
| TEMPERATURE (°F.) | 862 | 863.6 |

[1]Catalyst Weight: 0.350 grams.
[2]Average value of both samples.
[3]FIGS. 1 & 2 use average values of both samples.

TABLE II-2

(Catalyst B (SAPO-11))[1]

| | | |
|---|---|---|
| GC PRODUCT ANALYSIS (WEIGHT PERCENT): | | |
| METHANE | 0.33 | 0.24 |
| ETHANE | 0.69 | 0.43 |
| PROPANE | 5.47 | 2.80 |
| ISOBUTANE | 0.28 | 0.11 |
| N—BUTANE | 0.82 | 0.58 |
| ISO-PENTANE | 0.26 | 0.26 |
| N—PENTANE | 0.44 | 0.47 |
| TOTAL LIGHTS ($C_5^-$) | 8.30 | 4.88 |
| 2,2 DIMETHYL BUTANE | 0.74 | 0.81 |
| 2 METHYL PENTANE | 22.89 | 23.59 |
| 3 METHYL PENTANE | 17.58 | 17.93 |
| N—HEXANE | 39.11 | 41.28 |
| METHYL CYCLOPENTANE | 7.61 | 7.61 |
| CYCLOHEXANE | 0.10 | 0.07 |
| TOTAL $C_6$ SATURATES | 88.02 | 91.28 |
| BENZENE | 3.68 | 3.84 |
| CALCULATIONS: | | |
| RON (CALCULATED) | 58.00[2] | —[2] |
| VOLUME % YIELD | 92.50 | —[2] |
| METHANE/PROPANE | 0.06 | 0.08 |
| ISO-BUTANE/N—BUTANE | 0.34 | 0.20 |
| ISO-PENTANE/N—PENTANE | 0.59 | 0.54 |
| CONVERSION (Vol. %) | 54.72 | 58.54 |
| BENZENE SEL. %[3] | 6.73 | 6.55 |
| LIGHTS SEL. %[3] | 15.16 | 8.34 |
| MCP SEL. % | −3.81 | 12.72 |
| ISO-$C_6$ SEL. %[3] | 68.28 | 71.95 |
| HOURS ON STREAM | 25.00 | 26.25 |

TABLE II-2-continued (Catalyst B (SAPO-11))[1]

| | | |
|---|---|---|
| TEMPERATURE (°F.) | 902 | 901 |

[1]Catalyst Weight: 0.350 grams.
[2]Average value of both samples.
[3]FIGS. 1 & 2 use average values of both samples.

TABLE III-1

(Catalyst C (SAPO-5))[1]

| | | |
|---|---|---|
| GC PRODUCT ANALYSIS (WEIGHT PERCENT): | | |
| METHANE | 0.00 | 0.00 |
| ETHANE | 0.27 | 0.15 |
| PROPANE | 2.42 | 1.94 |
| ISOBUTANE | 0.46 | 0.44 |
| N—BUTANE | 0.31 | 0.35 |
| ISO-PENTANE | 0.32 | 0.34 |
| N—PENTANE | 0.14 | 0.14 |
| TOTAL LIGHTS ($C_5^-$) | 3.92 | 3.36 |
| 2,2 DIMETHYL BUTANE | 0.10 | 0.09 |
| 2 METHYL PENTANE | 4.63 | 4.52 |
| 3 METHYL PENTANE | 6.64 | 6.62 |
| N—HEXANE | 73.51 | 73.80 |
| METHYL CYCLOPENTANE (MCP) | 10.28 | 10.59 |
| CYCLOHEXANE | 0.10 | 0.00 |
| TOTAL $C_6$ SATURATES | 95.26 | 95.62 |
| BENZENE | 0.82 | 1.01 |
| CALCULATIONS: | | |
| RON (CALCULATED) | 36.27[2] | —[2] |
| VOLUME % YIELD | 96.52[2] | —[2] |
| METHANE/PROPANE | 0.00 | 0.00 |
| ISO-BUTANE/N—BUTANE | 1.48 | 1.26 |
| ISO-PENTANE/N—PENTANE | 2.27 | 2.40 |
| CONVERSION (Vol. %) | 14.88 | 14.54 |
| BENZENE SEL. %[3] | 5.52 | 6.97 |
| LIGHTS SEL. %[3] | 26.33 | 23.13 |
| MCP SEL. % | 3.93 | 6.17 |
| ISO-$C_6$ SEL. %[3] | 50.58 | 50.09 |
| HOURS ON STREAM | 19.50 | 20.25 |
| TEMPERATURE (°F.) | 859 | 859 |

[1]Catalyst Weight: 0.354 grams.
[2]Average value of both samples.
[3]FIGS. 1 & 2 use average values of both samples.

TABLE III-2

(Catalyst C (SAPO-5))[1]

| | | |
|---|---|---|
| GC PRODUCT ANALYSIS (WEIGHT PERCENT): | | |
| METHANE | 0.09 | 0.11 |
| ETHANE | 0.42 | 0.46 |
| PROPANE | 3.29 | 3.16 |
| ISOBUTANE | 0.54 | 0.40 |
| N—BUTANE | 0.50 | 0.39 |
| ISO-PENTANE | 0.32 | 0.24 |
| N—PENTANE | 0.21 | 0.19 |
| TOTAL LIGHTS ($C_5^-$) | 5.37 | 4.94 |
| 2,2 DIMETHYL BUTANE | 0.17 | 0.12 |
| 2 METHYL PENTANE | 5.53 | 4.96 |
| 3 METHYL PENTANE | 7.42 | 6.96 |
| N—HEXANE | 70.41 | 70.81 |
| METHYL CYCLOPENTANE | 9.69 | 10.55 |
| CYCLOHEXANE | 0.23 | 0.22 |
| TOTAL $C_6$ SATURATES | 93.45 | 93.62 |
| BENZENE | 1.18 | 1.44 |
| CALCULATIONS: | | |
| RON (CALCULATED) | 37.58[2] | —[2] |
| VOLUME % YIELD | 94.91[2] | —[2] |
| METHANE/PROPANE | 0.03 | 0.03 |
| ISO-BUTANE/N—BUTANE | 1.07 | 1.03 |
| ISO-PENTANE/N—PENTANE | 1.51 | 1.24 |
| CONVERSION (Vol %) | 18.47 | 18.01 |
| BENZENE SEL. %[3] | 6.37 | 7.98 |
| LIGHTS SEL. %[3] | 29.10 | 27.45 |
| MCP SEL. % | −0.04 | 4.75 |
| ISO-$C_6$ SEL. %[3] | 50.94 | 46.18 |
| HOURS ON STREAM | 22.00 | 24.25 |

TABLE III-2-continued

| (Catalyst C (SAPO-5))[1] | | |
|---|---|---|
| TEMPERATURE (°F.) | 901 | 900 |

[1]Catalyst Weight: 0.354 grams.
[2]Average value of both samples.
[3]FIGS. 1 & 2 use average values of both samples.

EXAMPLE 3

A catalyst according to the instant invention was prepared according to the procedure employed in example 1(b) using a SAPO-11 prepared by a procedure similar to that employed in example 1(b). The catalyst was denominated "Catalyst D" and evaluated according to the procedure described in example 2. The results of this evaluation are set forth in Tables IV-1 (860° F.) and IV-2 (900° F.) and are graphically depicted in FIGS. 1 to 4. The performance of Catalyst D is similar to that of Catalyst B. The products obtained by use of Catalyst D show improvement in the product distribution and improvement in the calculated RON of the products when compared to that observed by use of Reference Catalyst A.

TABLE IV-1

| (Catalyst (D SAPO-11))[1] | | |
|---|---|---|
| GC PRODUCT ANALYSIS (WEIGHT PERCENT): | | |
| METHANE | 0.00 | 0.00 |
| ETHANE | 0.14 | 0.15 |
| PROPANE | 2.28 | 2.51 |
| ISOBUTANE | 0.11 | 0.13 |
| N—BUTANE | 0.21 | 0.22 |
| ISO-PENTANE | 0.15 | 0.15 |
| N—PENTANE | 0.10 | 0.11 |
| TOTAL LIGHTS ($C_5^-$) | 2.99 | 3.27 |
| 2,2 DIMETHYL BUTANE | 0.55 | 0.69 |
| 2 METHYL PENTANE | 19.35 | 19.73 |
| 3 METHYL PENTANE | 15.22 | 15.48 |
| N—HEXANE | 49.71 | 48.25 |
| METHYL CYCLOPENTANE (MCP) | 8.67 | 8.36 |
| CYCLOHEXANE | 0.15 | 0.44 |
| TOTAL $C_6$ SATURATES | 93.64 | 92.95 |
| BENZENE | 3.37 | 3.77 |
| CALCULATIONS: | | |
| RON (CALCULATED) | 53.05[2] | —[2] |
| VOLUME % YIELD | 96.46[2] | —[2] |
| METHANE/PROPANE | 0.00 | 0.00 |
| ISO-BUTANE/N—BUTANE | 0.53 | 0.57 |
| ISO-PENTANE/N—PENTANE | 1.53 | 1.37 |
| CONVERSION (Vol. %) | 42.44 | 44.13 |
| BENZENE SEL. %[3] | 7.93 | 8.55 |
| LIGHTS SEL. %[3] | 7.05 | 7.42 |
| MCP SEL. % | −2.42 | −3.02 |
| ISO-$C_6$ SEL. %[3] | 73.79 | 73.41 |
| HOURS ON STREAM | 20.50 | 21.50 |
| TEMPERATURE (°F.) | 860 | 865 |

[1]Catalyst Weight: 0.340 grams.
[2]Average value of samples.
[3]FIGS. 1 & 2 use average values of both samples.

TABLE IV-2

| (Catalyst D (SAPO-11))[1] | | |
|---|---|---|
| GC PRODUCT ANALYSIS (WEIGHT PERCENT): | | |
| METHANE | 0.08 | 0.07 |
| ETHANE | 0.28 | 0.27 |
| PROPANE | 4.00 | 3.85 |
| ISOBUTANE | 0.17 | 0.16 |
| N—BUTANE | 0.46 | 0.37 |
| ISO-PENTANE | 0.22 | 0.16 |
| N—PENTANE | 0.20 | 0.16 |
| TOTAL LIGHTS ($C_5^-$) | 5.39 | 5.02 |
| 2,2 DIMETHYL BUTANE | 0.77 | 0.74 |
| 2 METHYL PENTANE | 17.93 | 17.57 |

TABLE IV-2-continued

| (Catalyst D (SAPO-11))[1] | | |
|---|---|---|
| 3 METHYL PENTANE | 14.79 | 14.55 |
| N—HEXANE | 48.74 | 49.80 |
| METHYL CYCLOPENTANE (MCP) | 8.12 | 8.47 |
| CYCLOHEXANE | 0.16 | 0.34 |
| TOTAL $C_6$ SATURATES | 90.51 | 91.46 |
| BENZENE | 4.10 | 3.52 |
| CALCULATIONS: | | |
| RON (CALCULATED) | 52.79[2] | —[2] |
| VOLUME % YIELD | 94.13[2] | —[2] |
| METHANE/PROPANE | 0.02 | 0.02 |
| ISO-BUTANE/N—BUTANE | 0.37 | 0.43 |
| ISO-PENTANE/N—PENTANE | 1.12 | 1.00 |
| CONVERSION (Vol. %) | 43.56 | 42.34 |
| BENZENE SEL. %[3] | 9.42 | 8.31 |
| LIGHTS SEL. %[3] | 12.38 | 11.87 |
| MCP SEL. % | −3.62 | −2.89 |
| ISO-$C_6$ SEL. %[3] | 68.18 | 69.08 |
| HOURS ON STREAM | 24.25 | 26.00 |
| TEMPERATURE (°F.) | 900 | 902 |

[1]Catalyst Weight: 0.340 grams.
[2]Average value of both samples.
[3]FIGS. 1 & 2 use average values of both samples.

EXAMPLE 4

A Reference Catalyst E was prepared to contain 0.52 weight percent chloride. This catalyst contained a higher chloride content than Reference Catalyst A of example 1. Reference Catalyst E was prepared similar to Catalyst A using an alumina carrier, except Reference Catalyst E did not contain a silica binder as was employed in Reference Catalyst A. Reference Catalyst E was prepared by mixing 17.6 grams of an alumina (CATAPAL) with 1.8 grams of concentrated nitric acid and 26.4 grams of distilled water. The peptized alumina was mixed with 75.8 grams of a calcined alumina (CATAPAL) (calcined at 540° C. in air for 16 hours to an LOI (Loss On Ignition) of 1.4 weight percent to form a gamma alumina). The mixture was then extruded into 1/16-inch extrudates and dried overnight in air at 110° C. The extrudates were then calcined at 540° C. for 3 hours. The calcined extrudates had a pore volume of 67.5 milliliter per gram and were pore filled with a 0.560 grams of $H_2PtCl_6$ in 0.77 grams of concentrated HCl in water. The resulting product was dried overnight in air at 110° C. and calcined in air at 540° C. for 3 hours. The catalyst was denominated Reference "Catalyst E". Catalyst E was evaluated according to the procedures employed for Catalyst A in Example 2. The results of this evaluation are set forth in Table V-1 to V-2 and are graphically depicted in FIGS. 1 to 4. Reference Catalyst E gave similar selectivity with higher activity (as a result of the higher chloride content) than Reference Catalyst A.

TABLE V-1

| (Reference Catalyst E)[1] | | |
|---|---|---|
| GC PRODUCT ANALYSIS (WEIGHT PERCENT): | | |
| METHANE | 1.30 | 1.03 |
| ETHANE | 1.63 | 1.30 |
| PROPANE | 2.83 | 2.31 |
| ISOBUTANE | 0.60 | 0.52 |
| N—BUTANE | 1.99 | 1.70 |
| ISO-PENTANE | 0.86 | 0.74 |
| N—PENTANE | 2.17 | 1.94 |
| TOTAL LIGHTS ($C_5^-$) | 11.38 | 9.53 |
| 2,2 DIMETHYL BUTANE | 3.10 | 2.99 |
| 2 METHYL PENTANE | 20.94 | 20.97 |
| 3 METHYL PENTANE | 14.44 | 14.90 |
| N—HEXANE | 42.16 | 43.49 |

TABLE V-1-continued (Reference Catalyst E)[1]

| | | |
|---|---|---|
| METHYL CYCLOPENTANE (MCP) | 3.10 | 3.04 |
| CYCLOHEXANE | 0.00 | 0.00 |
| TOTAL $C_6$ SATURATES | 83.74 | 85.38 |
| BENZENE | 4.89 | 5.08 |
| CALCULATIONS: | | |
| RON (CALCULATED) | 54.64[2] | —[2] |
| VOLUME % YIELD | 92.22[2] | —[2] |
| METHANE/PROPANE | 0.46 | 0.44 |
| ISO-BUTANE/N—BUTANE | 0.30 | 0.31 |
| ISO-PENTANE/N—PENTANE | 0.40 | 0.38 |
| CONVERSION (Vol. %) | 51.18 | 49.64 |
| BENZENE SEL. %[3] | 9.55 | 10.24 |
| LIGHTS SEL. %[3] | 22.23 | 19.21 |
| MCP SEL. % | −12.88 | −13.41 |
| ISO-$C_6$ SEL. %[3] | 67.47 | 70.33 |
| HOURS ON STREAM | 20.75 | 21.50 |
| TEMPERATURE (°F.) | 860 | 861 |

[1]Catalyst Weight: 0.350 grams.
[2]Average value of both samples.
[3]FIGS. 1 & 2 use average values of both samples.

TABLE V-2

(Reference Catalyst E)[1]

| | | |
|---|---|---|
| GC PRODUCT ANALYSIS (WEIGHT PERCENT): | | |
| METHANE | 1.87 | 1.67 |
| ETHANE | 2.56 | 2.31 |
| PROPANE | 4.00 | 3.56 |
| ISOBUTANE | 1.50 | 1.38 |
| N—BUTANE | 2.83 | 2.49 |
| ISO-PENTANE | 1.96 | 1.80 |
| N—PENTANE | 2.72 | 2.58 |
| TOTAL LIGHTS ($C_5^-$) | 17.44 | 15.79 |
| 2,2 DIMETHYL BUTANE | 4.83 | 4.88 |
| 2 METHYL PENTANE | 22.19 | 22.72 |
| 3 METHYL PENTANE | 14.92 | 15.57 |
| N—HEXANE | 28.84 | 30.18 |
| METHYL CYCLOPENTANE (MCP) | 2.73 | 2.72 |
| CYCLOHEXANE | 0.00 | 0.00 |
| TOTAL $C_6$ SATURATES | 73.52 | 76.07 |
| BENZENE | 9.04 | 8.14 |
| CALCULATIONS: | | |
| RON (CALCULATED) | 63.47[2] | —[2] |
| VOLUME % YIELD | 86.97[2] | —[2] |
| METHANE/PROPANE | 0.47 | 0.47 |
| ISO-BUTANE/N—BUTANE | 0.53 | 0.55 |
| ISO-PENTANE/N—PENTANE | 0.72 | 0.70 |
| CONVERSION (Vol. %) | 66.60 | 65.05 |
| BENZENE SEL. %[3] | 13.57 | 12.52 |
| LIGHTS SEL. %[3] | 26.19 | 24.27 |
| MCP SEL. % | −10.45 | −10.72 |
| ISO-$C_6$ SEL. %[3] | 57.05 | 60.29 |
| HOURS ON STREAM | 24.00 | 25.00 |
| TEMPERATURE (°F.) | 901 | 900 |

[1]Catalyst Weight: 0.350 grams.
[2]Average value of both samples.
[3]FIGS. 1 & 2 use average values of both samples.

EXAMPLE 5

A catalyst was prepared using a Pt/Cl-alumina component prepared in a similar manner to Reference Catalyst A of example 1(a) and by using a SAPO-11 prepared according to the procedure described in example 1(b). The SAPO-11 product contained essentially no impurity phases as a result of its preparation. As above mentioned, the Pt/Cl-alumina was as prepared as in example 1(a), except the Pt/Cl-alumina component was calcined at 500° C. (instead of 260° C.) for 2 hours in air prior to admixture with the SAPO-11 and silica. The catalyst (denominated as "Catalyst F") was prepared similar to Catalyst B. Catalyst F was evaluated according to the procedure described in Example 2. The results of this evaluation are reported in Tables VI-1 (860° F.) and VI-2 (900° F.) and are graphically depicted in FIGS. 1 to 4. Comparison of the results for Catalyst F and Reference Catalysts A and E show the improvement in the calculated RON of products obtained by use of Catalyst F.

TABLE VI-1

(CATALYST F (SAPO-11))[1]

| | | |
|---|---|---|
| GC PRODUCT ANALYSIS (WEIGHT PERCENT): | | |
| METHANE | 0.11 | 0.10 |
| ETHANE | 0.25 | 0.23 |
| PROPANE | 2.76 | 2.67 |
| ISOBUTANE | 0.13 | 0.14 |
| N—BUTANE | 0.32 | 0.34 |
| ISO-PENTANE | 0.21 | 0.19 |
| N—PENTANE | 0.22 | 0.19 |
| TOTAL LIGHTS ($C_5^-$) | 4.00 | 3.86 |
| 2,2 DIMETHYL BUTANE | 1.43 | 1.37 |
| 2 METHYL PENTANE | 27.18 | 26.55 |
| 3 METHYL PENTANE | 19.90 | 19.76 |
| N—HEXANE | 36.50 | 36.98 |
| METHYL CYCLOPENTANE (MCP) | 5.65 | 5.98 |
| CYCLOHEXANE | 0.08 | 0.08 |
| TOTAL $C_6$ SATURATES | 90.73 | 90.73 |
| BENZENE | 5.27 | 5.41 |
| CALCULATIONS: | | |
| RON (CALCULATED) | 60.86[2] | —[2] |
| VOLUME % YIELD | 95.78[2] | —[2] |
| METHANE/PROPANE | 0.04 | 0.04 |
| ISO-BUTANE/N—BUTANE | 0.40 | 0.42 |
| ISO-PENTANE/N—PENTANE | 0.97 | 0.97 |
| CONVERSION (Vol. %) | 57.74 | 57.18 |
| BENZENE SEL. %[3] | 9.13 | 9.47 |
| LIGHTS SEL %[3] | 6.93 | 6.75 |
| MCP SEL. % | −7.00 | −6.49 |
| ISO-$C_6$ SEL. %[3] | 77.31 | 76.64 |
| HOURS ON STREAM | 20.00 | 21.25 |
| TEMPERATURE (°F.) | 858 | 860 |

[1]Catalyst Weight: 0.350 grams.
[2]Average value of both samples.
[3]FIGS. 1 & 2 use average values of both samples.

TABLE VI-2

(CATALYST F (SAPO-11))[1]

| | | |
|---|---|---|
| GC PRODUCT ANALYSIS (WEIGHT PERCENT): | | |
| METHANE | 0.20 | 0.19 |
| ETHANE | 0.48 | 0.48 |
| PROPANE | 4.37 | 4.43 |
| ISOBUTANE | 0.31 | 0.31 |
| N—BUTANE | 0.53 | 0.55 |
| ISO-PENTANE | 0.32 | 0.34 |
| N—PENTANE | 0.33 | 0.33 |
| TOTAL LIGHTS ($C_5^-$) | 6.53 | 6.63 |
| 2,2 DIMETHYL BUTANE | 2.35 | 2.24 |
| 2 METHYL PENTANE | 27.07 | 26.73 |
| 3 METHYL PENTANE | 19.88 | 19.57 |
| N—HEXANE | 32.73 | 33.59 |
| METHYL CYCLOPENTANE (MCP) | 4.47 | 4.40 |
| CYCLOHEXANE | 0.07 | 0.04 |
| TOTAL $C_6$ SATURATES | 86.56 | 86.57 |
| BENZENE | 6.90 | 6.80 |
| CALCULATIONS: | | |
| RON (CALCULATED) | 62.65[2] | —[2] |
| VOLUME % YIELD | 93.18[2] | —[2] |
| METHANE/PROPANE | 0.05 | 0.04 |
| ISO-BUTANE/N—BUTANE | 0.58 | 0.55 |
| ISO-PENTANE/N—PENTANE | 0.96 | 1.02 |
| CONVERSION (Vol. %) | 62.09 | 61.10 |
| BENZENE SEL. %[3] | 11.12 | 11.12 |
| LIGHTS SEL. %[3] | 10.52 | 10.85 |
| MCP SEL. % | −8.41 | −8.67 |
| ISO-$C_6$ SEL. %[3] | 73.13 | 73.05 |
| HOURS ON STREAM | 23.50 | 25.25 |

TABLE VI-2-continued (CATALYST F (SAPO-11))[1]

| TEMPERATURE (°F.) | 900 | 901 |
|---|---|---|

[1]Catalyst Weight: 0.350 grams.
[2]Average value of both samples.
[3]FIGS. 1 & 2 use average values of both samples.

EXAMPLE 6

A catalyst (denominated "Catalyst G") was prepared according to this invention according to the procedure employed to prepare Catalyst B in example 1, except the Pt/Cl-alumina component was as prepared in example 1(e), except it was calcined at 540° C. (instead of 260° C.) for 2 hours and SAPO-41 was employed instead of SAPO-11. SAPO-41 was produced according to the general procedures set forth in U.S. Pat. No. 4,440,871. A reaction mixture was prepared using Kaiser-SA TM alumina (70 wt.% $Al_2O_3$, 30 wt.% $H_2O$), 85 wt.% $H_3PO_4$, CAB-O-SIL TM EH-5 (93.2 wt.% $SiO_2$, 6.9 wt.% $H_2O$), di-n-propylamine ($Pr_2NH$) and water. The reaction mixture was heated to 200° C. without stirring and held at 200° C. without stirring for 48 hours. A SAPO-41 product was obtained. Chemical analysis of the SAPO-41 product gave the following

|  | Weight Percent |
|---|---|
| $Al_2O_3$ | 34.9 |
| $P_2O_5$ | 43.0 |
| $SiO_2$ | 10.6 |
| Carbon | 5.5 |
| Nitrogen | 1.1 |
| LOI (Loss On Ignition) | 11.4 |

The product was calcined at above 450° C. in air to remove organic templating agent.

A catalyst G was evaluated according to the procedure described in example 2 at process temperatures of 860° F. and 900° F. Comparison of the products obtained by use of Catalyst G and Catalyst E show that Catalyst G is more active and more selective to higher octane products than products obtained using Reference Catalysts A and E. The resuls of this evaluation are set forth in Tables VII-1 and VII-2 and are graphically depicted in FIGS. 1 to 4.

TABLE VII-1

(CATALYST G (SAPO-41))[1]

| GC PRODUCT ANALYSIS (WEIGHT PERCENT): | | |
|---|---|---|
| METHANE | 0.12 | 0.12 |
| ETHANE | 0.41 | 0.43 |
| PROPANE | 3.36 | 3.52 |
| ISOBUTANE | 0.21 | 0.25 |
| N—BUTANE | 0.50 | 0.54 |
| ISO-PENTANE | 0.14 | 0.16 |
| N—PENTANE | 0.21 | 0.20 |
| TOTAL LIGHTS ($C_5^-$) | 4.95 | 5.22 |
| 2,2 DIMETHYL BUTANE | 1.04 | 0.99 |
| 2 METHYL PENTANE | 22.89 | 22.27 |
| 3 METHYL PENTANE | 17.36 | 16.87 |
| N—HEXANE | 42.83 | 44.09 |
| METHYL CYCLOPENTANE (MCP) | 6.95 | 6.97 |
| CYCLOHEXANE | 0.04 | 0.10 |
| TOTAL $C_6$ SATURATES | 91.11 | 91.29 |
| BENZENE | 3.93 | 3.49 |
| CALCULATIONS: | | |
| RON (CALCULATED) | 55.97[2] | —[2] |
| VOLUME % YIELD | 94.79[2] | —[2] |
| METHANE/PROPANE | 0.04 | 0.03 |
| ISO-BUTANE/N—BUTANE | 0.42 | 0.46 |

TABLE VII-1-continued (CATALYST G (SAPO-41))[1]

| ISO-PENTANE/N—PENTANE | 0.69 | 0.79 |
|---|---|---|
| CONVERSION (Vol. %) | 50.40 | 48.95 |
| BENZENE SEL. %[3] | 7.80 | 7.14 |
| LIGHTS SEL. %[3] | 9.83 | 10.66 |
| MCP SEL. % | −5.45 | −5.56 |
| ISO-$C_6$ SEL. %[3] | 74.17 | 74.12 |
| HOURS ON STREAM | 20.00 | 21.00 |
| TEMPERATURE (°F.) | 862 | 862 |

[1]Catalyst Weight: 0.350 grams.
[2]Average value of both samples.
[3]FIGS. 1 & 2 use average values of both samples.

TABLE VII-2

(CATALYST G (SAPO-41))[1]

| GC PRODUCT ANALYSIS (WEIGHT PERCENT): | | |
|---|---|---|
| METHANE | 0.18 | 0.18 |
| ETHANE | 0.59 | 0.61 |
| PROPANE | 4.48 | 4.64 |
| ISOBUTANE | 0.31 | 0.32 |
| N—BUTANE | 0.72 | 0.71 |
| ISO-PENTANE | 0.23 | 0.22 |
| N—PENTANE | 0.33 | 0.28 |
| TOTAL LIGHTS ($C_5^-$) | 6.84 | 6.96 |
| 2,2 DIMETHYL BUTANE | 1.62 | 1.46 |
| 2 METHYL PENTANE | 23.87 | 23.39 |
| 3 METHYL PENTANE | 17.99 | 17.71 |
| N—HEXANE | 38.62 | 39.98 |
| METHYL CYCLOPENTANE (MCP) | 5.84 | 5.98 |
| CYCLOHEXANE | 0.10 | 0.04 |
| TOTAL $C_6$ SATURATES | 88.04 | 88.56 |
| BENZENE | 5.12 | 4.48 |
| CALCULATIONS: | | |
| RON (CALCULATED) | 58.30[2] | —[2] |
| VOLUME % YIELD | 93.02[2] | —[2] |
| METHANE/PROPANE | 0.04 | 0.04 |
| ISO-BUTANE/N—BUTANE | 0.43 | 0.45 |
| ISO-PENTANE/N—PENTANE | 0.71 | 0.77 |
| CONVERSION (Vol. %) | 55.28 | 53.70 |
| BENZENE SEL. %[3] | 9.26 | 8.35 |
| LIGHTS SEL. %[3] | 12.37 | 12.96 |
| MCP SEL. % | −6.98 | −6.92 |
| ISO-$C_6$ SEL. %[3] | 71.70 | 71.98 |
| HOURS ON STREAM | 24.75 | 25.75 |
| TEMPERATURE (°F.) | 901 | 900 |

[1]Catalyst Weight: 0.350 grams.
[2]Average value of both samples.
[3]FIGS. 1 & 2 use average values of both samples.

EXAMPLE 7

A second sample from the preparation of Catalyst G, as described in example 6, was evaluated as a reforming catalyst as described in example 6 using the procedure described in example 2. The results of this evaluation were similar to those set forth in example 6 and are set forth in Tables VIII-1 (860° F.) and VIII-2 (900° F.).

TABLE VIII-1

(CATALYST G (SAPO-41))[1]

| GC PRODUCT ANALYSIS (WEIGHT PERCENT): | | |
|---|---|---|
| METHANE | 0.13 | 0.13 |
| ETHANE | 0.40 | 0.40 |
| PROPANE | 3.36 | 3.37 |
| ISOBUTANE | 0.10 | 0.14 |
| N—BUTANE | 0.46 | 0.56 |
| ISO-PENTANE | 0.12 | 0.15 |
| N—PENTANE | 0.17 | 0.24 |
| TOTAL LIGHTS ($C_5^-$) | 4.74 | 4.98 |
| 2,2 DIMETHYL BUTANE | 0.81 | 0.91 |
| 2 METHYL PENTANE | 22.40 | 22.73 |
| 3 METHYL PENTANE | 16.72 | 16.85 |
| N—HEXANE | 44.45 | 44.03 |
| METHYL CYCLOPENTANE (MCP) | 7.01 | 6.81 |

TABLE VIII-1 -continued
(CATALYST G (SAPO-41))[1]

| | | |
|---|---|---|
| CYCLOHEXANE | 0.15 | 0.16 |
| TOTAL C$_6$ SATURATES | 91.55 | 91.48 |
| BENZENE | 3.71 | 3.54 |
| CALCULATIONS: | | |
| RON (CALCULATED) | 55.48[2] | —[2] |
| VOLUME % YIELD | 95.02[2] | —[2] |
| METHANE/PROPANE | 0.04 | 0.04 |
| ISO-BUTANE/N—BUTANE | 0.23 | 0.25 |
| ISO-PENTANE/N—PENTANE | 0.71 | 0.64 |
| CONVERSION (Vol. %) | 48.52 | 49.02 |
| BENZENE SEL %[3] | 7.65 | 7.22 |
| LIGHTS SEL. %[3] | 9.77 | 10.15 |
| MCP SEL. % | −5.52 | −5.89 |
| ISO-C$_6$ SEL. %[3] | 74.47 | 74.87 |
| HOURS ON STREAM | 22.00 | 22.50 |
| TEMPERATURE (°F.) | 859 | 861 |

[1]Catalyst Weight: 0.350 grams.
[2]Average value of both samples.
[3]FIGS. 1 & 2 use average values of both samples.

TABLE VIII-2
(SAPO 41))[1]

| | |
|---|---|
| GC PRODUCT ANALYSIS (WEIGHT PERCENT): | |
| METHANE | 0.22 |
| ETHANE | 0.66 |
| PROPANE | 4.85 |
| ISOBUTANE | 0.24 |
| N—BUTANE | 0.72 |
| ISO-PENTANE | 0.30 |
| N—PENTANE | 0.33 |
| TOTAL LIGHTS (C$_5$−) | 7.32 |
| 2,2 DIMETHYL BUTANE | 1.49 |
| 2 METHYL PENTANE | 23.58 |
| 3 METHYL PENTANE | 17.55 |
| N—HEXANE | 38.83 |
| METHYL CYCLOPENTANE (MCP) | 5.83 |
| CYCLOHEXANE | 0.15 |
| TOTAL C$_6$ SATURATES | 87.43 |
| BENZENE | 5.25 |
| CALCULATIONS: | |
| RON (CALCULATED) | 58.57 |
| VOLUME % YIELD | 92.58 |
| METHANE/PROPANE | 0.05 |
| ISO-BUTANE/N—BUTANE | 0.33 |
| ISO-PENTANE/N—PENTANE | 0.91 |
| CONVERSION (Vol %) | 55.04 |
| BENZENE SEL. % | 9.54 |
| LIGHTS SEL. % | 13.30 |
| MCP SEL. % | −7.01 |
| ISO-C$_6$ SEL. % | 70.54 |
| HOURS ON STREAM | 26.25 |
| TEMPERATURE (°F.) | 900 |

[1]Catalyst Weight: 0.3500 grams.

EXAMPLE 8

A catalyst (denominated "Catalyst H") was prepared similar to Catalyst G in example 6, except the SAPO-41 was prepared from a reaction mixture having different molar oxide ratios. The reaction mixture was heated to 200° C. without stirring and held at 200° C. without stirring for 24 hours. A SAPO-41 product was obtained. Chemical analysis of the SAPO-41 product gave the following

| | Weight Percent |
|---|---|
| Al$_2$O$_3$ | 39.5 |
| P$_2$O$_5$ | 39.6 |
| SiO$_2$ | 8.4 |
| Carbon | 4.8 |
| Nitrogen | 0.9 |
| LOI (Loss On Ignition) | 12.4 |

Catalyst H was evaluated according to the procedure described in example 2 and the results are set forth in Tables IX-1 (860° F.) and IX-2 (900° F.) and are graphically depicted in FIGS. 1 to 4. These results are similar to those obtained in examples 6 and 7 and demonstrate the benefits of a catalyst containing SAPO-41 over a similar reference catalyst without SAPO-41.

TABLE IX-1
(CATALYST H (SAPO 41))[1]

| | | |
|---|---|---|
| GC PRODUCT ANALYSIS (WEIGHT PERCENT): | | |
| METHANE | 0.08 | 0.09 |
| ETHANE | 0.25 | 0.30 |
| PROPANE | 2.84 | 3.20 |
| ISOBUTANE | 0.08 | 0.08 |
| N—BUTANE | 0.33 | 0.37 |
| ISO-PENTANE | 0.10 | 0.08 |
| N—PENTANE | 0.16 | 0.14 |
| TOTAL LIGHTS (C$_5$−) | 3.84 | 4.27 |
| 2,2 DIMETHYL BUTANE | 0.63 | 0.69 |
| 2 METHYL PENTANE | 21.69 | 23.43 |
| 3 METHYL PENTANE | 16.69 | 17.88 |
| N—HEXANE | 45.58 | 42.66 |
| METHYL CYCLOPENTANE | 8.16 | 7.93 |
| CYCLOHEXANE | 0.13 | 0.12 |
| TOTAL C$_6$ SATURATES | 92.87 | 92.71 |
| BENZENE | 3.30 | 3.02 |
| CALCULATIONS: | | |
| RON (CALCULATED) | 55.95[2] | —[2] |
| VOLUME % YIELD | 95.71[2] | —[2] |
| METHANE/PROPANE | 0.03 | 0.03 |
| ISO-BUTANE/N—BUTANE | 0.24 | 0.22 |
| ISO-PENTANE/N—PENTANE | 0.65 | 0.59 |
| CONVERSION (Vol %) | 47.22 | 50.60 |
| BENZENE SEL. %[3] | 6.98 | 5.97 |
| LIGHTS SEL. %[3] | 8.12 | 8.43 |
| MCP SEL. % | −3.25 | −3.49 |
| ISO-C$_6$ SEL. %[3] | 74.51 | 75.45 |
| HOURS ON STREAM | 20.00 | 21.00 |
| TEMPERATURE (°F.) | 859 | 860 |

[1]Catalyst Weight: 0.350 grams.
[2]Average value of both samples.
[3]FIGS. 1 & 2 use average values of both samples.

TABLE IX-2
(CATALYST H (SAPO-41))[1]

| | | |
|---|---|---|
| GC PRODUCT ANALYSIS (WEIGHT PERCENT): | | |
| METHANE | 0.17 | 0.16 |
| ETHANE | 0.58 | 0.51 |
| PROPANE | 5.10 | 4.80 |
| ISOBUTANE | 0.31 | 0.21 |
| N—BUTANE | 0.74 | 0.60 |
| ISO-PENTANE | 0.21 | 0.18 |
| N—PENTANE | 0.24 | 0.23 |
| TOTAL LIGHTS (C$_5$−) | 7.34 | 6.69 |
| 2,2 DIMETHYL BUTANE | 1.29 | 1.14 |
| 2 METHYL PENTANE | 23.40 | 22.70 |
| 3 METHYL PENTANE | 18.12 | 17.29 |
| N—HEXANE | 38.59 | 40.43 |
| METHYL CYCLOPENTANE (MCP) | 6.73 | 6.77 |
| CYCLOHEXANE | 0.16 | 0.13 |
| TOTAL C$_6$ SATURATES | 88.30 | 88.45 |
| BENZENE | 4.36 | 4.86 |
| CALCULATIONS: | | |
| RON (CALCULATED) | 58.24[2] | —[2] |
| VOLUME % YIELD | 92.72[2] | —[2] |
| METHANE/PROPANE | 0.03 | 0.03 |
| ISO-BUTANE/N—BUTANE | 0.42 | 0.34 |
| ISO-PENTANE/N—PENTANE | 0.85 | 0.79 |
| CONVERSION (Vol. %) | 55.31 | 53.18 |

TABLE IX-2-continued

| (CATALYST H (SAPO-41))[1] | | |
|---|---|---|
| BENZENE SEL. %[3] | 7.88 | 9.13 |
| LIGHTS SEL. %[3] | 13.28 | 12.58 |
| MCP SEL. % | −5.35 | −5.50 |
| ISO-$C_6$ SEL. %[3] | 70.55 | 50.15 |
| HOURS ON STREAM | 24.50 | 26.50 |
| TEMPERATURE (°F.) | 900 | 900 |

[1]Catalyst Weight: 0.350 grams.
[2]Average value of both samples.
[3]FIGS. 1 & 2 use average values of both samples.

EXAMPLE 9

A comparative catalyst (denominated "Catalyst I") was prepared employing the preparative procedure employed for Catalyst B in example 1, except SAPO-34 was substituted for SAPO-11. The preparation of SAPO-34 is described in examples 32 to 38 of U.S. Pat. No. 4,440,871, incorporated herein by reference. SAPO-34 is a small pore silicoaluminophosphate and is not characterized by the adsorption characteristics for isobutane characteristic of the MP-SAPOs employed in the catalysts and processes of the instant invention.

Catalyst I was evaluated according to the procedure described in example 2, above. The results of this evaluation are set forth in Tables X-1 (860° F.) and X-2 (900° F.) and are graphically depicted in FIGS. 1 to 4. Catalyst I gave products having iso $C_6$'s/light and benzene/lights ratios less than that obtained by use of Reference Catalyst A. In addition, the plot of Volume % Yield vs. RON (calculated) in FIG. 3 shows Catalyst I was inferior to Reference Catalyst A and to catalysts containing SAPO-11 and SAPO-41.

TABLE X-1

| (COMPARATIVE CATALYST I (SAPO-34))[1] | | |
|---|---|---|
| GC PRODUCT ANALYSIS (WEIGHT PERCENT): | | |
| METHANE | 0.14 | 0.13 |
| ETHANE | 1.01 | 0.94 |
| PROPANE | 14.31 | 13.07 |
| ISOBUTANE | 0.04 | 0.04 |
| N—BUTANE | 1.69 | 1.59 |
| ISO-PENTANE | 0.07 | 0.07 |
| N—PENTANE | 0.57 | 0.51 |
| TOTAL LIGHTS ($C_5-$) | 17.83 | 16.35 |
| 2,2 DIMETHYL BUTANE | 0.27 | 0.28 |
| 2 METHYL PENTANE | 10.54 | 10.11 |
| 3 METHYL PENTANE | 8.94 | 8.83 |
| N—HEXANE | 51.43 | 52.92 |
| METHYL CYCLOPENTANE (MCP) | 8.75 | 9.08 |
| CYCLOHEXANE | 0.04 | 0.10 |
| TOTAL $C_6$ SATURATES | 79.98 | 81.32 |
| BENZENE | 2.19 | 2.33 |
| CALCULATIONS: | | |
| RON (CALCULATED) | 45.14[2] | —[2] |
| VOLUME % YIELD | 82.96 | —[2] |
| METHANE/PROPANE | 0.01 | 0.01 |
| ISO-BUTANE/N—BUTANE | 0.02 | 0.03 |
| ISO-PENTANE/N—PENTANE | 0.12 | 0.13 |
| CONVERSION (Vol. %) | 40.45 | 38.72 |
| BENZENE SEL. %[3] | 5.42 | 6.02 |
| LIGHTS SEL. %[3] | 44.08 | 42.22 |
| MCP SEL. % | −2.33 | −1.59 |
| ISO-$C_6$ SEL. %[3] | 39.19 | 39.70 |
| HOURS ON STREAM | 19.75 | 21.00 |
| TEMPERATURE (°F.) | 861 | 862 |

[1]Catalyst Weight: 0.350 grams.
[2]Average value of both samples.
[3]FIGS. 1 & 2 use average values of both samples.

TABLE X-2

| (Comparative Catalyst I (SAPO-34))[1] | | |
|---|---|---|
| GC PRODUCT ANALYSIS (WEIGHT PERCENT): | | |
| METHANE | 0.22 | 0.20 |
| ETHANE | 1.39 | 1.29 |
| PROPANE | 13.71 | 11.66 |
| ISOBUTANE | 0.12 | 0.15 |
| N—BUTANE | 1.88 | 1.89 |
| ISO-PENTANE | 0.12 | 0.16 |
| N—PENTANE | 0.58 | 0.54 |
| TOTAL LIGHTS ($C_5-$) | 18.01 | 15.90 |
| 2,2 DIMETHYL BUTANE | 0.54 | 0.49 |
| 2 METHYL PENTANE | 12.51 | 12.30 |
| 3 METHYL PENTANE | 10.29 | 10.38 |
| N—HEXANE | 47.58 | 49.02 |
| METHYL CYCLOPENTANE (MCP) | 7.68 | 8.08 |
| CYCLOHEXANE | 0.09 | 0.08 |
| TOTAL $C_6$ SATURATES | 78.69 | 80.35 |
| BENZENE | 3.29 | 3.75 |
| CALCULATIONS: | | |
| RON (CALCULATED) | 48.19[2] | —[2] |
| VOLUME % YIELD | 83.01[2] | —[2] |
| METHANE/PROPANE | 0.02 | 0.02 |
| ISO-BUTANE/N—BUTANE | 0.07 | 0.08 |
| ISO-PENTANE/N—PENTANE | 0.21 | 0.29 |
| CONVERSION (Vol. %) | 44.90 | 43.24 |
| BENZENE SEL. %[3] | 7.34 | 8.67 |
| LIGHTS SEL. %[3] | 40.12 | 36.78 |
| MCP SEL. % | −4.48 | −3.73 |
| ISO-$C_6$ SEL. %[3] | 43.39 | 44.63 |
| HOURS ON STREAM | 24.50 | 25.75 |
| TEMPERATURE (°F.) | 899 | 900 |

[1]Catalyst Weight: 0.350 grams.
[2]Average value of both samples.
[3]FIGS. 1 & 2 use average values of both samples.

EXAMPLE 10

A comparative catalyst (demoninated "Catalyst J") was prepared similar to the preparation of Catalyst B in Example 1, above, except silicalite was substituted for SAPO-11. Silicalite and its preparation are disclosed in U.S. Pat. No. 4,061,724, incorporated herein by reference. Silicalite is a crystalline silica material having a characteristic adsorption for isobutane and triethylamine within the adsorption criteria described for MP-SAPO. Silicalite has a pore size of about 6 Angstroms.

Catalyst J was evaluated according to the procedure described in example 2 and the results of that evaluation are set forth in Tables XI-1 (860° F.) and XI-2 (900° F.) and are graphically depicted in FIGS. 1, 2 and 4. The results of the evaluation show that, although silicalite is characterized by adsorption criteria similar to MP-NZMSs, silicalite does not provide the benefits provided by catalysts containing MP-NZMS(s), as indicated by the large yield losses associated with use of the silicalite-containing Catalyst J.

TABLE XI-1

| (COMPARATIVE CATALYST J (Silicalite))[1] | | |
|---|---|---|
| GC PRODUCT ANALYSIS (WEIGHT PERCENT): | | |
| METHANE | 0.33 | 0.35 |
| ETHANE | 3.57 | 3.81 |
| PROPANE | 27.92 | 27.76 |
| ISOBUTANE | 2.51 | 2.66 |
| N—BUTANE | 7.37 | 7.39 |
| ISO-PENTANE | 2.06 | 1.94 |
| N—PENTANE | 2.58 | 2.48 |
| TOTAL LIGHTS ($C_5-$) | 46.34 | 46.39 |
| 2,2 DIMETHYL BUTANE | 0.79 | 0.77 |
| 2 METHYL PENTANE | 14.03 | 14.51 |
| 3 METHYL PENTANE | 10.32 | 10.68 |
| N—HEXANE | 21.06 | 19.65 |
| METHYL CYCLOPENTANE (MCP) | 3.10 | 3.00 |

TABLE XI-1-continued

| (COMPARATIVE CATALYST J (Silicalite))[1] | | |
|---|---|---|
| CYCLOHEXANE | 0.11 | 0.09 |
| TOTAL C$_6$ SATURATES | 49.40 | 48.71 |
| BENZENE | 4.26 | 4.90 |
| CALCULATIONS: | | |
| RON (CALCULATED) | 62.55[2] | —[2] |
| VOLUME % YIELD | 57.69[2] | —[2] |
| METHANE/PROPANE | 0.01 | 0.01 |
| ISO-BUTANE/N—BUTANE | 0.34 | 0.36 |
| ISO-PENTANE/N—PENTANE | 0.80 | 0.79 |
| CONVERSION (Vol. %) | 75.62 | 77.25 |
| BENZENE SEL. %[3] | 5.63 | 6.35 |
| LIGHTS SEL. %[3] | 61.29 | 60.05 |
| MCP SEL. % | −8.72 | −8.66 |
| ISO C$_6$ SEL. %[3] | 28.16 | 28.62 |
| HOURS ON STREAM | 19.75 | 22.00 |
| TEMPERATURE (°F.) | 861 | 861 |

[1]Catalyst Weight: 0.350 grams.
[2]Average value of both samples.
[3]FIGS. 1 & 2 use average values of both samples.

TABLE XI-2

| (COMPARATIVE CATALYST J (Silicalite))[1] | | |
|---|---|---|
| GC PRODUCT ANALYSIS (WEIGHT PERCENT): | | |
| METHANE | 0.62 | 0.69 |
| ETHANE | 5.37 | 6.38 |
| PROPANE | 40.12 | 37.10 |
| ISOBUTANE | 3.42 | 3.79 |
| N—BUTANE | 8.68 | 9.46 |
| ISO-PENTANE | 1.96 | 1.93 |
| N—PENTANE | 2.01 | 2.23 |
| TOTAL LIGHTS (C$_5$−) | 62.16 | 61.58 |
| 2,2 DIMETHYL BUTANE | 0.92 | 0.76 |
| 2 METHYL PENTANE | 11.01 | 10.28 |
| 3 METHYL PENTANE | 7.73 | 7.66 |
| N—HEXANE | 11.32 | 11.69 |
| METHYL CYCLOPENTANE (MCP) | 1.53 | 1.62 |
| CYCLOHEXANE | 0.07 | 0.08 |
| TOTAL C$_6$ SATURATES | 32.57 | 32.10 |
| BENZENE | 5.26 | 6.32 |
| CALCULATIONS: | | |
| RON (CALCULATED) | 67.90[2] | —[2] |
| VOLUME % YIELD | 41.36[2] | —[2] |
| METHANE/PROPANE | 0.02 | 0.02 |
| ISO-BUTANE/N—BUTANE | 0.39 | 0.40 |
| ISO-PENTANE/N—PENTANE | 0.97 | 0.86 |
| CONVERSION (Vol. %) | 86.89 | 86.47 |
| BENZENE SEL. %[3] | 6.06 | 7.31 |
| LIGHTS SEL. %[3] | 71.54 | 71.22 |
| MCP SEL. % | −9.40 | −9.33 |
| ISO-C$_6$ SEL. %[3] | 18.16 | 17.16 |
| HOURS ON STREAM | 25.00 | 25.75 |
| TEMPERATURE (°F.) | 901 | 899 |

[1]Catalyst Weight: 0.350 grams.
[2]Average value of both samples.
[3]FIGS. 1 & 2 use average values of both samples.

EXAMPLE 11

A Commercial Reforming Catalyst (Commercial Reference Catalyst K) was evaluated and compared with a catalyst containing the same commercial reforming catalyst in admixture with a SAPO-11 component. The commercial reforming catalyst comprised a Group VIII metal on chlorinated-alumina catalyst typical of the Group VIII, chlorinated-alumina catalysts employed in commercial reforming processes. The commercial reforming catalyst was ground to form 20–40 mesh (U.S. Standard) particles and then calcined in air at 480° C. for 2 hours. This catalyst was demoninated Reference "Catalyst K".

A catalyst according to the instant invention was prepared by employing Reference Catalyst K and a silica-bonded SAPO-11 component. The SAPO-11 component was prepared as set forth in example 17 of U.S. Pat. No. 4,440,871, except the digestion time was 40 hours. The SAPO-11 was calcined and blended with a silica sol (LUDOX TM), extruded, dried and calcined in air, as described in part (b) of example 1. The SAPO-11/silica component was prepared to contain 87 weight percent SAPO-11 and 13 weight percent SiO$_2$, expressed on an anhydrous basis. The calcined SAPO-11/silica extrudates were ground to a 20–40 mesh (U.S. Standard). A catalyst according to the instant invention was prepared by forming a physical mixture containing 90 weight percent of commercial reforming Catalyst K and 10 weight percent of the SAPO-11/silica component (expressed as anhydrous weight percents). The catalyst was denominated "Catalyst L" and contained 90 weight percent Catalyst K, 8.7 wt % SAPO-11 and 1.3 wt % SiO$_2$.

Catalyst L and Reference Catalyst K were evaluated as reforming catalysts with a naphtha feedstock having the following characterization:

| Aromatics* | 15.6 Wt. % |
|---|---|
| Naphthenes* | 24.5 Wt. % |
| Paraffins* | 44.8 Wt. % |
| Unidentified Component(s)* | 12.1 Wt. % |
| Average Molecular Wt.* | 116.6 grams/mole |
| RON (Calculated) | 47.2 |
| Calculated Density | 0.7604 |

*Calculated by capillary gas chromatographic analysis of the individual feedstock components Each catalyst was tested by placing 8.6 grams of the 20–40 mesh catalyst in a once through, tubular reactor having a bed length of about 4.5 inches and an inside diamater of 0.43 inches. The reactor and catalyst bed were purged with nitrogen and then with hydrogen at 1 atmosphere (zero (0) psig) and at a flow rate of 250 cc/min. The catalyst was heated from room temperature to 900° F. over a period of 3 to 4 hours and then maintained at 900° F. for 1 hour with the hydrogen purge. The catalyst was then sulfided by increasing the hydrogen flow rate to 380 cc/min and by adding hydrogen sulfide to the hydrogen stream at a rate of 20 cc/min. The hydrogen sulfide addition was continued for 10 minutes while the catalyst was maintained at 900° F. The reactor was then purged for 30 minutes with a hydrogen purge (380 cc/min). Each catalyst was then evaluated by heating the specific catalyst to the desired reaction temperature. The reactor was pressurized to 200 psig and a feedstream containing a 3 to 1 molar ratio of hydrogen to the naphtha feedstock introduced to the reactor at 28 cc/hour (Weight Hourly Space Velocity=2.5). The liquid product was collected and analyzed by capillary gas chromatographic procedures. The gas products were monitored by dry test meters and analyzed by gas chromatographic procedures. The liquid products analysis typically identified greater than 95 weight percent of the products. The acceptable product sample mixtures were determined by evaluating the mass balances for the sample and by requiring a mass balance between the feedstock and products of from greater than 99 percent to 101 percent by weight.

Catalysts K and L were evaluated and the RON and C$_5$+ Volume % Yield calculated, as above described. The evaluation of each catalyst was carried out to provide a comparable Volume % Yield for each catalyst and to provide a mass balance greater than 99 percent to 101 percent by weight. This required the use of a lower reaction temperature for the more active Catalyst L (SAPO-11). Products were collected after about 65 to 66 hours on stream and evaluated. The following results were obtained:

|  | Commercial Reference Catalyst K | SAPO-11-containing Catalyst L |
|---|---|---|
| Reaction Temperature (°F.) | 940° F. | 921° F. |
| Pressure (psig) | 200 psig | 200 psig |
| $H_2$/Naphtha (Molar ratio) | 3.07 | 3.11 |
| WHSV | 2.37 | 2.28 |
| Mass Balance (Wt. %) | 99.8 | 99.2 |
| Time on Stream (hours) | 66.8 | 65.1 |
| Calculated RON ($C_5+$) | 93.8 | 94.4 |
| Calculated $C_5+$ (Vol. % Yield) | 87.3 | 87.1 |

The above results demonstrate that at comparable calculated RON and $C_5+$ Vol. % Yield that Catalyst L was a more active catalyst than Catalyst K. The increased activity of Catalyst K is indicated by the use of a lower reaction temperature, 921° F., as compared to 940° C. for Reference Catalyst K, to achieve similar calculated RON and $C_5+$ Volume % Yield. The ability to employ a lower reaction temperature without a concurrent loss in octane and/or yield is beneficial in booth lowering the overall cost of the reforming process and permits the processing of large feedstock volumes to produce products having comparable octane. In addition, the products produced by use of Catalyst L at the lower process temperature and at a comparable $C_5+$ Vol. % Yield showed a comparable and even slightly higher calculated RON than the products obtained by use of Commercial Reference Catalyst K.

What is claimed is:

1. The process for reforming of a hydrocarbon feedstock comprising contacting said hydrocarbon feedstock under effective reforming conditions with a catalyst comprising:
   (a) at least one MP-NZMS molecular sieve which has been calcined, hydrotreated or chemically treated to remove at least a portion of the template used in the manufacture of the NZMS, or, alternatively, is calcined, hydrotreated or chemically treated in situ prior to carrying out the reforming process, said at least one MP-NZMS being characterized after removal of the template by an adsorption of isobutane of at least 2 percent by weight at a partial pressure of 500 torr and a temperature of 20° C. and also characterized by an adsorption of triethylamine less than 5 percent by weight at a partial pressure of 2.6 torr and a temperature of 22° C.; and
   (b) an amount of at least one Group VIII metal effective to render said MP-NZMS active as a reforming catalyst.

2. The process according to claim 1 wherein said MP-NZMS is characterized after removal of the template by an adsorption of isobutane of at least 4 percent by weight at a partial pressure of 500 torr and a temperature of 20° C. and by an adsorption of triethylamine less than 5 percent by weight at a partial pressure of 2.6 torr and a temperature of 22° C.

3. The process according to claim 2 wherein said MP-NZMS is characterized after removal of the template by an adsorption of isobutane of at least 4 percent by weight at a partial pressure of 500 torr and a temperature of 20° C. and by an adsorption of triethylamine less than 3 percent by weight at a partial pressure of 2.6 torr and a temperature of 22° C.

4. The process according to claim 1 wherein said Group VIII metal is supported on an inorganic oxide carrier.

5. The process according to claim 4 wherein said inorganic oxide carrier is at least one selected from the group consisting of aluminas, silicas, silica-aluminas, titanias, magnesias, alumina-borias, alumina-titanias and clays.

6. The process according to claim 5 wherein said inorganic oxide carrier is selected from the group consisting of aluminas, silicas, silica-aluminas and mixtures thereof.

7. The process according to claim 6 wherein said inorganic oxide carrier is a transition-alumina.

8. The process according to claim 6 wherein said transition-alumina is a gamma-alumina.

9. The process according to claim 1 or claim 4 or claim 8 wherein said Group VIII metal is present in an effective amount between about 0.1 wt.% and 2 wt.%, based on the total weight of the catalyst.

10. The process according to claim 9 wherein said effective amount is between about 0.2 wt.% and about 1.2 wt.%, based on the total weight of the catalyst.

11. The process according to claim 10 wherein said effective amount is between 0.2 wt. % and about 0.8 wt. %.

12. The process according to claim 9 wherein said Group VIII metal is at least one metal selected from the group consisting of Pt, Ir, Pd, Rh, Ru and mixtures thereof.

13. The process according to claim 12 wherein said Group VIII metal is selected from the group consisting of platinum and iridium and mixtures thereof.

14. The process according to claim 12 wherein at least two metal components are present wherein said weight ratio of said first metal to said second metal is between about 1:5 and about 5:1, said first metal is selected from the Group consisting of at least one of Pt, Ir, Pd, Rh and Ru and said second metal component is selected from the group consisting of rhenium, tungsten and tin.

15. The process of claim 1 or claim 4 or claim 8 wherein said MP-NZMS is selected from the group consisting of ELAPSOs, CoAPSOs, FeAPSOs, MgAPSOs, MnAPSOs, TiAPSOs, ZnAPSOs, CoMgAPSOs, CoMnMgAPSOs, SAPOs, MeAPOs, TAPOs, FAPOs, ELAPOs and mixtures thereof.

16. The process of claim 15 wherein said MP-NZMS is selected from the group consisting of MeAPOs, ELAPOs, FeAPSOs, MgAPSOs, MnAPSOs, TiAPSOs, ZnAPSOs, SAPOs and mixtures thereof.

17. The process of claim 10 wherein said MP-NZMS is selected from the group consisting of SAPO-11, SAPO-31, SAPO-40, SAPO-41, and mixtures thereof.

18. The process of claim 15 wherein said MP-NZMS is selected from the group consisting of CoAPSO-11, CoAPSO-31, CoAPSO-40, CoAPSO-41, FeAPSO-11, FeAPSO-31, FeAPSO-40, FeAPSO-41, MgAPSO-11, MgAPSO-31, MgAPSO-40, MgAPSO-41, MnAPSO-11, MnAPSO-31, MnAPSO-40, MnAPSO-41, TiAPSO-11, TiAPSO-31, TiAPSO-40, TiAPSO-41, ZnAPSO-11, ZnAPSO-31, ZnAPSO-40, ZnAPSO-41, CoMgAPSO-11, CoMgAPSO-31, CoMnMgAPSO-11, CoMnMgAPSO-31, and mixtures thereof.

19. The process of claim 15 wherein said MP-NZMS is selected from the group consisting of MeAPO-11, MeAPO-31, TAPO-11, TAPO-31, FAPO-11, FAPO-31, ELAPO-11, ELAPO-31, ELAPO-40, ELAPO-41 and mixtures thereof.

20. The process of claim 19 wherein "Me" is selected from the group consisting of magnesium, manganese, zinc and mixtures thereof.

21. The process of claim 20, wherein "Me" is selected from the group consisting of magnesium, manganese and mixtures thereof.

22. The reforming process comprising contacting a hydrocarbon feedstock suitable for reforming under effective reforming conditions with a catalyst, wherein said catalyst comprises:
(a) at least one MP-NZMS molecular sieve characterized in the calcined form by an adsorption of isobutane of at least 2 percent by weight at a partial pressure of 500 torr and a temperature of 20° C. and also characterized by an adsorption of triethylamine less than 5 percent by weight at a partial pressure of 2.6 torr and a temperature of 22° C.; and
(b) a reforming catalyst component comprising at least one Group VIII metal and a halogenated-carrier containing at least one halogen or halogen-containing compound, the amounts of said MP-NZMS, Group VIII metal and halogen or halogen-containing compound being effective to render said catalyst active as a reforming catalyst for said hydrocarbon feedstock.

23. A process according to claim 22 wherein said reforming catalyst component in part (b) comprises: between about 0.1 and about 2 percent by weight of at least one Group VIII metal selected from the group consisting of Pt, Ir, Pd, Rh and Ru; between about 0.2 and about 2 wt. % halogen; and between about 96 wt. % and about 99.7 wt. % of an alumina as said carrier.

24. The process according to claim 23 wherein said Group VIII metal is at least one of platinum or iridium and is present in an effective amount between about 0.2 wt. % and 1.2 wt. %.

25. The process according to claim 24 wherein said effective amount of platnium or iridium is between 0.2 wt. % and about 0.8 wt. %.

26. The process according to claim 22 or claim 23 wherein said catalyst comprises between about 1 and about 99.9 percent by weight of at least one MP-NZMS molecular sieve.

27. The process according to claim 26 wherein said catalyst comprises between about 5 and about 40 weight percent of at least one MP-NZMS.

28. A process according to claim 22 wherein said MP-NZMS is characterized in the calcined form by an adsorption of isobutane of at least 4 percent by weight at 500 torr and a temperature of 20° C. and an adsorption of triethylamine less than 5 percent by weight of a partial pressure of 2.6 torr and a temperature of 22° C.

29. A process according to claim 28 wherein said MP-NZMS is characterized in the calcined form by an adsorption of isobutane of at least 4 percent by weight at 500 torr and a temperature of 20° C. and an adsorption of triethylamine of less than 3 percent by weight at a partial pressure of 2.6 torr and a temperature of 22° C.

30. The process according to claim 22 wherein said carrier is at least one inorganic oxide carrier selected from the group consisting of aluminas, silicas, silica-aluminas, titanias, magnesias, alumina-borias, alumina-titanias and clays.

31. The process according to claim 30 wherein said inorganic oxide carrier is selected from the group consisting of aluminas, silicas, silica-aluminas and mixtures thereof.

32. The process according to claim 31 wherein said alumina is a transition-alumina.

33. The process according to claim 23 or claim 31 wherein said alumina is a gamma-alumina.

34. The process of claim 23 wherein said Group VIII metal is at least one of platinum or iridium, said halogen is chlorine and said alumina is a gamma-alumina.

35. The process of claim 34 wherein said platinum or iridium is present in an effective amount between about 0.2 wt. % and about 1.2 wt. %, said chlorine is present in an effective amount between about 0.2 and about 1.0 wt. %, wherein said amounts are based on the total weight of said reforming catalyst component in part (b).

36. The process of claim 22 or claim 35 wherein said MP-NZMS is selected from the group consisting of ELAPSOs, CoAPSOs, FeAPSOs, MgAPSOs, MnAPSOs, TiAPSOs, ZnAPSOs, CoMgAPSOs, CoMnMgAPSOs, SAPOs, MeAPOs, TAPOs, FAPOs, ELAPOs and mixtures thereof.

37. The process of claim 22 or claim 35 wherein said MP-NZMS is selected from the group consisting of MeAPOs, ELAPOs, SAPOs, FAPOs, MgAPOs, MnAPOs, TAPOs, ZnAPOs and mixtures thereof.

38. The process of claim 22 or claim 35 wherein said MP-NZMS is selected from the grcup consisting of SAPO-11, SAPO-31, SAPO-40, SAPO-41, and mixtures thereof.

39. The process of claim 36 wherein said MP-NZMS is selected from the group consisting of CoAPSO-11, CoAPSO-31, CoAPSO-40, CoAPSO-41, FeAPSO-11, FeAPSO-31, FeAPSO-40, FeAPSO-41, MgAPSO-11, MgAPSO-31, MgAPSO-40, MgAPSO-41, MnAPSO-11, MnAPSO-31, MnAPSO-40, MnAPSO-41, TiAPSO-11, TiAPSO-31, TiAPSO-40, TiAPSO-41, ZnAPSO-11, ZnAPSO-31, ZnAPSO-40, ZnAPSO-41, CoMgAPSO-11, CoMgAPSO-31, CoMnMgAPSO-11, CoMnMgAPSO-31, and mixtures thereof.

40. The process of claim 37 wherein said MP-NZMS is selected from the group consisting of MeAPO-11, MeAPO-31, TAPO-11, TAPO-31, FAPO-11, FAPO-31, ELAPO-11, ELAPO-31, ELAPO-40, ELAPO-41 and mixtures thereof.

41. The process of claim 40 wherein "Me" is selected from the group consisting of magnesium, manganese, zinc and mixtures thereof.

42. The process of claim 41, wherein "Me" is selected from the group consisting of magnesium, manganese and mixtures thereof.

43. The process of claim 1 or claim 22 wherein said hydrocarbon feedstock is selected from the group consisting of: (1) paraffinic hydrocarbons containing from 6 to 12 carbon atoms; (2) naphtha fractions boiling between about 80° F. and about 450° F.; (3) upstream reformates; (4) heavy hydrocracked gasoline fractions; and (5) and mixtures of (1), (2), (3) and (4).

44. The process of claim 43 wherein said naphtha fraction is selected from the group consisting of virgin naphthas, hydrogenated cracked naphthas, Fischer-Tropsch naphthas and mixtures thereof.

45. The process of claim 43 wherein said paraffinic hydrocarbon is selected from the group consisting of n-hexane, 2-methylpentane, 3-methylpentane, n-heptane, 2-methylhexane, 3-methylhexane, 3-ethyl-pentane, 2,5-dimethylhexane, n-octane, 2-methylheptane, 3-methylheptane, 4-methylheptane, 3-ethylhexane, n-nonane, 2-methyloctane, 3-methyloctane, n-decane and mixtures thereof.

46. The process for dehydrocyclization of a hydrocarbon feedstock comprising contacting said hydrocarbon feedstock under effective dehydrocyclization conditions with a catalyst comprising:
(a) at least one MP-NZMS molecular sieve which has been calcined, hydrotreated or chemically treated to remove at least a portion of the template used in the manufacture of the NZMS, or, alternatively, is calcined, hydrotreated or chemically treated in situ prior to carrying out the reforming process, said at least one MP-NZMS being characterized after removal of the template by an adsorption of isobutane of at least 2 percent by weight at a partial pressure of 500 torr and a temperature of 20° C. and also characterized by an adsorption of triethylamine less than 5 percent by weight at a partial pressure of 2.6 torr and a temperature of 22° C.; and
(b) an amount of at least one Group VIII metal effective to render said MP-NZMS active as a dehydrocyclization catalyst.

47. The process according to claim 46 wherein said MP-NZMS is characterized after removal of the template by an adsorption of isobutane of at least 4 percent by weight at a partial pressure of 500 torr and a temperature of 20° C. and by an adsorption of triethylamine less than 5 percent by weight at a partial pressure of 2.6 torr and a temperature of 22° C.

48. The process according to claim 47 wherein said MP-NZMS is characterized after removal of the template by an adsorption of isobutane of at least 4 percent by weight at a partial pressure of 500 torr and a temperature of 20° C. and by an adsorption of triethylamine less than 3 percent by weight at a partial pressure of 2.6 torr and a temperature of 22° C.

49. The process according to claim 46 wherein said Group VIII metal is supported on an inorganic oxide carrier.

50. The process according to claim 49 wherein said inorganic oxide carrier is at least one selected from the group consisting of aluminas, silicas, silica-aluminas, titanias, magnesias, alumina-borias, alumina-titanias and clays.

51. The process according to claim 50 wherein said inorganic oxide carrier is selected from the group consisting of aluminas, silicas, silica-aluminas, and mixtures thereof.

52. The process according to claim 51 wherein said inorganic oxide carrier is a transition-alumina.

53. The process according to claim 52 wherein said transition-alumina is a gamma-alumina.

54. The process according to claim 46 or claim 49 or claim 53 wherein said Group VIII metal is present in an effective amount between about 0.1 wt. % and 2 wt. %, based on the total weight of the catalyst.

55. The process according to claim 54 wherein said effective amount between about 0.2 wt. % and about 1.2 wt. %, based on the total weight of the catalyst.

56. The process according to claim 55 wherein said effective amount between about 0.2 wt. % and about 0.8 wt. %, based on the total weight of the catalyst.

57. The process according to claim 54 wherein said Group VIII metal is at least one metal selected from the group consisting of Pt, Ir, Pd, Rh, Ru and mixtures thereof.

58. The process according to claim 57 wherein said Group VIII metal is selected from the group consisting of platinum and iridium and mixtures thereof.

59. The process according to claim 57 wherein at least two metal components are present wherein said weight ratio of said first metal to said second metal is between about 1:5 and about 5:1, said first metal is selected from the group consisting of at least one of Pt, Ir, Pd, Rh and Ru and said second metal is selected from the group consisting of rhenium, tungsten and tin.

60. The process of claim 46 or claim 49 or claim 53 wherein said MP-NZMS is selected from the group consisting of ELAPSOs, CoAPSOs, FeAPSOs, MgAPSOs, MnAPSOs, TiAPSOs, ZnAPSOs, CoMgAPSOs, CoMgMnAPSOs, SAPOs, MeAPOs, TAPOs, FAPOs, ELAPOs and mixtures thereof.

61. The process of claim 60 wherein said MP-NZMS is selected from the group consisting of MeAPOs, ELAPOs, FeAPSOs, MgAPSOs, MnAPSOs, TiAPSOs, ZnAPSOs, SAPOs and mixtures thereof.

62. The process of claim 61 wherein said MP-NZMS is selected from the group consisting of SAPO-11, SAPO-31, SAPO-40, SAPO-41, and mixtures thereof.

63. The process of claim 60 wherein said MP-NZMS is selected from the group consisting of CoAPSO-11, CoAPSO-31, CoAPSO-40, CoAPSO-41, FeAPSO-11, FeAPSO-31, FeAPSO-40, FeAPSO-41, MgAPSO-11, MgAPSO-31, MgAPSO-40, MgAPSO-41, MnAPSO-11, MnAPSO-31, MnAPSO-40, MnAPSO-41, TiAPSO-11, TiAPSO-31, TiAPSO-40, TiAPSO-41, ZnAPSO-11, ZnAPSO-31, ZnAPSO-40, ZnAPSO-41, CoMgAPSO-11, CoMgAPSO-31, CoMnMgAPSO-11, CoMnMgAPSO-31, and mixtures thereof.

64. The process of claim 60 wherein said MP-NZMS is selected from the group consisting of MeAPO-11, MeAPO-31, TAPO-11, TAPO-31, FAPO-11, FAPO-31, ELAPO-11, ELAPO-31, ELAPO-40, ELAPO-41 and mixtures thereof.

65. The process of claim 64 wherein "Me" is selected from the group consisting of magnesium, manganese, zinc and mixtures thereof.

66. The process of claim 65 wherein "Me" is selected from the group consisting of magnesium, manganese and mixtures thereof.

* * * * *